United States Patent
Kim et al.

(10) Patent No.: US 10,701,357 B2
(45) Date of Patent: *Jun. 30, 2020

(54) VIDEO ENCODING METHOD USING IN-LOOP FILTER PARAMETER PREDICTION AND APPARATUS THEREFOR, AND VIDEO DECODING METHOD AND APPARATUS THEREFOR

(71) Applicant: SAMSUNG ELECTRONICS CO., LTD., Suwon-si (KR)

(72) Inventors: Sung-dae Kim, Yongin-si (KR); Ki-won Yoo, Seoul (KR); Jae-moon Kim, Uiwang-si (KR); Sang-kwon Na, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,720

(22) Filed: Mar. 25, 2019

(65) Prior Publication Data

US 2019/0222840 A1    Jul. 18, 2019

Related U.S. Application Data

(63) Continuation of application No. 15/500,756, filed as application No. PCT/KR2015/006641 on Jun. 29, 2015, now Pat. No. 10,250,879.

(30) Foreign Application Priority Data

Jul. 31, 2014 (KR) .................. 10-2014-0098520

(51) Int. Cl.
*H04N 7/12* (2006.01)
*H04N 19/117* (2014.01)
(Continued)

(52) U.S. Cl.
CPC .......... *H04N 19/117* (2014.11); *H04N 19/13* (2014.11); *H04N 19/157* (2014.11);
(Continued)

(58) Field of Classification Search
CPC .... H04N 19/176; H04N 19/117; H04N 19/13; H04N 19/157; H04N 19/182; H04N 19/82
(Continued)

(56) References Cited

U.S. PATENT DOCUMENTS

| 8,498,342 B1 | 7/2013 | Sha et al. |
| 9,270,990 B2 | 2/2016 | Lee et al. |

(Continued)

FOREIGN PATENT DOCUMENTS

| CN | 103891277 A | 6/2014 |
| CN | 103959777 A | 7/2014 |

(Continued)

OTHER PUBLICATIONS

Communication dated Jun. 5, 2019, issued by the State Intellectual Property Office of P.R. China in counterpart Chinese Application No. 201580050531.4.

(Continued)

*Primary Examiner* — Gims S Philippe
(74) *Attorney, Agent, or Firm* — Sughrue Mion, PLLC

(57) ABSTRACT

A video encoding apparatus comprises an encoder encoding input video; a decoder decoding video data, and a filter to compensate for a pixel value of the encoded video data. An adaptive loop filter (ALF) parameter predictor generates an ALF filter parameter using the decoded video data. The ALF filter parameter is applied to an ALF filter to compensate a current pixel by using a pixel adjacent to the current pixel and a filter coefficient with respect to the neighboring pixel; a sample adaptive offset (SAO) filter unit applied to the (Continued)

decoded video data compensates for a current pixel by using at least one of an edge offset and a band offset; an ALF filter unit applies the ALF filter parameter, the ALF filter to video data to which the SAO filter has been applied; and an entropy encoder performs entropy encoding on the ALF filter parameter.

14 Claims, 39 Drawing Sheets

(51) Int. Cl.
    *H04N 19/157*     (2014.01)
    *H04N 19/82*     (2014.01)
    *H04N 19/13*     (2014.01)
    *H04N 19/176*     (2014.01)
    *H04N 19/182*     (2014.01)

(52) U.S. Cl.
    CPC ......... *H04N 19/176* (2014.11); *H04N 19/182* (2014.11); *H04N 19/82* (2014.11)

(58) Field of Classification Search
    USPC ...................................................... 375/240.02
    See application file for complete search history.

(56) References Cited

U.S. PATENT DOCUMENTS

| | | | |
|---|---|---|---|
| 9,357,235 B2 | 5/2016 | Chong et al. | |
| 9,860,530 B2 | 1/2018 | Lee et al. | |
| 2013/0051454 A1 | 2/2013 | Sze et al. | |
| 2013/0051455 A1* | 2/2013 | Sze | H04N 19/70 375/240.02 |
| 2013/0083844 A1 | 4/2013 | Chong et al. | |
| 2013/0156097 A1 | 6/2013 | Budagavi et al. | |
| 2013/0182759 A1 | 7/2013 | Kim et al. | |
| 2013/0243104 A1 | 9/2013 | Chen et al. | |
| 2014/0086501 A1 | 3/2014 | Ikeda et al. | |
| 2014/0093180 A1 | 4/2014 | Esenlik et al. | |
| 2014/0192876 A1 | 7/2014 | Yie et al. | |
| 2014/0219337 A1* | 8/2014 | Lee | H04N 19/159 375/240.02 |
| 2014/0286396 A1* | 9/2014 | Lee | H04N 19/70 375/240.02 |
| 2014/0369429 A1* | 12/2014 | Laroche | H04N 19/85 375/240.29 |

FOREIGN PATENT DOCUMENTS

| | | |
|---|---|---|
| CN | 103959794 A | 7/2014 |
| WO | 2013/053324 A1 | 4/2013 |
| WO | 2013053324 A1 | 4/2013 |

OTHER PUBLICATIONS

International Search Report, issued by International Searching Authority in corresponding International Application No. PCT/KR2015/006641, dated Sep. 23, 2015, (PCT/ISA/210).

Communication issued by the European Patent Office dated Jan. 31, 2018 in counterpart European Patent Application No. 15827127.0.

Jaehwan Joo et al., "Fast Sample Adaptive Offset Encoding Algorithm for HEVC based on Intra Prediction Mode", 2013 IEEE Third International Conference on Consumer Electronics, Berlin (ICCE-Berlin), IEEE, Sep. 9, 2013, pp. 50-53, XP032549033, DOI: 10.1109/ICCE-BERLIN.2013.6698011.

Woo-Shik Kim, "Non-CE1: SAO Parameter Estimation Using Non-deblocked Pixels in Interleaving Mode", 9th Meeting: Geneva, CH, Apr. 17-May 7, 2012, Joint Collaborative Team on Video Coding (JCT-VC) of ITU-T SG 16 WP 3 and ISO/IEC JTC 1/SC 29/WG 11, Apr. 17, 2012, total 6 pages, XP030111963, http://wftp3.itu.int/av-arch/jctvc-site.

\* cited by examiner

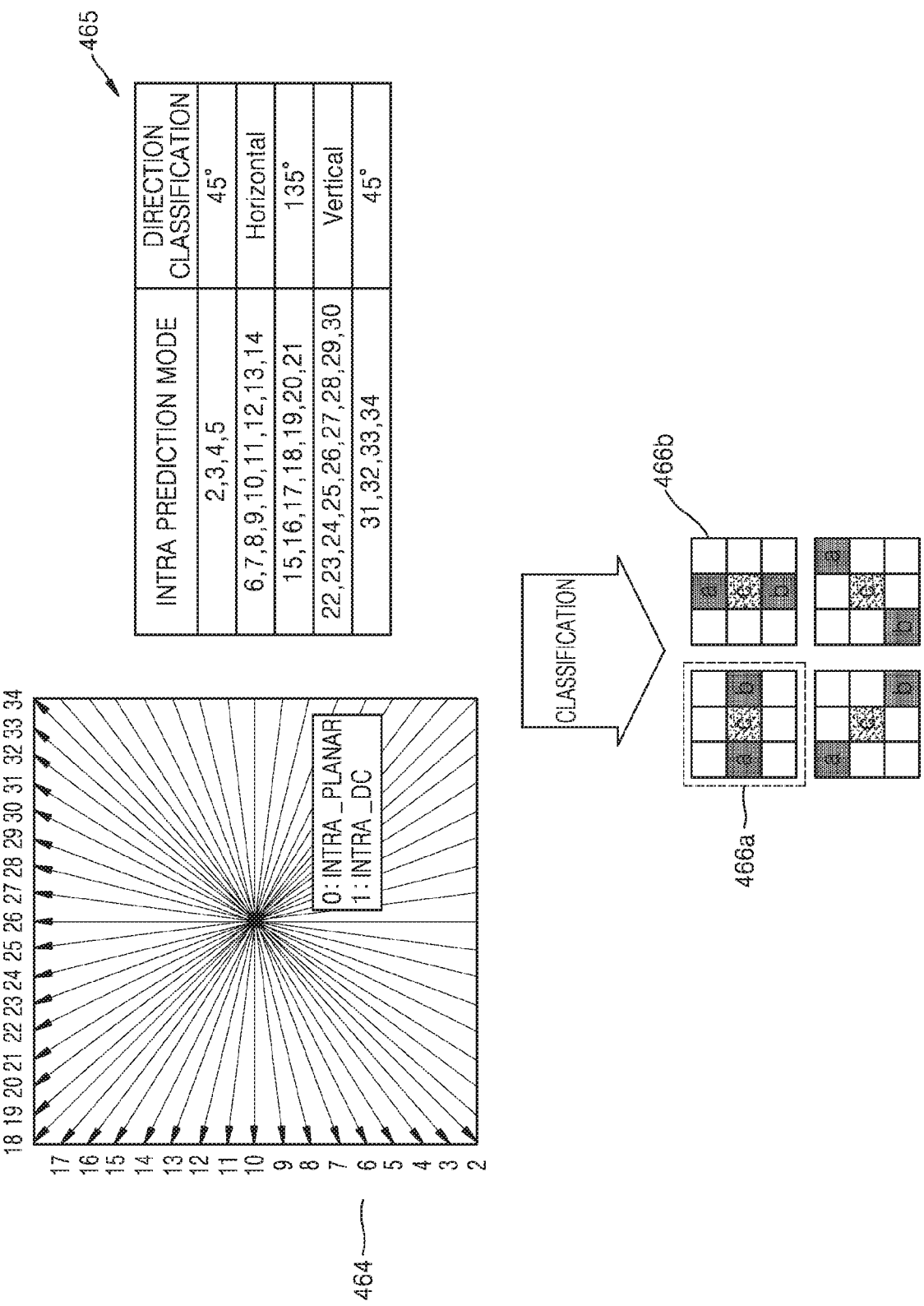

FIG. 7E

| CATEGORY | CONDITION |
|---|---|
| 1 | Xc < Xa && Xc < Xb |
| 2 | (Xc < Xa && Xc == Xb)\|\|(Xc == Xa && Xc < Xb) |
| 3 | ( Xc > Xa && Xc == Xb)\|\|(Xc == Xa && Xc > Xb) |
| 4 | Xc > Xa && Xc > Xb |
| 0 | WHEN CONDITIONS OF CATEGORIES 1, 2, 3, 4 ARE NOT SATISFIED |

CODING UNIT (1710)

PREDICTION UNIT (1860)

(12)US 10,701,357 B2

VIDEO ENCODING METHOD USING IN-LOOP FILTER PARAMETER PREDICTION AND APPARATUS THEREFOR, AND VIDEO DECODING METHOD AND APPARATUS THEREFOR

RELATED APPLICATIONS

This application is a Continuation of U.S. application Ser. No. 15/500,756 filed Jan. 31, 2017, which is a national stage entry of PCT/KR2015/006641 filed Jun. 29, 2015, which claims the benefit of priority to KR 10-2014-0098520 filed Jul. 31, 2014, and which are incorporated by reference in their entirety.

TECHNICAL FIELD

The present disclosure relates to a video encoding method and decoding method, and more particularly, to an in-loop filtering method.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial domain is transformed into coefficients of a frequency domain via frequency transformation. According to a video codec, an image is split into blocks having a predetermined size, discrete cosine transformation (DCT) is performed on each block, and frequency coefficients are encoded in block units, for rapid calculation of frequency transformation. In order to remove redundancy from color images, conventional compression systems perform block-base prediction. The conventional compression systems generate parameters in a picture unit, the parameters being used in encoding and decoding a video.

DETAILED DESCRIPTION OF THE INVENTION

Technical Problem

Provided is a video encoding method.

Technical Solution

According to an aspect of the present disclosure, there is provided a video encoding apparatus including an encoder configured to generate encoded video data by encoding an input video; a decoder configured to decode video data to which a filter to compensate for a pixel value is to be applied, wherein the video data is from the encoded video data; an adaptive loop filter (ALF) parameter predictor configured to generate an ALF filter parameter by using information of the decoded video data, wherein the ALF filter parameter is configured to be applied to an ALF filter to compensate for a value of a current pixel by using a value of a neighboring pixel adjacent to the current pixel and a filter coefficient with respect to the neighboring pixel; a sample adaptive offset (SAO) filter unit configured to apply a SAO filter to the decoded video data, wherein the SAO filter compensates for a value of a current pixel by using at least one of an edge offset and a band offset; an ALF filter unit configured to apply, by using the ALF filter parameter, the ALF filter to video data to which the SAO filter has been applied; and an entropy encoder configured to perform entropy encoding on the ALF filter parameter.

Advantageous Effects

Provided is a video encoding method in which encoding speed and efficiency are improved.

DESCRIPTION OF THE DRAWINGS

The present disclosure will be understood with a combination of the detailed descriptions below and the accompanying drawings, in which reference numerals denote structural elements.

FIGS. 4C through 4E are diagrams for describing a method of encoding a sample adaptive offset (SAO) filter parameter for an edge type, according to an embodiment of the present disclosure.

FIGS. 7E and 7F illustrate edge-type categories, according to an embodiment.

BEST MODE

Figure 1:
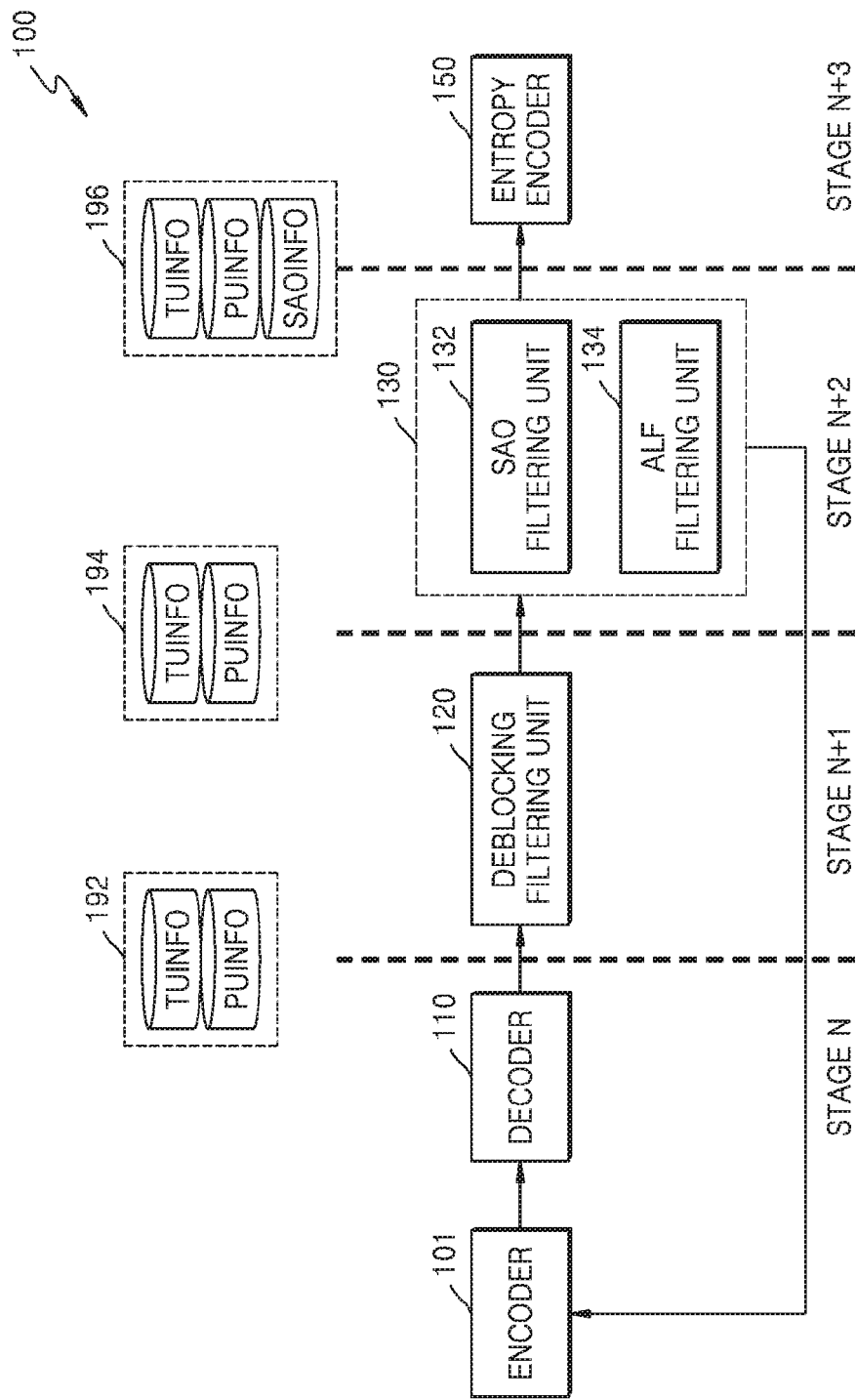
FIG. 1 is a diagram for describing a concept of an operation performed by an encoding apparatus that performs in-loop filtering.

According to an aspect of the present disclosure, there is provided a video encoding apparatus including an encoder configured to generate encoded video data by encoding an input video; a decoder configured to decode video data to which a filter to compensate for a pixel value is to be applied, wherein the video data is from the encoded video data; an adaptive loop filter (ALF) parameter predictor configured to generate an ALF filter parameter by using information of the decoded video data, wherein the ALF filter parameter is configured to be applied to an ALF filter to compensate for a value of a current pixel by using a value of a neighboring pixel adjacent to the current pixel and a filter coefficient with respect to the neighboring pixel; a sample adaptive offset (SAO) filter unit configured to apply a SAO filter to the decoded video data, wherein the SAO filter compensates for a value of a current pixel by using at least one of an edge offset and a band offset; an ALF filter unit configured to apply, by using the ALF filter parameter, the ALF filter to video data to which the SAO filter has been applied; and an entropy encoder configured to perform entropy encoding on the ALF filter parameter.

The ALF parameter predictor may be configured to generate the ALF filter parameter by using the information of the decoded video data to which the SAO filter has not been applied.

The video encoding apparatus may further include a deblocking filter unit configured to apply, to the decoded video data, a deblocking filter to remove a block effect, the SAO filter unit may be further configured to apply the SAO filter to decoded video data to which the deblocking filter has been applied, and the ALF parameter predictor may be further configured to generate the ALF filter parameter by using the information of the decoded video data to which the deblocking filter has not been applied.

The video encoding apparatus may further include a deblocking filter unit configured to apply, to the decoded video data, a deblocking filter to remove a block effect, the SAO filter unit may be further configured to apply the SAO filter to decoded video data to which the deblocking filter has been applied, and the ALF parameter predictor may be further configured to predict an ALF filter parameter of video data to which the SAO filter has been applied, by using information of the decoded video data to which the deblocking filter has been applied.

The video encoding apparatus may further include a deblocking filter unit configured to apply, to the decoded video data, a deblocking filter to remove a block effect, and a SAO parameter predictor configured to generate a SAO filter parameter to be applied to a SAO filter to the decoded video data, by using the information of the decoded video data to which the deblocking filter has not been applied, and the SAO filter unit may be further configured to apply the SAO filter to the decoded video data by using the SAO filter parameter.

The ALF parameter predictor may be further configured to predict an ALF filter parameter of video data to which the SAO filter has been applied, by using information of the decoded video data to which the deblocking filter has been applied.

The entropy encoder may be further configured to perform entropy encoding on the predicted SAO filter parameter.

The SAO filter unit may be further configured to apply the SAO filter to a reconstructed video to which a deblocking filter has been applied.

The SAO parameter predictor may be further configured to predict a result of applying the deblocking filter to the decoded video data by using a pixel value of the decoded video data to which the deblocking filter has not been applied, and to predict a SAO filter parameter by using a value of the predicted result of applying the deblocking filter.

The SAO parameter predictor may be further configured to predict the SAO filter parameter by using prediction information used in encoding the decoded video data.

The SAO parameter predictor may be further configured to predict a SAO filter parameter of a current block by using a SAO filter parameter of a previous block to which a SAO filter has been applied before a SAO filter is applied to the current block in the decoded video data.

The SAO parameter predictor may be further configured to predict a SAO filter parameter of a current block by using information of a spatially-neighboring block located in a same picture as a picture of a reconstructed video in which the current block is located.

The information of the spatially-neighboring block may include at least one of a pixel value, prediction information, and a SAO filter parameter of the spatially-neighboring block.

The SAO parameter predictor may be further configured to predict a SAO filter parameter of a current block by using information of a temporally-neighboring block located in a picture having different image sequence information from image sequence information of a picture of a reconstructed video in which the current block is located.

The information of the temporally-neighboring block may include at least one of a pixel value, prediction information, and a SAO filter parameter of the temporally-neighboring block.

The SAO parameter predictor may be further configured to predict a SAO filter parameter of a current block by using at least one of information of a spatially-neighboring block located in a same picture as a picture of a reconstructed video in which the current block is located and information of a temporally-neighboring block located in a picture having different time information from time information of a picture of the reconstructed video in which the current block is located, and information of the current block to which a deblocking filter has not been applied.

The entropy encoder may be further configured to perform entropy encoding on the predicted ALF filter parameter before the ALF filter unit applies, by using the generated ALF filter parameter, an ALF filter to a current block to which the SAO filter has been applied.

According to another aspect of the present disclosure, there is provided a video encoding method performed by a video encoding apparatus, the video encoding method including generating encoded video data by encoding an input video; decoding video data to which a filter to compensate for a pixel value is to be applied, wherein the video data is from the encoded video data; generating an adaptive loop filter (ALF) filter parameter by using information of the decoded video data, wherein the ALF filter parameter is configured to be applied to an ALF filter to compensate for a value of a current pixel by using a value of a neighboring pixel adjacent to the current pixel and a filter coefficient with respect to the neighboring pixel; applying a sample adaptive offset (SAO) filter to the decoded video data, wherein the SAO filter compensates for a value of a current pixel by using at least one of an edge offset and a band offset; applying, by using the ALF filter parameter, the ALF filter to video data to which the SAO filter has been applied; and performing entropy encoding on the ALF filter parameter.

The generating of the ALF filter parameter may include generating the ALF filter parameter by using the information of the decoded video data to which the SAO filter has not been applied.

According to another aspect of the present disclosure, there is provided a non-transitory computer-readable recording medium having recorded thereon a computer program for executing the video encoding method.

According to another aspect of the present disclosure, there is provided a computer program stored in a non-transitory computer-readable recording medium, the computer program being combined with hardware and thus executing a video encoding method including generating encoded video data by encoding an input video; decoding video data to which a filter to compensate for a pixel value is to be applied, wherein the video data is from the encoded video data; generating an adaptive loop filter (ALF) filter parameter by using information of the decoded video data, wherein the ALF filter parameter is configured to be applied to an ALF filter to compensate for a value of a current pixel by using a value of a neighboring pixel adjacent to the current pixel and a filter coefficient with respect to the neighboring pixel; applying a sample adaptive offset (SAO) filter to the decoded video data, wherein the SAO filter compensates for a value of a current pixel by using at least one of an edge offset and a band offset; applying, by using the ALF filter parameter, the ALF filter to video data to which the SAO filter has been applied; and performing entropy encoding on the ALF filter parameter.

The generating of the ALF filter parameter may include generating the ALF filter parameter by using the information of the decoded video data to which the SAO filter has not been applied.

MODE OF THE INVENTION

Hereinafter, with reference to FIGS. 1 through 7G, a video encoding method and video decoding method involving signaling a filter parameter by using in-loop filtering according to an embodiment will be provided.

Also, with reference to FIGS. 8 through 20, a video encoding method and video decoding method based on coding units having a tree structure which are applicable to the video encoding and decoding methods will be described. Also, with reference to FIGS. 21 through 27, embodiments to which the video encoding method and the video decoding method are applicable will be described.

Hereinafter, an "image" may refer to a still image or a moving image of a video, or the video itself.

Hereinafter, a "sample" refers to data that is assigned to a sampling location of an image and is to be processed. For example, pixels in an image of a spatial domain may be samples.

Hereinafter, a "current color block" may refer to a block of an image to be encoded or decoded. For example, a current block may refer to a block of a color image to be encoded or decoded. When a current image is encoded and decoded in a YCrCb format, the current block may be one of a luma block, a Cr block, and a Cb block.

A current image refers to an image including a current block. For example, a current color image refers to a color image including the current block. In more detail, the current color image refers to the color image including a block to be encoded or decoded.

Hereinafter, a neighboring block around the current block refers to a block adjacent to the current block. For example, the neighboring block may be located at the top, upper right, left, lower left, or upper left of the current block. The neighboring block may refer to an encoded block or a decoded block adjacent to the current block.

First, with reference to FIGS. 1 through 7G, a video encoding apparatus, a video encoding method, a video decoding apparatus, and a video decoding method are provided.

FIG. 1 is a diagram for describing a concept of an operation performed by an encoding apparatus 100 that performs in-loop filtering. The encoding apparatus 100 includes an encoder 101, a decoder 110, a deblocking filtering unit 120, a sample adaptive offset (SAO) filtering unit 132, an adaptive loop filter (ALF) filtering unit 134, an entropy encoder 150, and a plurality of data buffers 192, 194, and 196.

The encoder 101 generates encoded video data by encoding an input original video. The encoded video data is input to the decoder 110. The encoder 101 may predict pixel values configuring a video by splitting the video into pictures and splitting each picture into blocks, may transform a difference between the pixel values according to the prediction, may quantize a transformed value, and thus may encode the video. For example, the encoder 101 may transform the difference between the pixel values to a frequency domain, and may quantize the transformed value.

For example, the encoder 101 may divide the video into the blocks and may encode each of the blocks. A block may have a square shape, a rectangular shape, or an arbitrary geometrical shape, and is not limited to a data unit having a predetermined size. The block according to an embodiment may be a largest coding unit, a coding unit, a prediction unit, or a transform unit, among coding units according to a tree structure.

The encoder 101 may individually encode each of largest coding units of an image. For example, a current largest coding unit may be encoded based on coding units of a tree structure split from the current largest coding unit.

In order to encode the current largest coding unit, the encoder 101 may encode luma and/or chroma coding units of a tree structure included in a current coding unit by performing intra and/or inter prediction, transformation, and quantization. Video encoding and decoding techniques based on coding units according to a tree structure will be described below with reference to FIG. 8.

The decoder 110 decodes the encoded video data by inversely performing the encoding process, thereby generating a reconstructed video. For example, the decoder 110 may perform decoding on encoded samples in each of the coding units of the tree structure through inverse quantization, inverse transformation, intra prediction or motion compensation, thereby reconstruct pixels included in the current largest coding unit.

Since some information is lossy while the decoder 110 encodes and decodes a video, a reconstructed video generated by reconstructing an encoded video generated by encoding an original video becomes different from the original video. For example, a specific pixel value of original video data may have a value different from a specific pixel value of reconstructed video data generated by performing encoding and decoding on the specific pixel value of the original video data. Due to the difference, a quality of a reconstructed video may be measured by performing subjective quality estimation on the original video and the reconstructed video, and in general, compared to the original video, the reconstructed video includes an artifact that hinders a subjective quality. For example, the artifact includes a block artifact, a noise artifact, or the like. In order to remove the artifact, various post-processing filters are provided. For example, as illustrated in FIG. 1, a deblocking filter, an SAO filter, an ALF, or the like are provided.

In order to have an artifact be removed from a reconstructed video, the reconstructed video may be delivered to the deblocking filtering unit 120. In order to delete a block phenomenon occurring in the reconstructed video, a deblocking filter is applied to the reconstructed video. Filtering to reduce a block phenomenon may be performed on pixels located in a boundary area of coding units of a largest coding unit or coding units of a tree structure. The reconstructed video to which the deblocking filter has been applied is delivered to the SAO filtering unit 132 for next image processing.

The SAO filtering unit 132 performs filtering by using an SAO filter. The SAO filter is a filter to compensate for a current pixel value by using an edge offset and/or a band offset. The SAO filtering unit 132 may determine the edge offset according to a bigness relation between a value of a current pixel of which pixel value is to be compensated for and a value of a neighboring pixel adjacent to the current pixel, and may determine the band offset according to the value of the current pixel. For example, the SAO filtering unit 132 may adjust a pixel value of each reconstructed pixel of each largest coding unit. The SAO filtering unit 132 may determine an SAO type, an SAO class, and an offset value of a current block so as to apply the SAO filter thereto. The SAO filtering unit 132 may apply the SAO filter to the reconstructed video to which the deblocking filter was applied, and may deliver, to the ALF filtering unit 134, the reconstructed video to which the SAO filter has been applied. In addition, the SAO filtering unit 132 may deliver values of the SAO type and the SAO class to the entropy encoder 150.

The ALF filtering unit 134 performs filtering by using an ALF filter. The ALF filter is a filter to compensate for the value of the current pixel by using a compensation value determined by calculating the value of the neighboring pixel adjacent to the current pixel of which pixel value is to be compensated for, and a filter coefficient with respect to the neighboring pixel. The ALF filtering unit 134 may determine a shape, a size, and a coefficient of the ALF filter to be applied to the current pixel. The ALF filtering unit 134 may apply the ALF filter to the current pixel by using the determined shape, size, and coefficient of the ALF filter. The ALF filtering unit 134 may deliver, to the encoder 101, the reconstructed video to which the ALF filter has been applied. The encoder 101 may perform encoding on the input video by predicting the input original video by using the reconstructed video to which the ALF filter has been applied. For example, the video encoding apparatus 100 may perform inter prediction on an encoding-target picture by using a reconstructed picture to which the ALF filter has been applied, thereby performing encoding on the original video.

The entropy encoder 150 may entropy encode a syntax component generated by encoding a video and may generate it as a bitstream. The entropy encoder 150 may also entropy encode an SAO filter parameter and an ALF filter parameter and may generate them as the bitstream.

The SAO filter parameter and the ALF filter parameter according to an embodiment may be divided to a parameter to be entropy encoded based on a context and a parameter to be entropy encoded according to a bypass mode, according to an entropy encoding method.

A context-based entropy encoding method may be performed as a series of operations including a binarization operation of transforming a symbol such as the SAO filter parameter to the bitstream, and an arithmetic encoding operation of performing context-based arithmetic encoding on the bitstream. Context adaptive binary arithmetic coding (CABAC) is widely used as an arithmetic encoding method of performing the context-based arithmetic encoding. According to context-based arithmetic encoding and decoding, respective bits of a symbol bitstream are respective bins of a context, and locations of the respective bits may be mapped to bin indexes. A length of the bitstream, i.e., a length of the bins, may be changed according to a value of the symbol. For the context-based arithmetic encoding and decoding, probability modeling based on a context of the symbol is required.

Context-based probability modeling may be performed, provided that an encoding bit of a current symbol is probabilistically predicted, based on previously-encoded symbols. For the context-based probability modeling, a context of each bit location of the symbol bitstream, e.g., the context of each bin index, is required to be newly updated. In this regard, the probability modeling refers to a procedure of analyzing a probability that 0 or 1 occurs in each bin. A procedure of updating the context by applying a result of analyzing a probability according to bits of symbols of a new block to the context so far may be repeated in each block.

When the probability modeling is repeated, a probability model in which an occurrence probability is matched with each bin may be determined.

Therefore, an operation of selecting and outputting a code corresponding to a current context is performed on each bit of a binarized bitstream of current symbols, by taking into account a context-based probability model, context-based entropy encoding may be performed.

The operation of determining the context-based probability model for each bin of a symbol for the context-based entropy encoding requires high computation and high computation time. An entropy encoding operation according to the bypass mode refers to an entropy encoding operation using a probability model without consideration of the context of the symbol.

When the SAO filter and the ALF filter are applied as described above, entropy encoding has to be delayed until the SAO filter parameter and the ALF filter parameter are determined for encoding the SAO filter parameter and the ALF filter parameter. Therefore, when the SAO filtering unit 132 and the ALF filtering unit 134 are embodied as hardware, an entropy encoding operation for generating a bitstream has to be postponed until an operation of determining the SAO filter parameter and the ALF filter parameter is completed, and a plurality of pieces of information therefor are buffered. For example, prediction information PUINFO, transform information TUINFO, or the like that are syntax elements to be entropy encoded are stored in the data buffers 192, 194, and 196 until the SAO filter parameter and the ALF filter parameter are determined to be entropy encoded. Therefore, inefficiency may occur in a circuit size and power consumption.

In order to solve the aforementioned problems, the encoding apparatus 100 according to an embodiment may predict the SAO filter parameter and the ALF filter parameter before the deblocking filtering is performed, and may entropy encode the predicted filter parameters, so that the inefficiency in the circuit size and power consumption due to the SAO encoding may be improved.

Figure 2A:
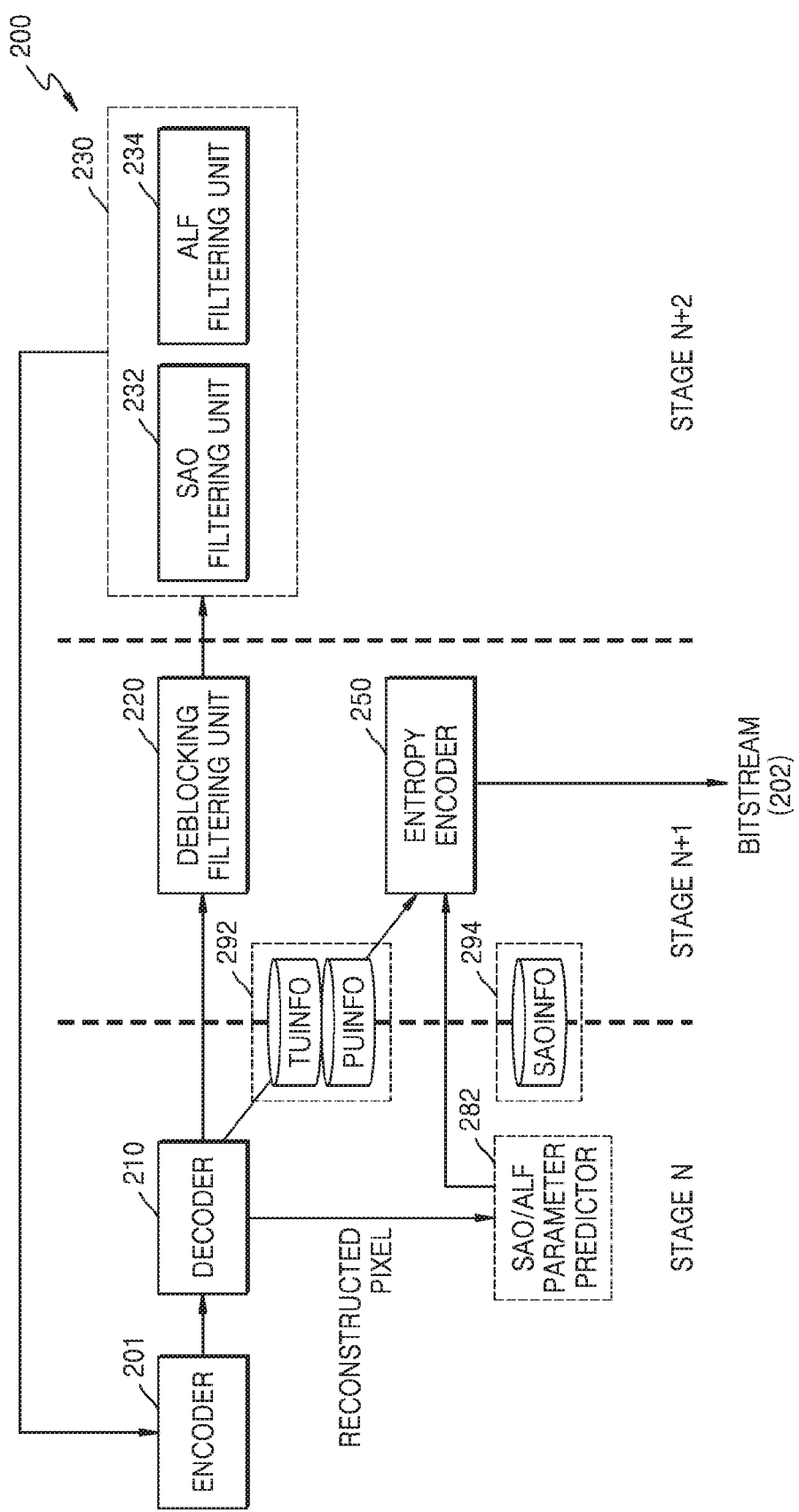
FIGS. 2A and 2B illustrate an encoding apparatus that performs in-loop filtering and an encoding operation, according to an embodiment of the present disclosure.

FIG. 2A is a diagram for describing a concept of an encoding operation of performing in-loop filtering, according to an embodiment of the present disclosure.

An encoding apparatus 200 according to an embodiment of the present disclosure includes an encoder 201, a decoder 210, a deblocking filtering unit 220, a SAO filtering unit 232, an ALF filtering unit 234, an entropy encoder 250, a SAO/ALF parameter predictor 282, and a plurality of data buffers 292 and 294. Hereinafter, a configuration different from the encoding apparatus 100 described with reference to FIG. 1 will now be described.

The SAO/ALF parameter predictor 282 predicts SAO and ALF filter parameters by using data of a reconstructed video generated by a decoder. For example, the SAO/ALF parameter predictor 282 may predict the SAO filter parameter or the ALF filter parameter by using a pixel value of the reconstructed video received from the decoder 210.

The reconstructed video data received from the decoder 210 is video data before a deblocking filter is applied thereto. The SAO filter parameter or the ALF filter parameter which is predicted based on the video data before the deblocking filter is applied thereto may have a filter effect lower than a SAO filter parameter or an ALF filter parameter which is calculated with respect to reconstructed video data to which the deblocking filter is applied. The SAO/ALF parameter predictor 282 may predict deblocking processing on the reconstructed video and may predict a SAO filter parameter or an ALF filter parameter by using a pixel value of the reconstructed video which is predicted to be a resultant generated by the deblocking filter.

For example, the SAO/ALF parameter predictor 282 may predict the SAO filter parameter by predicting an SAO type, an SAO class, and an offset value of a current block by using the reconstructed video data before the deblocking filter is applied thereto. A well-know method may be used as a method of determining the SAO type, the SAO class, and the offset value. The SAO type may indicate whether to apply an SAO filter to the current block, or if applied, the SAO type may indicate whether a class type of a pixel value of the current block is an edge type or a band type. The SAO class may indicate an edge direction according to the edge type or a band range according to the band type. The offset value may indicate an average of difference values between reconstructed pixels included in an SAO category and original pixels.

The SAO/ALF parameter predictor 282 may predict the ALF filter parameter by predicting whether to apply an ALF filter to the current block, a shape of the ALF filter to be applied to the current block, a size of the ALF filter, and/or a coefficient used in the ALF filter by using the reconstructed video data before the deblocking filter is applied thereto. A well-know method may be used as a method of determining whether to apply the ALF filter, the shape of the ALF filter to be applied to the current block, the size of the ALF filter, and/or the coefficient used in the ALF filter.

The SAO/ALF parameter predictor 282 delivers the predicted SAO filter parameter to the SAO filtering unit 232. Then, the SAO/ALF parameter predictor 282 may deliver the predicted ALF filter parameter to the ALF filtering unit 234. Afterward, the SAO/ALF parameter predictor 282 may deliver the predicted SAO filter parameter and ALF filter parameter to the entropy encoder 250.

The entropy encoder 250 may generate a bitstream by entropy encoding the SAO filter parameter and/or the ALF filter parameter received from the SAO/ALF parameter predictor 282, and encoded data received from an encoder. In the present embodiment, since the SAO filter parameter and the ALF filter parameter are predicted before deblocking filtering is performed, the SAO filter parameter and the ALF filter parameter may be entropy encoded before the deblocking filtering is performed. Accordingly, a waiting time of a plurality of items of data to be entropy encoded is decreased so that the plurality of items of data to be entropy encoded may be further rapidly deleted from a data buffer.

Figure 2B:
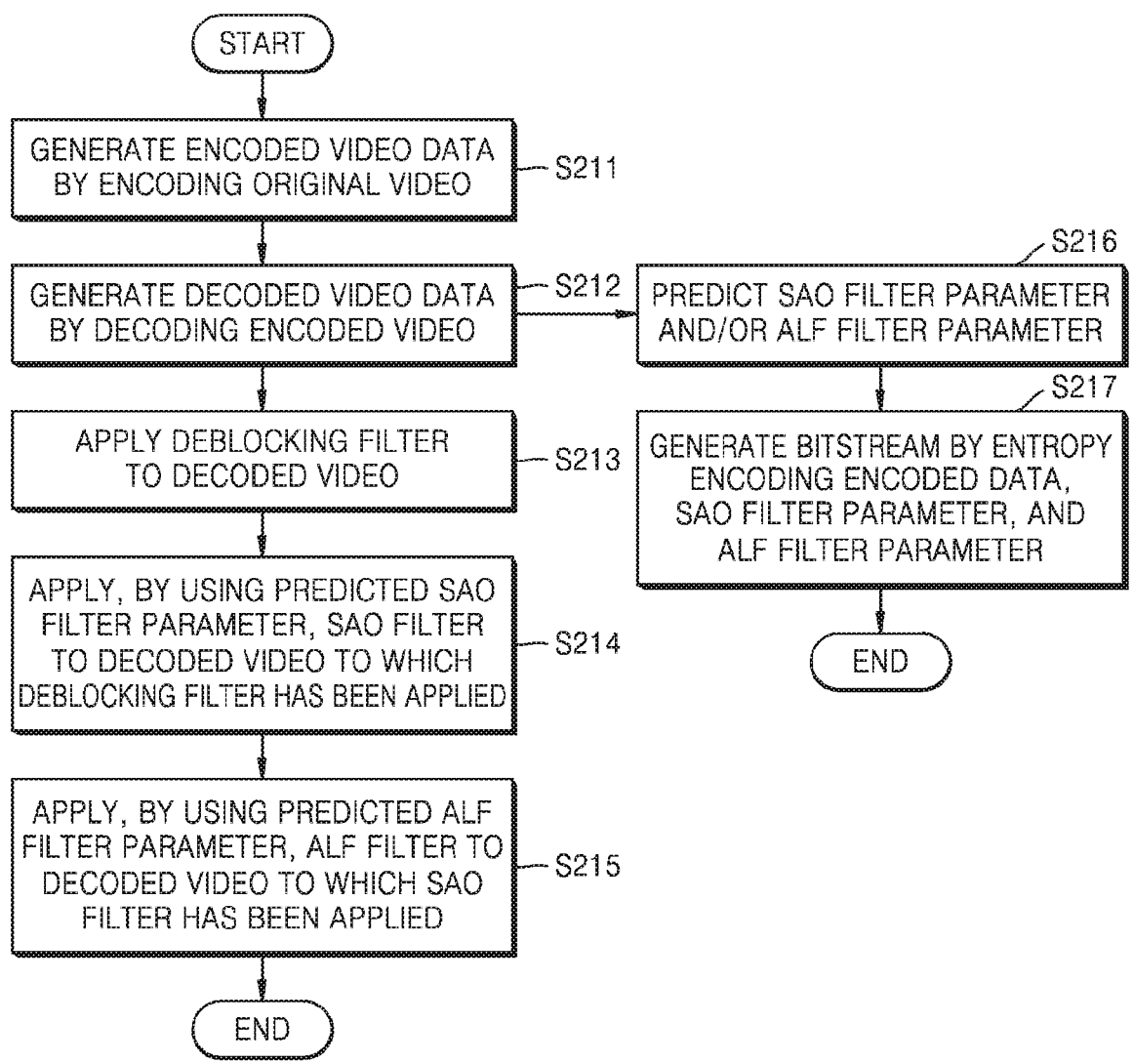

An encoding method performed by the encoding apparatus 200 according to an embodiment of the present disclosure described with reference to FIG. 2A will now be described with reference to FIG. 2B.

First, the encoding apparatus 200 according to an embodiment of the present disclosure may generate encoded video data by encoding an original video (S211). The encoding apparatus 200 may perform video encoding by encoding the original video to picture units. The encoding apparatus 200 may encode a picture to block units. The block units may be coding block units having a tree structure which are split from a largest coding block unit of the picture. The encoding apparatus 200 may encode the picture to coding units having a tree structure which are split from a largest coding unit.

Next, the encoding apparatus 200 according to an embodiment of the present disclosure may generate decoded video data by decoding the encoded video (S212). The encoding apparatus 200 may perform video decoding by decoding the encoded video to picture units. The encoding apparatus 200 may encode a picture to block units. The encoding apparatus 200 may decode the picture to coding units having a tree structure which are split from a largest coding unit.

Next, the encoding apparatus 200 according to an embodiment of the present disclosure may apply a deblocking filter to the decoded video (S213). The encoding apparatus 200 may apply the deblocking filter to each block unit of the picture of the decoded video. For example, the encoding apparatus 200 may apply the deblocking filter along each of rows determined from a height value of the block unit of the picture, and may apply the deblocking filter along columns distinguished therebetween by a width value of the block unit of the picture.

The encoding apparatus 200 according to an embodiment of the present disclosure may predict the SAO filter parameter and/or the ALF filter parameter, independently from applying deblocking filtering (S216).

As described above, the encoding apparatus 200 may predict the SAO filter parameter and the ALF filter parameter by using the video data reconstructed before the deblocking filtering is performed.

Next, the encoding apparatus 200 according to an embodiment of the present disclosure may generate a bitstream by entropy encoding the encoded data, the SAO filter parameter, and the ALF filter parameter (S217).

When prediction is performed on the SAO filter parameter, the encoding apparatus 200 according to an embodiment of the present disclosure may apply the SAO filter to the decoded video to which the deblocking filter has been applied, by using the predicted SAO filter parameter (S214).

Next, when prediction is performed on the ALF filter parameter, the encoding apparatus 200 according to an embodiment of the present disclosure may apply an ALF filter to the decoded video to which the SAO filter has been applied, by using the predicted ALF filter parameter (S215).

Figure 3A:
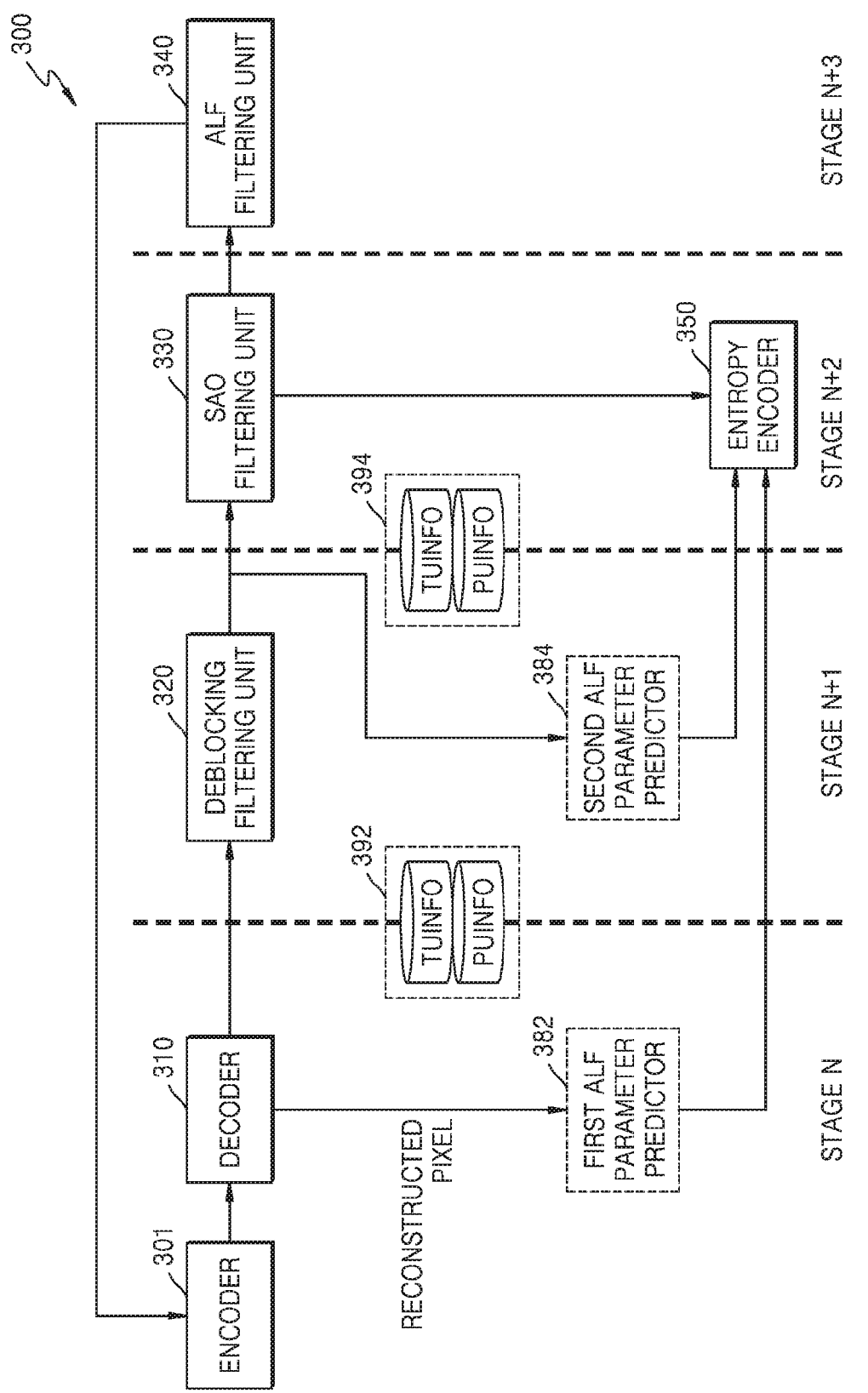
FIGS. 3A through 3C illustrate an encoding apparatus that performs in-loop filtering and an encoding operation, according to an embodiment of the present disclosure.

FIG. 3A is a diagram for describing a concept of an encoding operation of performing in-loop filtering, according to an embodiment of the present disclosure.

An encoding apparatus 300 according to an embodiment of the present disclosure includes an encoder 301, a decoder 310, a deblocking filtering unit 320, a SAO filtering unit 330, an ALF filtering unit 340, an entropy encoder 350, a first ALF parameter predictor 382, and a plurality of data buffers 392 and 394. Hereinafter, a configuration different from the encoding apparatus 200 described with reference to FIG. 2A will now be described. The first ALF parameter predictor 382 predicts an ALF filter parameter by using data of a reconstructed video generated by a decoder. For example, the first ALF parameter predictor 382 may predict the ALF filter parameter by using a pixel value of the reconstructed video received from the decoder 310.

The first ALF parameter predictor 382 may deliver the predicted ALF filter parameter to the ALF filtering unit 340. Then, the first ALF parameter predictor 382 may deliver the ALF filter parameter to the entropy encoder 350.

The entropy encoder 350 may generate a bitstream by entropy encoding the ALF filter parameter received from the first ALF parameter predictor 382 and encoded data received from the encoder 301. Since the encoding apparatus 300 predicts, by using the first ALF parameter predictor 382, the ALF filter parameter before deblocking filtering is performed, the encoding apparatus 300 may perform entropy encoding on the ALF filter parameter before the deblocking filtering is performed. Accordingly, a waiting time of a plurality of items of data to be entropy encoded is decreased so that the encoding apparatus 300 may further rapidly delete, from a data buffer, the plurality of items of data to be entropy encoded.

The first ALF parameter predictor 382 may be replaced with a second ALF parameter predictor 384, or the first ALF parameter predictor 382 and the second ALF parameter predictor 384 may be arranged together. The reconstructed video data received from the decoder 310 is video data before a deblocking filter is applied thereto. A SAO filter parameter or the ALF filter parameter which is predicted with respect to the video data before the deblocking filter is applied thereto may have a filter effect lower than a SAO filter parameter or an ALF filter parameter which is calculated with respect to reconstructed video data to which the deblocking filter is applied. Therefore, the encoding apparatus 300 according to an embodiment of the present disclosure may predict the ALF filter parameter by using the second ALF parameter predictor 384 without using the first ALF parameter predictor 382. The second ALF parameter predictor 384 performs prediction on the ALF filter parameter by using the reconstructed video data to which the deblocking filter is applied. The encoding apparatus 300 may select, according to a preset method, which predictor from among the first ALF parameter predictor 382 and the second ALF parameter predictor 384 is to be used in predicting the ALF filter parameter. For example, the encoding apparatus 300 may determine which predictor from among the first ALF parameter predictor 382 and the second ALF parameter predictor 384 is to be used in predicting the ALF filter parameter, according to a degree of a block artifact occurring in a current block to which an ALF filter is to be applied or a degree of a block artifact of a current picture to which the ALF filter is to be applied.

The second ALF parameter predictor 384 may deliver the predicted ALF filter parameter to the ALF filtering unit 340. Then, the second ALF parameter predictor 384 may deliver the ALF filter parameter to the entropy encoder 350.

The entropy encoder 350 may generate a bitstream by entropy encoding the ALF filter parameter received from the second ALF parameter predictor 384 and encoded data received from the encoder 301. Since the ALF filter parameter is predicted by using the second ALF parameter predictor 384 before SAO filtering is performed, entropy encoding on the ALF filter parameter may be performed before the SAO filtering is performed. Accordingly, a waiting time of a plurality of items of data to be entropy encoded is decreased so that the encoding apparatus 300 may further rapidly delete, from the data buffer, the plurality of items of data to be entropy encoded.

Figure 3B:
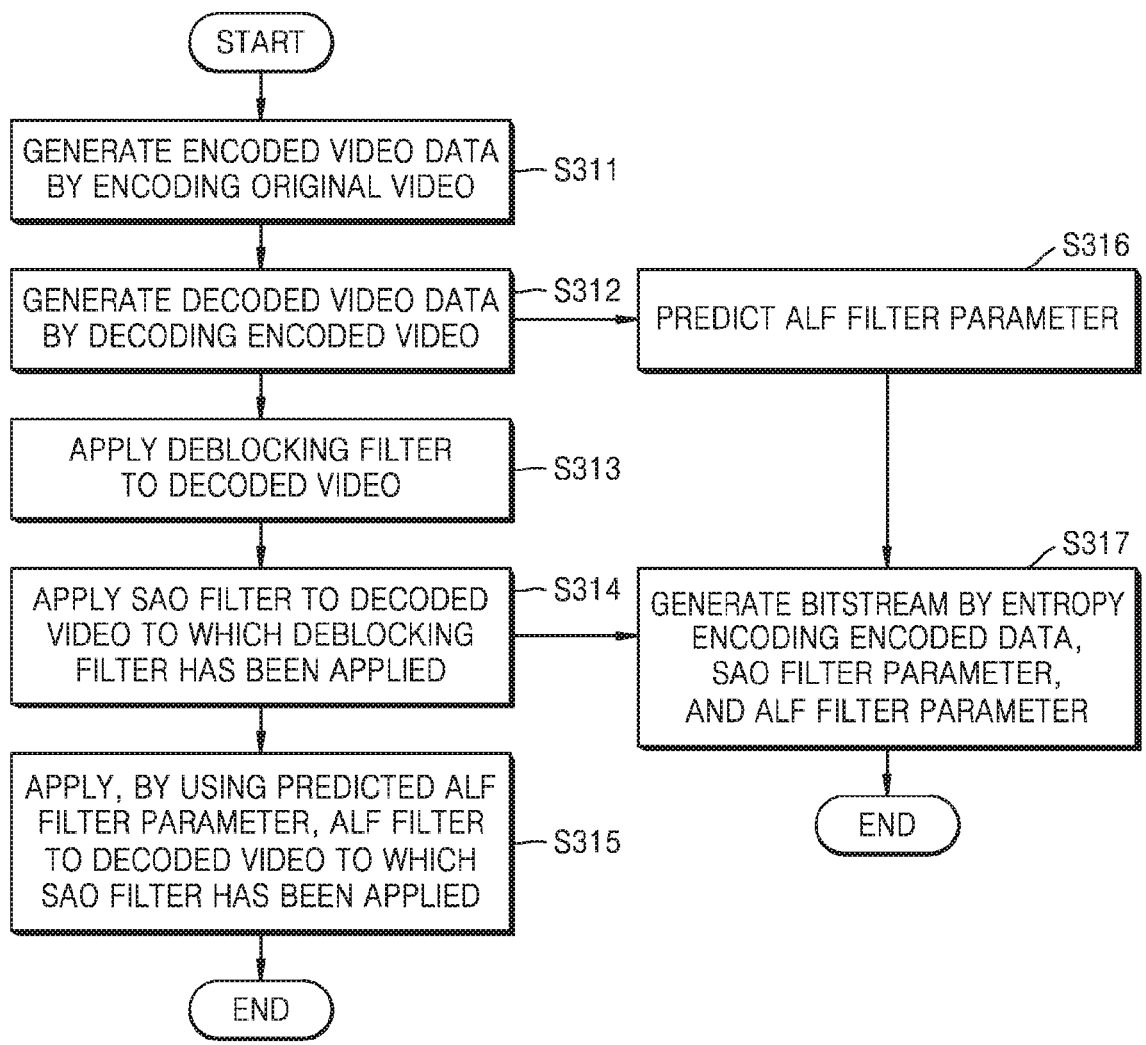

An encoding method of performing encoding by predicting an ALF filter parameter before deblocking filtering is performed, the encoding method being performed by the encoding apparatus 200 according to an embodiment of the present disclosure described with reference to FIG. 3A, will now be described with reference to FIG. 3B. Descriptions overlapping the encoding method described with reference to FIG. 2B are not provided here.

First, the encoding apparatus 300 according to an embodiment of the present disclosure may generate encoded video data by encoding an original video (S311).

Next, the encoding apparatus 300 according to an embodiment of the present disclosure may generate decoded video data by decoding the encoded video (S312).

Next, the encoding apparatus 300 according to an embodiment of the present disclosure may apply a deblocking filter to the decoded video (S313).

The encoding apparatus 300 according to an embodiment of the present disclosure may predict the ALF filter parameter, independently from applying deblocking filtering (S316). As described above, the encoding apparatus 300 may predict the ALF filter parameter by using video data reconstructed before the deblocking filtering is performed.

The encoding apparatus 300 according to an embodiment of the present disclosure may apply an SAO filter to the decoded video to which a deblocking filter has been applied, independently from predicting the ALF filter parameter (S314).

Next, when prediction is performed on the ALF filter parameter, the encoding apparatus 300 according to an embodiment of the present disclosure may apply an ALF filter to the decoded video to which the SAO filter has been applied, by using the predicted ALF filter parameter (S315).

In addition, independently from applying the ALF filter, the encoding apparatus 300 according to an embodiment of the present disclosure may generate a bitstream by entropy encoding the encoded data, a SAO filter parameter, and the predicted ALF filter parameter (S317).

Figure 3C:
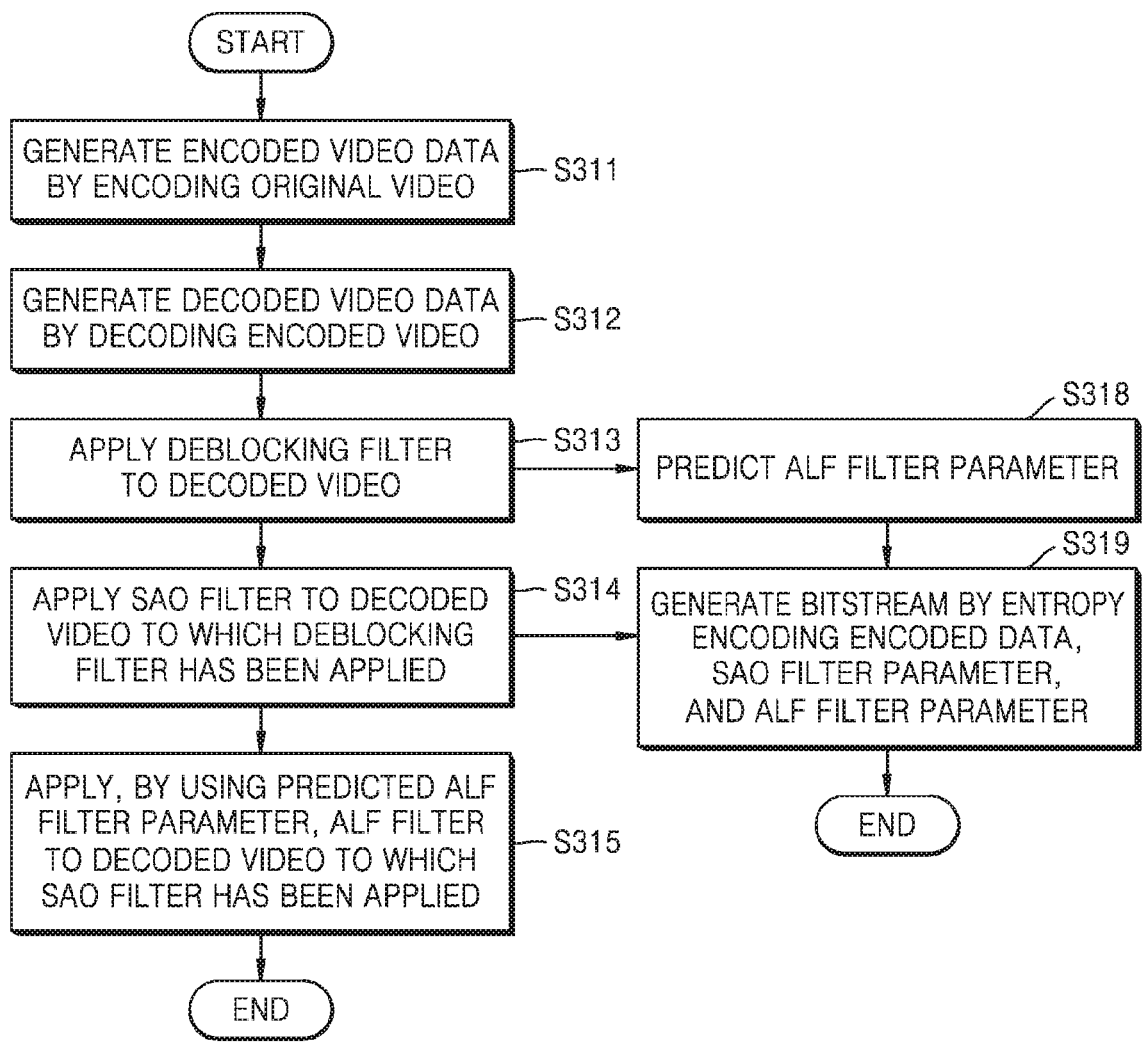

An encoding method of performing encoding by predicting the ALF filter parameter before SAO filtering is performed, the encoding method being performed by the encoding apparatus 200 according to an embodiment of the present disclosure described with reference to FIG. 3A, will now be described with reference to FIG. 3C. Descriptions overlapping the encoding method described with reference to FIG. 2B are not provided here.

First, the encoding apparatus 300 according to an embodiment of the present disclosure may generate the encoded video data by encoding the original video (S311).

Next, the encoding apparatus 300 according to an embodiment of the present disclosure may generate the decoded video data by decoding the encoded video (S312).

Next, the encoding apparatus 300 according to an embodiment of the present disclosure may apply the deblocking filter to the decoded video (S313).

The encoding apparatus 300 according to an embodiment of the present disclosure may apply the SAO filter to the decoded video to which the deblocking filter has been applied (S314).

The encoding apparatus 300 according to an embodiment of the present disclosure may predict the ALF filter parameter, independently from applying the SAO filter (S318). As described above, the encoding apparatus 300 may predict the ALF filter parameter by using video data reconstructed before the SAO filter is applied thereto.

Next, when prediction is performed on the ALF filter parameter, the encoding apparatus 300 according to an embodiment of the present disclosure may apply an ALF filter to the decoded video to which the SAO filter has been applied, by using the predicted ALF filter parameter (S315).

In addition, independently from applying the ALF filter, the encoding apparatus 300 according to an embodiment of the present disclosure may generate a bitstream by entropy encoding the encoded data, the SAO filter parameter, and the predicted ALF filter parameter (S319).

Figure 4A:
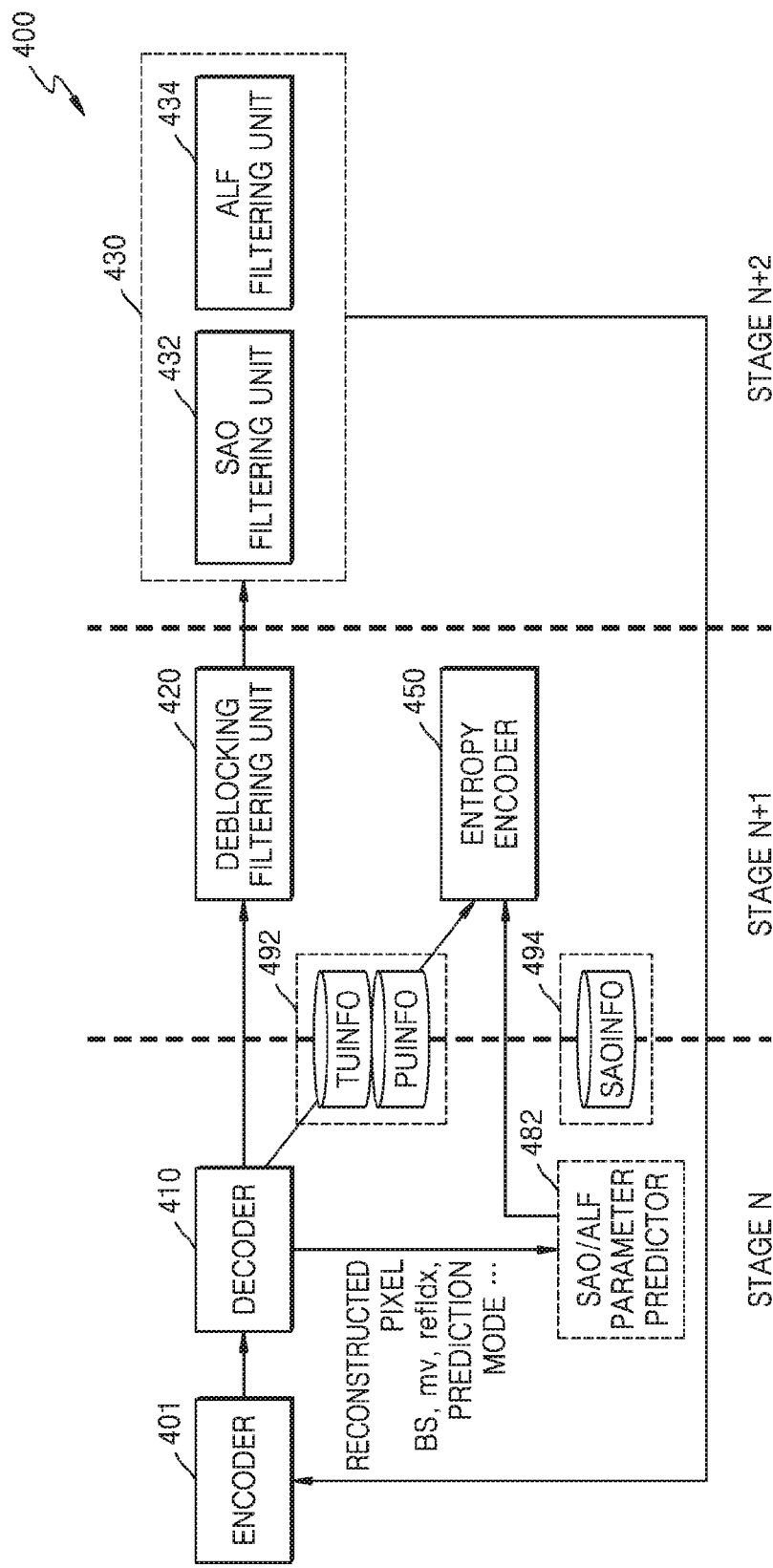
FIGS. 4A and 4B illustrate an encoding apparatus that performs in-loop filtering and an encoding operation, according to an embodiment of the present disclosure.

FIG. 4A is a diagram for describing a concept of an encoding operation of performing in-loop filtering, according to an embodiment of the present disclosure. An encoding apparatus 400 according to an embodiment of the present disclosure includes an encoder 401, a decoder 410, a deblocking filtering unit 420, a SAO filtering unit 432, an ALF filtering unit 434, an entropy encoder 450, a SAO/ALF parameter predictor 482, and a plurality of data buffers 492 and 494. Hereinafter, a configuration different from the encoding apparatus 100 described with reference to FIG. 2A will now be described.

The SAO/ALF parameter predictor 482 predicts SAO and ALF filter parameters by using data of a reconstructed video generated by a decoder. The SAO/ALF parameter predictor 482 according to the embodiment of FIG. 4A may predict the SAO filter parameter or the ALF filter parameter by using prediction information of the reconstructed video received from the decoder 410.

Examples of the prediction information include a reconstructed pixel value, boundary strength with respect to applying a deblocking filter, a motion vector generated by performing inter prediction, and inter/intra mode information.

For example, the prediction information may include information that is obtainable from a block unit before a current filter is applied to the block unit. For example, the prediction information may include residue data, a motion vector in inter prediction, an intra mode in intra prediction, and the like which are of a coding unit that is currently encoded.

The SAO/ALF parameter predictor 482 may predict an SAO filter parameter of a current block, based on the obtained prediction information. In this regard, since the prediction information is obtained before deblocking is performed, prediction with respect to the SAO filter parameter may be performed independently from performing the deblocking. The SAO/ALF parameter predictor 482 may predict the SAO filter parameter, based on a pixel value, residue data, a motion vector in inter prediction, an intra mode in intra prediction, and the like which are of a coding unit that is currently encoded and are reconstructed before deblocking is performed. For example, an SAO type of the current block is predicted to be an edge type, based on the motion vector in the inter prediction and the intra mode in the intra prediction, and may predict a SAO class of the predicted edge type.

The SAO/ALF parameter predictor 482 delivers the predicted SAO filter parameter to the SAO filtering unit 432. Then, the SAO/ALF parameter predictor 482 may deliver the predicted ALF filter parameter to the ALF filtering unit 434. The SAO/ALF parameter predictor 482 may deliver the predicted SAO filter parameter and ALF filter parameter to the entropy encoder 450.

The entropy encoder 450 may generate a bitstream by entropy encoding the SAO filter parameter and/or the ALF filter parameter received from the SAO/ALF parameter predictor 482 and encoded data received from the encoder. In the present embodiment, since the SAO filter parameter and the ALF filter parameter are predicted before deblocking filtering is performed, the SAO filter parameter and the ALF filter parameter may be entropy encoded before the deblocking filtering is performed. Accordingly, a waiting time of a plurality of items of data to be entropy encoded is decreased so that the entropy encoder 400 may further rapidly delete, from a data buffer, the plurality of items of data to be entropy encoded.

Figure 4B:
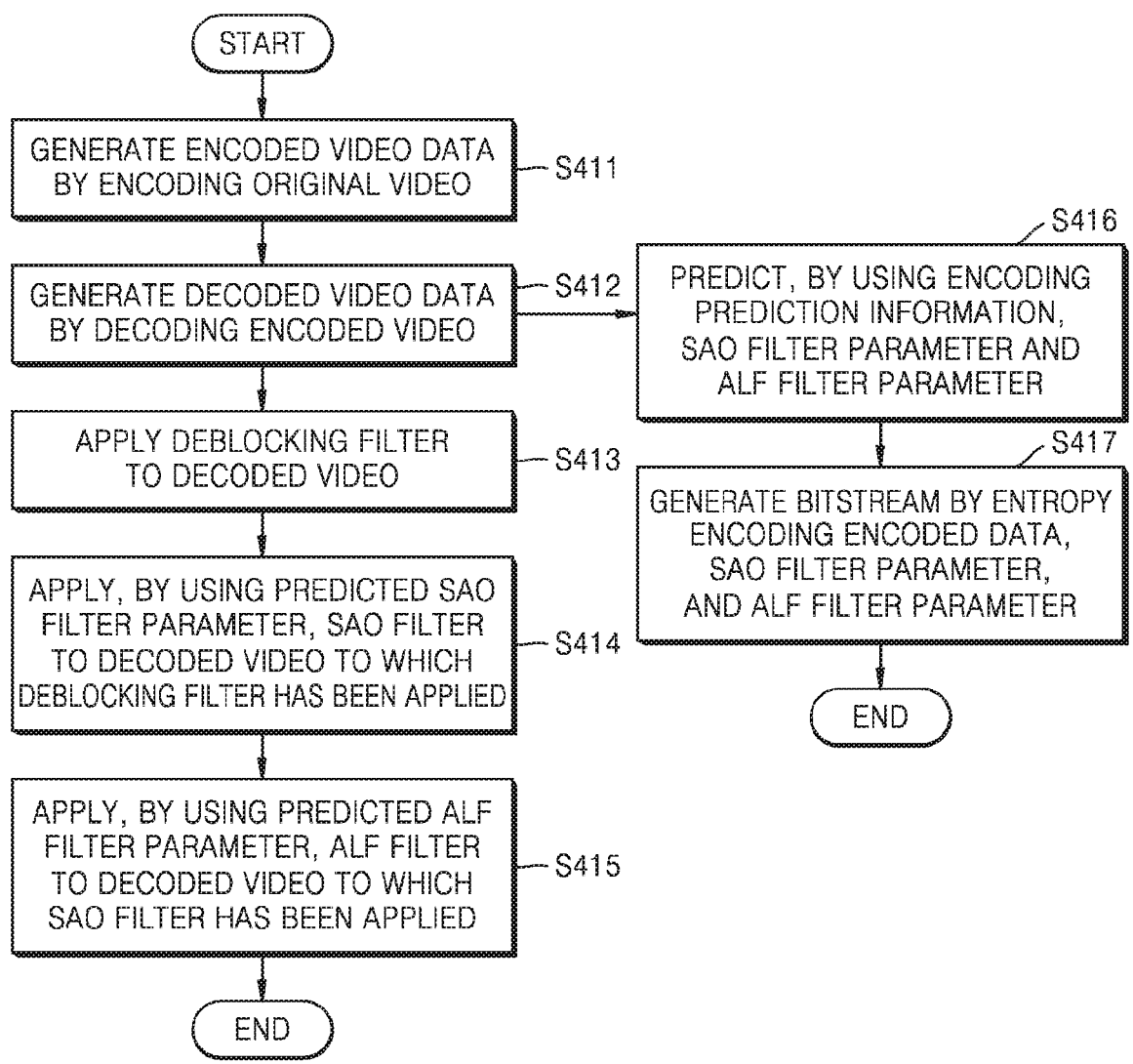

An encoding method performed by the encoding apparatus 400 according to an embodiment of the present disclosure described with reference to FIG. 4A will now be described with reference to FIG. 4B. Hereinafter, descriptions that are different from those of the encoding method described with reference to FIG. 2B are provided.

First, the encoding apparatus 400 according to an embodiment of the present disclosure may generate encoded video data by encoding an original video (S411).

Next, the encoding apparatus 400 according to an embodiment of the present disclosure may generate decoded video data by decoding the encoded video (S412).

Next, the encoding apparatus 400 according to an embodiment of the present disclosure may apply a deblocking filter to the decoded video (S413).

The encoding apparatus 400 according to an embodiment of the present disclosure may predict, by using encoding prediction information, the SAO filter parameter and/or the ALF filter parameter, independently from applying the deblocking filtering (S416). As described above, the encoding apparatus 400 may predict the SAO filter parameter and the ALF filter parameter by using information of encoding with respect to the video data, the encoding being performed before the deblocking filtering is performed.

Next, the encoding apparatus 400 according to an embodiment of the present disclosure may generate a bitstream by entropy encoding the encoded data, the SAO filter parameter, and the ALF filter parameter (S417).

When prediction is performed on the SAO filter parameter, the encoding apparatus 400 according to an embodiment of the present disclosure may apply a SAO filter to the decoded video to which the deblocking filter has been applied, by using the predicted SAO filter parameter (S414).

Next, when prediction is performed on the ALF filter parameter, the encoding apparatus 400 according to an embodiment of the present disclosure may apply an ALF filter to the decoded video to which the SAO filter has been applied, by using the predicted ALF filter parameter (S415).

Hereinafter, with reference to FIGS. 4C through 4E, a method of encoding a SAO filter parameter will now be described.

In order to apply a SAO filter, the encoding apparatus 400 according to an embodiment of the present disclosure determines the SAO filter parameter including a SAO type, a SAO class, and an offset value. Here, the SAO type may indicate whether a class type of a pixel value of a current largest coding unit is an edge type or a band type, the SAO class may indicate an edge direction according to the edge type or a band range according to the band type, and the offset value may indicate difference values between reconstructed pixels included in the SAO class and original pixels.

When the SAO type is determined to be the edge type, an edge class according to the edge direction may be determined to be one of 0°, 90°, 45°, and 135°. In order to determine the edge class, rate distortion (RD)-cost is calculated for the aforementioned four edge classes by applying the RD cost to all pixels included in a largest coding unit. Since the encoding apparatus 400 has to calculate edge offset values of all pixels, circuit embodiment becomes complicated so that logic gats or a code size and power consumption may be increased.

Therefore, the encoding apparatus 400 according to an embodiment of the present disclosure may determine an edge offset parameter by determining the edge class by using information related to directionality of the current largest coding unit to be encoded.

Hereinafter, an example in which the encoding apparatus 400 according to an embodiment of the present disclosure determines the edge offset parameter will now be described. The edge offset parameter according to an embodiment may be determined based on a largest coding unit. The encoding apparatus 400 according to an embodiment may obtain directionality information regarding the current largest coding unit to be encoded from among largest coding units of a video. Here, an obtained direction of an edge may be one of 0°, 90°, 45°, and 135°.

The encoding apparatus 400 may obtain, by using an edge detection algorithm, the directionality information regarding the current largest coding unit to be encoded. For example, the encoding apparatus 400 may detect an edge of a largest coding unit by using the edge detection algorithm such as the Sobel algorithm. In addition, the encoding apparatus 400 may determine directionality information to be one of 0°, 90°, 45°, and 135° by approximating a detected edge direction.

The encoding apparatus 400 may obtain the directionality information by using intra mode information of the current largest coding unit to be encoded. The largest coding unit may consist of a plurality of prediction units. The prediction units may be predicted according to different intra modes. The largest coding unit may be predicted according to one or more intra modes. In this case, the encoding apparatus 400 may calculate a histogram with respect to the intra modes included in the largest coding unit, and may obtain a predetermined intra mode as directionality information, based on the histogram. The encoding apparatus 400 may obtain the directionality information according to the number of times the intra modes occur in the largest coding unit.

The encoding apparatus 400 may obtain directionality information, based on a motion vector of the current largest coding unit to be encoded. The largest coding unit may consist of the plurality of prediction units, thereby having one or more motion vectors. In this case, the encoding apparatus 400 may calculate a histogram with respect to the motion vectors included in the largest coding unit, and may obtain the directionality information, based on the histogram. As another example, the directionality information may be obtained according to a size of the motion vector in the largest coding unit. Also, the directionality information may be determined to be one of 0°, 90°, 45°, and 135° by approximating a direction of the detected motion vector.

The encoding apparatus 400 may determine the edge offset parameter of the current largest coding unit to be encoded, based on the obtained directionality information. In this regard, the determined edge offset parameter may be the aforementioned edge class.

For example, the encoding apparatus 400 may determine the edge class having the same directionality as the obtained direction. That is, when the obtained directionality information indicates 0°, the edge class may be determined to be a horizontal direction.

As another example, the encoding apparatus 400 may determine the edge class having directionality being perpendicular to the direction that is obtained as a result of the edge detection. That is, when the obtained directionality information indicates 0°, the edge class may be determined to be a vertical direction.

The encoding apparatus 400 may perform entropy encoding on the edge offset parameter. For example, the encoding apparatus 400 may perform entropy encoding on the determined edge class. Also, the encoding apparatus 400 may determine an SAO adjustment value, based on the class determined by the encoding apparatus 400, and may perform SAO adjustment.

Figure 4C:
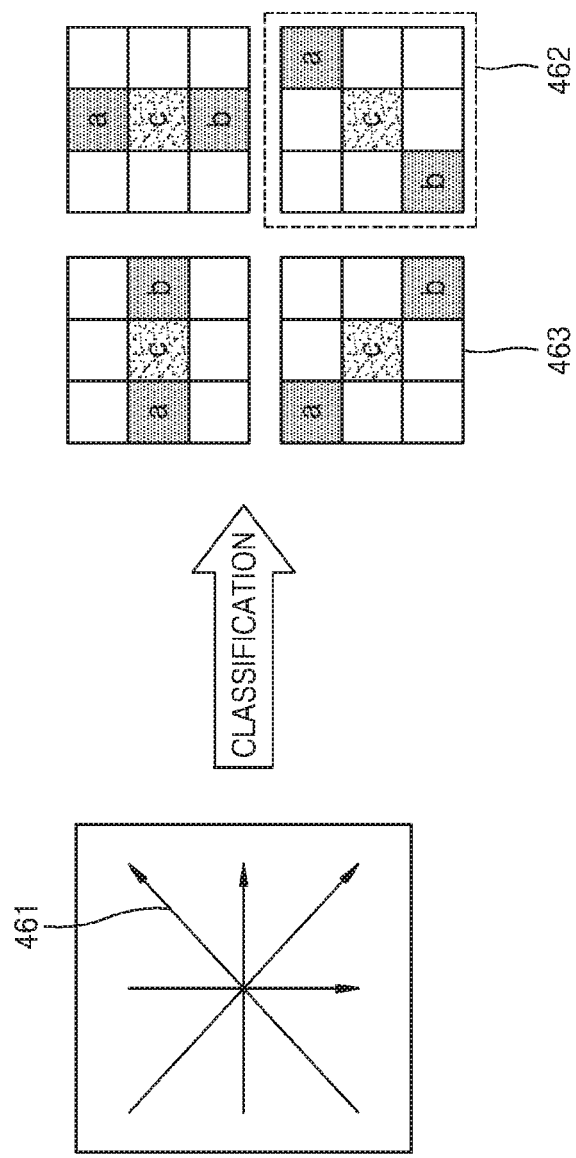

FIG. 4C illustrates an example of a method of encoding a SAO filter parameter for an edge type, according to an embodiment of the present disclosure.

Referring to (a) of FIG. 4C, the encoding apparatus 400 according to an embodiment may obtain, by using the edge detection algorithm, directionality information of an edge of a current largest coding unit to be encoded. In this regard, the encoding apparatus 400 may detect the edge of the largest coding unit by using the edge detection algorithm such as the Sobel algorithm. The encoding apparatus 400 may determine the directionality information to be one of 0°, 90°, 45°, and 135° by approximating a direction of the detected edge. For example, a detected edge 461 may have directionality of 135°.

The encoding apparatus 400 according to an embodiment may determine an edge class with respect to the current largest coding unit to be encoded, based on the obtained directionality information. For example, the encoding apparatus 400 may select an edge class 462 from among four offset classes shown in (b) of FIG. 4C according to a preset method, the edge class 462 having the same directionality as the obtained direction 461. In another embodiment, the encoding apparatus 400 may select an edge class 463 from among the four offset classes shown in (b) of FIG. 4C according to the preset method, the edge class 463 having directionality being perpendicular to the obtained direction 461.

FIG. 4D illustrates another example of the method of encoding the SAO filter parameter for the edge type, according to an embodiment of the present disclosure. Referring to (a) of FIG. 4D, the encoding apparatus 400 according to an embodiment may obtain directionality information by using intra mode information of the current largest coding unit to be encoded. That is, 35 intra modes 464 that a coding unit may have may be approximated to four directions, based on a preset table 465. For example, when an intra mode obtained from the current largest coding unit to be encoded is 8, the encoding apparatus 400 may determine, based on the table 465, that the largest coding unit has directionality in a horizontal direction.

The largest coding unit may consist of a plurality of prediction units, thereby having one or more intra modes. In this case, the encoding apparatus 400 may calculate a histogram with respect to the intra modes included in the largest coding unit, and may obtain a predetermined intra mode as the directionality information, based on the histogram. As another example, the encoding apparatus 400 may obtain the directionality information according to the number of times the intra modes occur in the largest coding unit.

The encoding apparatus 400 according to an embodiment may determine an edge class of the current largest coding unit to be encoded, based on the obtained directionality information. For example, the encoding apparatus 400 may select an edge class 466a from among four offset classes shown in (b) of FIG. 4D according to a preset method, the edge class 466a having the same directionality as an obtained direction (an intra mode 8). In another embodiment, the encoding apparatus 400 may select an edge class 466b from among the four offset classes shown in (b) of FIG. 4D according to the preset method, the edge class 466b having directionality being perpendicular to the obtained direction (the intra mode 8).

Figure 4E:
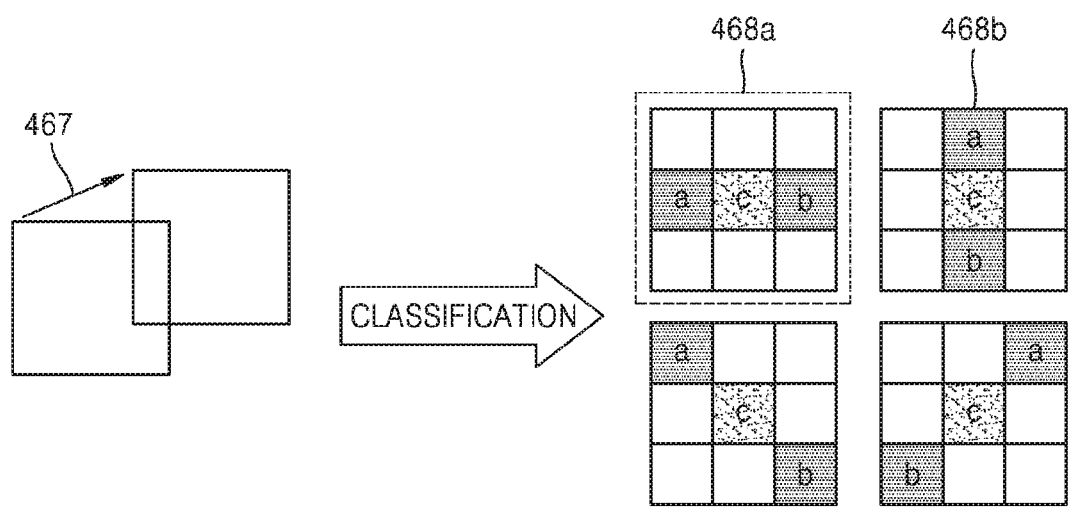

FIG. 4E illustrates another example of the method of encoding the SAO filter parameter for the edge type, according to an embodiment of the present disclosure. Referring to (a) of FIG. 4E, the encoding apparatus 400 according to an embodiment may obtain directionality information, based on a motion vector 467 of a current largest coding unit to be encoded. In this regard, the encoding apparatus 400 determine the directionality information to be one of 0°, 90°, 45°, and 135° by approximating a direction of a detected motion vector. For example, a direction of the motion vector 467 shown in (a) of FIG. 4E may be determined to be 0°.

A largest coding unit may consist of a plurality of prediction units, thereby having one or more motion vectors. In this case, the encoding apparatus 400 may calculate a histogram with respect to the motion vectors included in the largest coding unit, and may obtain the directionality information, based on the histogram. The encoding apparatus 400 may obtain the directionality information according to a size of a motion vector in the largest coding unit.

The encoding apparatus 400 according to an embodiment may determine an edge class of the current largest coding unit to be encoded, based on the obtained directionality information. For example, the encoding apparatus 400 may select an edge class 468a from among four offset classes shown in (b) of FIG. 4E according to a preset method, the edge class 468a having the same directionality as an obtained direction (467). In another embodiment, the encoding apparatus 400 may select an edge class 468b from among the four offset classes shown in (b) of FIG. 4E according to the preset method, the edge class 468b having directionality being perpendicular to the obtained direction (467).

Figure 5A:
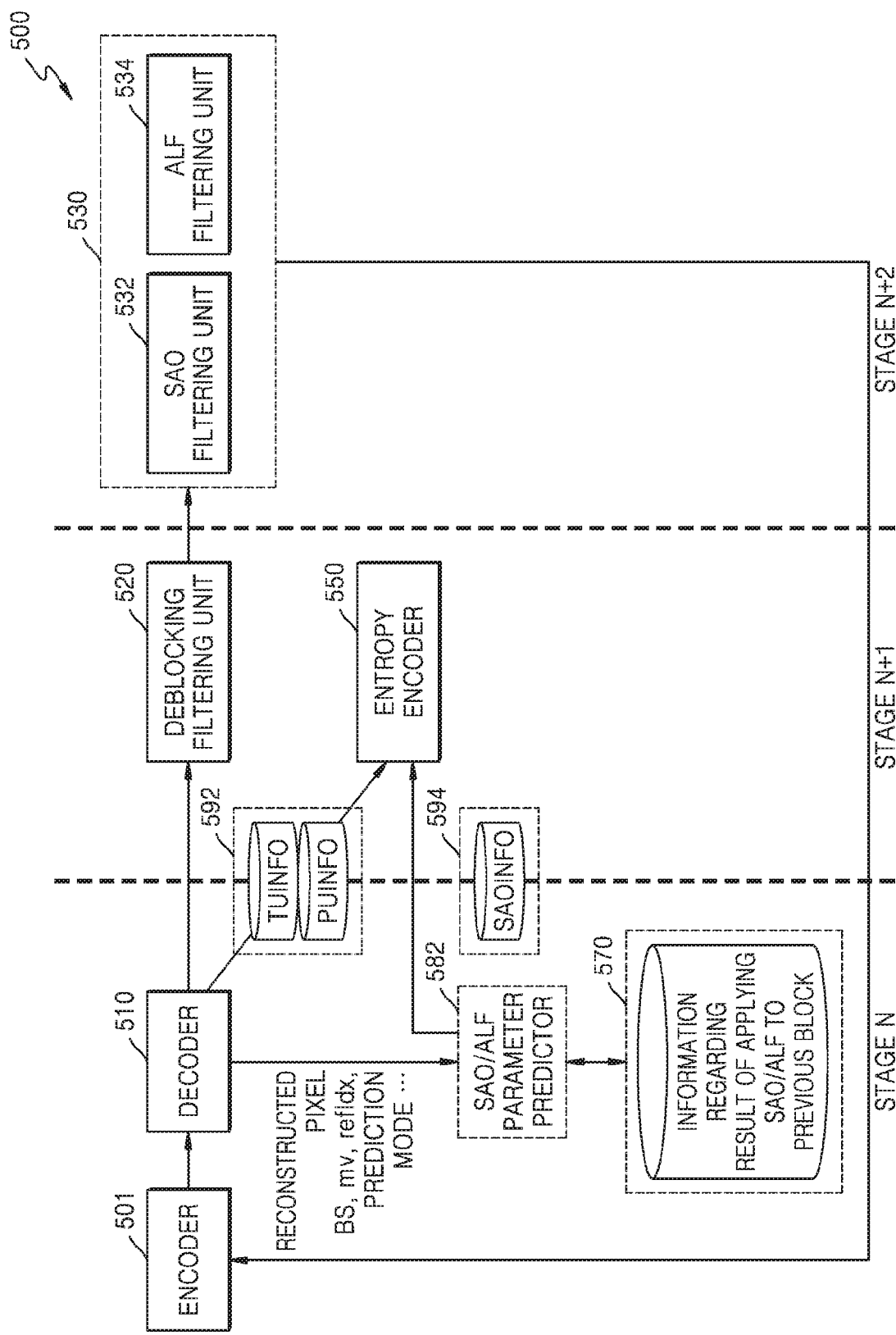
FIGS. 5A and 5B illustrate an encoding apparatus that performs in-loop filtering and an encoding operation, according to an embodiment of the present disclosure.

FIG. 5A is a diagram for describing a concept of an encoding operation of performing in-loop filtering, according to an embodiment of the present disclosure.

An encoding apparatus 500 according to an embodiment of the present disclosure includes an encoder 501, a decoder 510, a deblocking filtering unit 520, a SAO filtering unit 532, an ALF filtering unit 534, an entropy encoder 550, a SAO/ALF parameter predictor 582, and a plurality of data buffers 570, 592, and 594. Hereinafter, a configuration different from the encoding apparatus 200 described with reference to FIG. 2 will now be described.

The SAO/ALF parameter predictor 582 predicts SAO and ALF filter parameters by using data of a reconstructed video generated by a decoder. For example, the SAO/ALF parameter predictor 582 may predict the SAO filter parameter or the ALF filter parameter by using a pixel value of the reconstructed video received from the decoder 510 and/or prediction information of the reconstructed video.

In addition, the SAO/ALF parameter predictor 582 may predict the SAO filter parameter by using a SAO filter parameter generated as a result of performance that was previously performed by a SAO filter. The result of the performance that was previously performed by the SAO filter may be stored in the data buffer 570. For example, the SAO/ALF parameter predictor 582 may use a SAO filter parameter of a previous block as a SAO filter parameter of a current block.

Figure 5B:
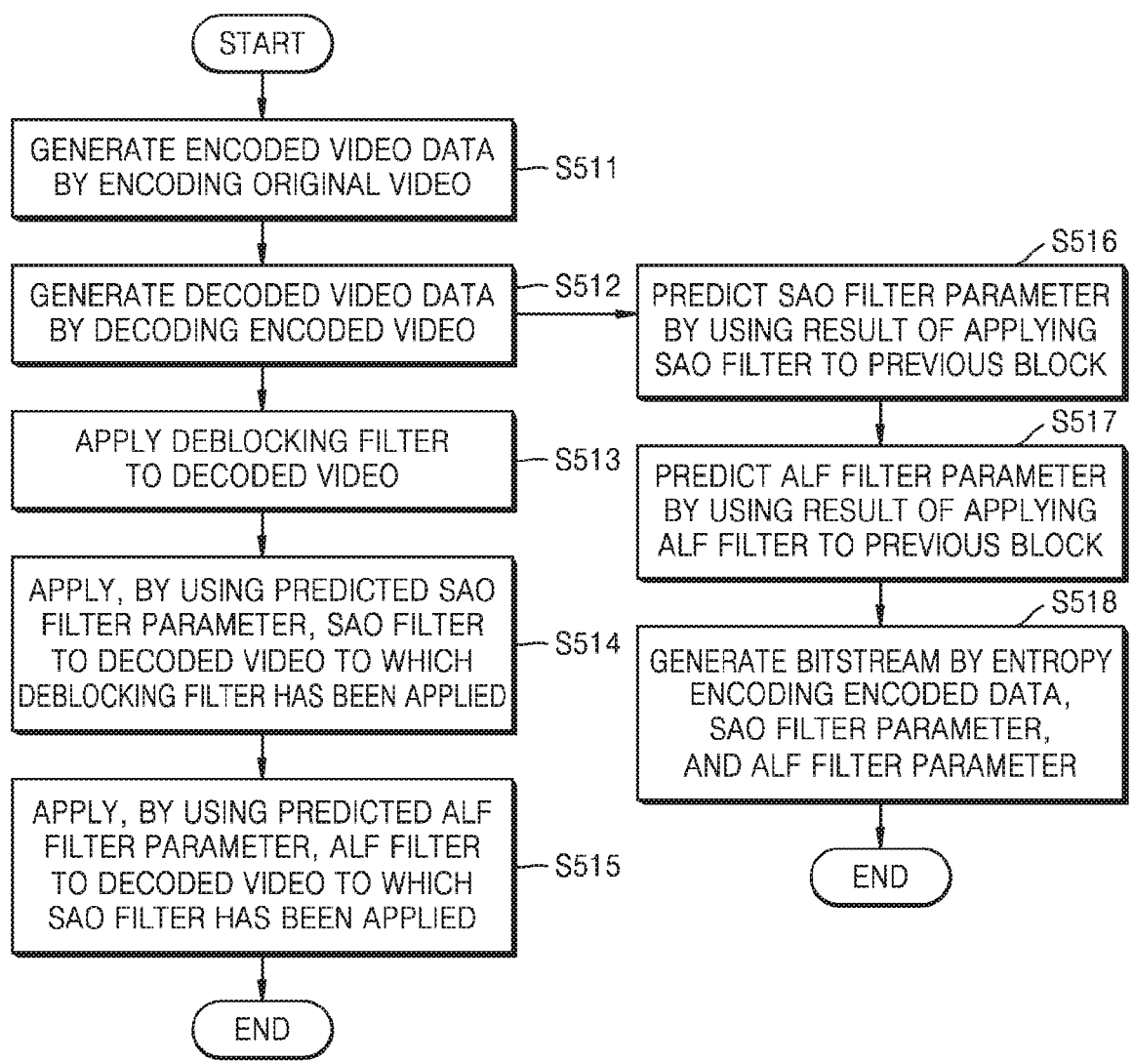
Figure 5C:
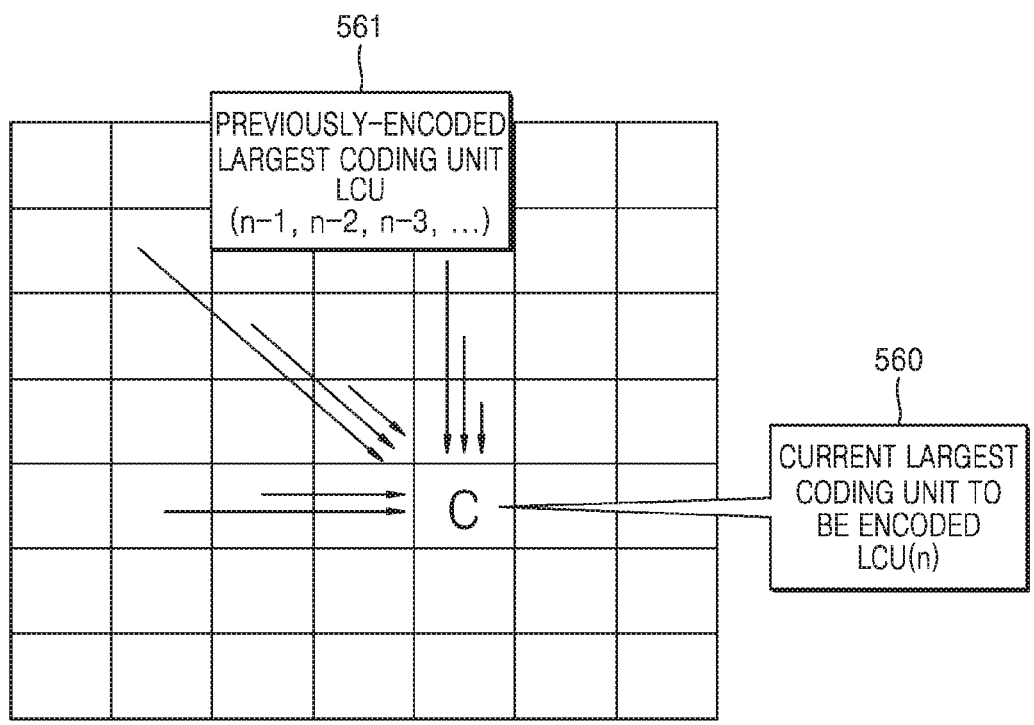
FIGS. 5C and 5D illustrate diagrams related to a method of checking a SAO filter application result or adaptive loop filter (ALF) filter parameter application result with respect to a previous block, the method being performed by a SAO/ALF parameter predictor, according to an embodiment of the present disclosure.
Figure 5D:
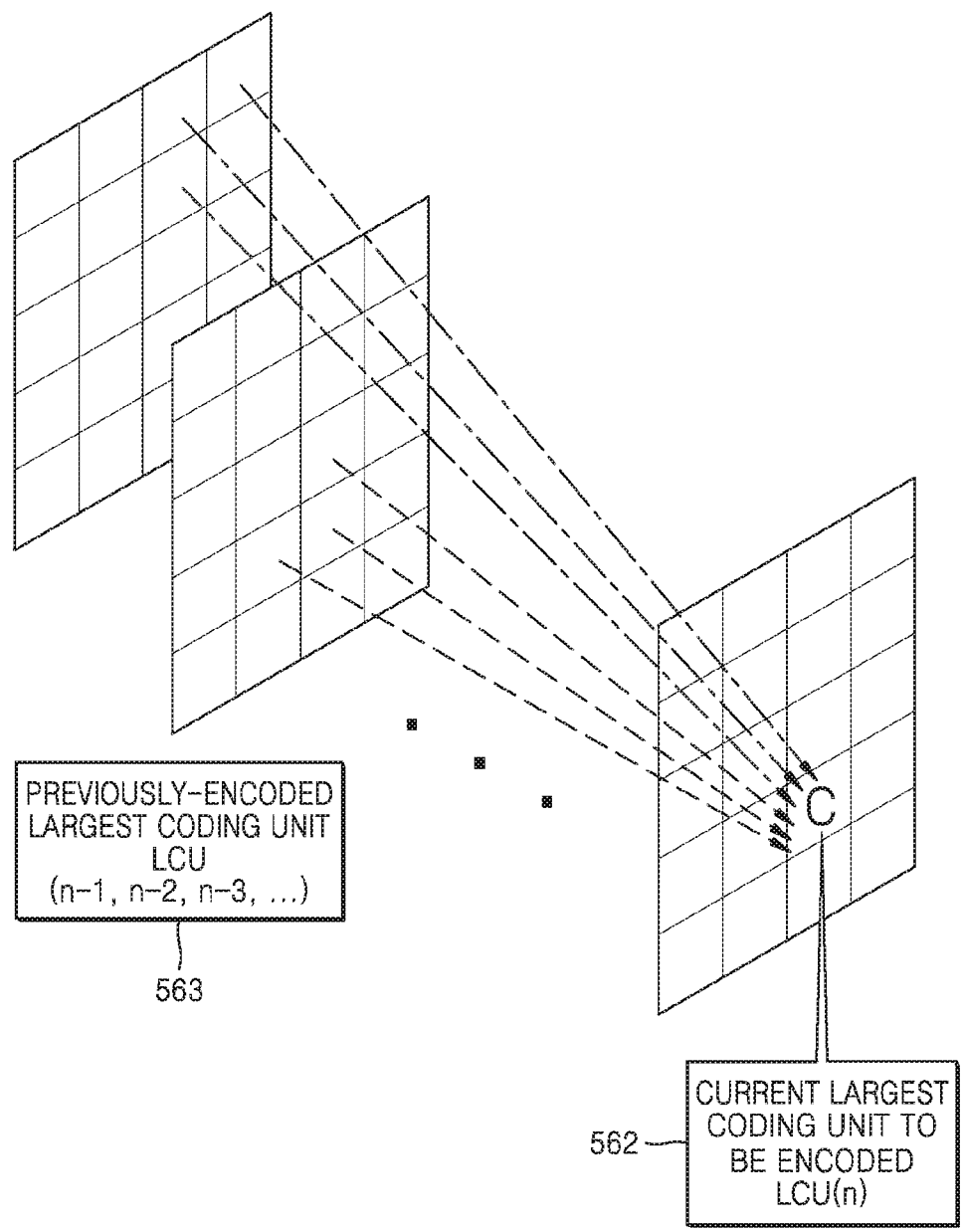

FIGS. 5C and 5D illustrate diagrams related to a method of checking a SAO filter application result or ALF filter parameter application result with respect to a previous block, the method being performed by the SAO/ALF parameter predictor 582, according to an embodiment of the present disclosure. The previous block includes a spatially-neighboring block located in a same picture where the current block is located, as illustrated in FIG. 5C, and a temporally-neighboring block having time information different from the picture where the current block is located, as illustrated in FIG. 5D.

For example, the SAO/ALF parameter predictor 582 may predict a SAO filter parameter of a current largest coding unit to be encoded, from a different coding unit that was previously encoded. For example, in order to obtain the SAO filter parameter, the SAO/ALF parameter predictor 582 may use a different largest coding unit having a temporal or spatial correlation with the current largest coding unit. The SAO/ALF parameter predictor 582 may predict a SAO filter parameter of the previously-encoded largest coding unit to be the SAO filter parameter of the current largest coding unit to be encoded.

Referring to FIG. 5C, a SAO filter parameter of a current largest coding unit to be encoded 560 may be determined by using a SAO filter parameter of a previously-encoded largest coding unit 561 in a same picture.

Referring to FIG. 5D, a SAO filter parameter of a current largest coding unit to be encoded 562 may be determined by using a SAO filter parameter of a largest coding unit 563 that was encoded in a picture temporally preceding a picture including the current largest coding unit to be encoded 562.

Similarly, the SAO/ALF parameter predictor 582 may predict the SAO filter parameter by using a SAO filter parameter generated as a result of performance that was previously performed by a SAO filter. The SAO/ALF parameter predictor 582 may use a SAO filter parameter of a previous block as a SAO filter parameter of a current block.

In addition, the SAO/ALF parameter predictor 582 may predict the SAO filter parameter by using information regarding the current block and a SAO filter application result with respect to the previous block to which the SAO filter was applied before the SAO filter parameter of the current block is generated.

The information regarding the current block includes encoding information of the current block which was generated before the SAO filter and/or a deblocking filter is applied thereto.

For example, the SAO/ALF parameter predictor 582 may use, as the SAO filter parameter of the current block, a SAO filter parameter of a block of which pixel value is the most similar to that of the current block, the block being from among previous blocks to which the SAO filter was previously applied. The SAO/ALF parameter predictor 582 may use, as the SAO filter parameter of the current block, the SAO filter parameter of the block of which pixel value is the most similar to that of the current block, the block being from among the previous blocks to which the SAO filter was previously applied. A pixel value of the current block to be compared may be the pixel value of the current block before the deblocking filter is applied thereto.

The SAO/ALF parameter predictor 582 may predict the SAO filter parameter by using encoding information of the current block and a SAO filter application result with respect to the previous block. For example, the SAO/ALF parameter predictor 582 may use, as the SAO filter parameter of the current block, a SAO filter parameter of a previous block having a same intra prediction direction as an intra prediction direction of the current block.

Alternatively, the SAO/ALF parameter predictor 582 may predict the SAO filter parameter of the current block by compensating for the SAO filter parameter of the previous block according to a difference between the pixel values of the previous block and the current block.

Similarly, the SAO/ALF parameter predictor 582 may predict the SAO filter parameter by using an ALF filter application result with respect to the previous block to which an ALF filter was applied before the ALF filter parameter of the current block is generated. The SAO/ALF parameter predictor 582 may use, as the ALF filter parameter of the current block, an ALF filter parameter of a block of which pixel value is the most similar to that of the current block, the block being from among previous blocks to which the ALF filter was previously applied. Alternatively, the SAO/ALF parameter predictor 582 may predict the ALF filter parameter of the current block by compensating for the ALF filter parameter of the previous block according to a difference between the pixel values of the previous block and the current block.

The SAO/ALF parameter predictor 582 delivers the predicted SAO filter parameter to the SAO filtering unit 532. Then, the SAO/ALF parameter predictor 582 may deliver the predicted ALF filter parameter to the ALF filtering unit 534. Afterward, the SAO/ALF parameter predictor 582 may deliver the predicted SAO filter parameter and ALF filter parameter to the entropy encoder 550.

The entropy encoder 550 may generate a bitstream by entropy encoding the SAO filter parameter and/or the ALF filter parameter received from the SAO/ALF parameter predictor 582, and encoded data received from an encoder. In the present embodiment, since the SAO filter parameter and the ALF filter parameter are predicted before deblocking filtering is performed, the SAO filter parameter and the ALF filter parameter may be entropy encoded before the deblocking filtering is performed. Accordingly, a waiting time of a plurality of items of data to be entropy encoded is decreased so that the plurality of items of data to be entropy encoded may be further rapidly deleted from a data buffer.

An encoding method performed by the encoding apparatus 500 according to an embodiment of the present disclosure described with reference to FIG. 5A will now be described with reference to FIG. 5B. Hereinafter, descriptions overlapping the encoding method described with reference to FIG. 2B are not provided here.

First, the encoding apparatus 500 according to an embodiment of the present disclosure may generate encoded video data by encoding an original video (S511).

Next, the encoding apparatus 500 according to an embodiment of the present disclosure may generate decoded video data by decoding the encoded video (S512).

Next, the encoding apparatus 500 according to an embodiment of the present disclosure may apply a deblocking filter to the decoded video (S513).

The encoding apparatus 500 according to an embodiment of the present disclosure may predict a SAO filter parameter by using a result of applying a SAO filter to a previous block, independently from applying deblocking filtering (S516). Next, the encoding apparatus 500 according to an embodiment of the present disclosure may predict an ALF filter parameter by using a result of applying an ALF filter to the previous block, independently from applying the deblocking filtering (S517). As described above, the encoding apparatus 500 may predict the SAO filter parameter and the ALF filter parameter by using information of SAO filtering and/or information of ALF filtering with respect to the previous block, the SAO filtering and the ALF filtering being performed before the deblocking filtering is performed.

Next, the encoding apparatus 500 according to an embodiment of the present disclosure may generate a bitstream by entropy encoding the encoded data, the SAO filter parameter, and the ALF filter parameter (S518).

When prediction is performed on the SAO filter parameter, the encoding apparatus 500 according to an embodiment of the present disclosure may apply the SAO filter to the decoded video to which the deblocking filter has been applied, by using the predicted SAO filter parameter (S514).

Next, when prediction is performed on the ALF filter parameter, the encoding apparatus 500 according to an embodiment of the present disclosure may apply the ALF filter to the decoded video to which the SAO filter has been applied, by using the predicted ALF filter parameter (S515).

Figure 6A:
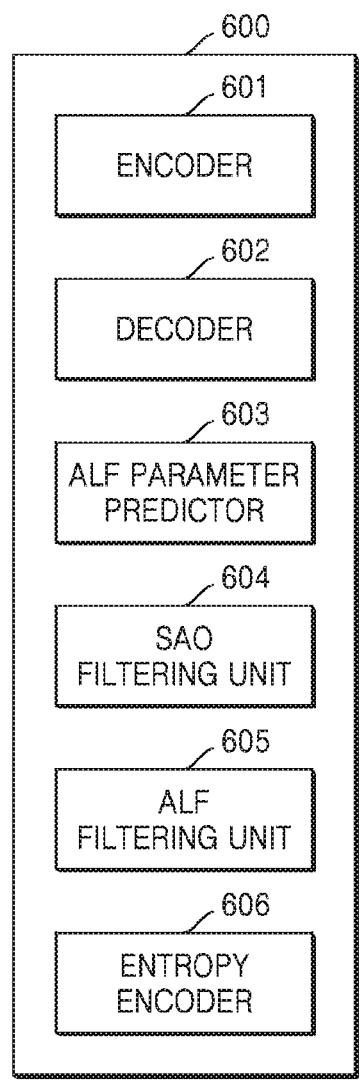
FIGS. 6A and 6B illustrate an encoding apparatus that performs in-loop filtering and an encoding operation, according to an embodiment of the present disclosure.
Figure 6B:
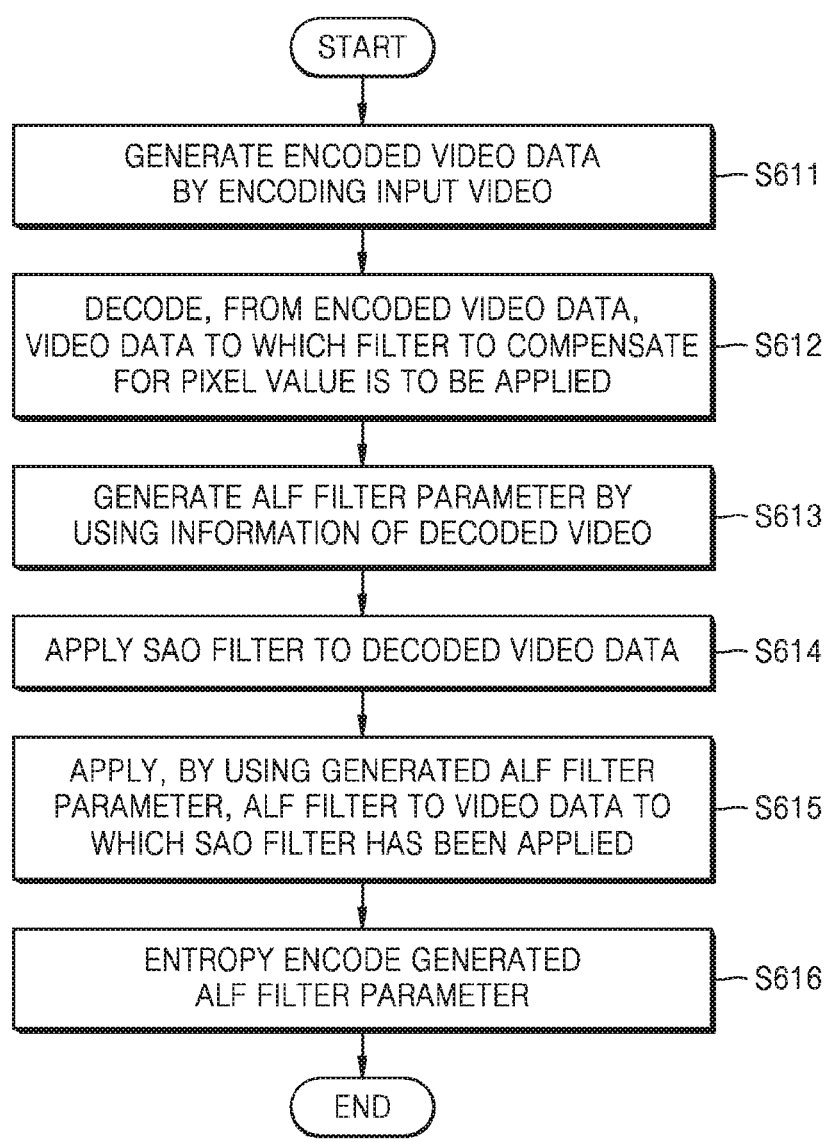

FIGS. 6A and 6B are a block diagram of an encoding apparatus 600 that performs in-loop filtering and a diagram for describing an encoding method, according to embodiments of the present disclosure.

The encoding apparatus 600 according to an embodiment of the present disclosure may include an encoder 601, a decoder 602, an ALF parameter predictor 603, a SAO filtering unit 604, an ALF filtering unit 605, and an entropy encoder 606.

The encoder 601 generates encoded data by encoding a video input in the aforementioned manner. The encoder 601 may encode the input video by using a reconstructed video to which at least one of a deblocking filter, an SAO filter, and an ALF filter has been applied.

The decoder 602 may generate a current block to which the ALF filter is to be applied, by decoding the aforementioned encoded video.

The ALF parameter predictor 603 may predict an ALF filter parameter of the current block which is for applying the ALF filter to the current block. The ALF parameter predictor 603 may predict the ALF filter parameter of the current block by using information of the current block to which the deblocking filter is not applied. The ALF parameter predictor 603 may predict the ALF filter parameter of the current block by using information of the current block to which the deblocking filter has been applied.

The SAO filtering unit 604 may apply the SAO filter to compensate for a value of a current pixel by using a compensation value assigned to a bigness relation type of the value of the current pixel which is to be adjusted and applied to the current block and a value of a neighboring pixel adjacent to the current pixel, or a compensation value assigned to a bigness classification type to which the value of the current pixel belongs.

The ALF filtering unit 605 may apply the ALF filter to the current block to which the SAO filter has been applied, by using the predicted ALF filter parameter.

The entropy encoder 606 may perform entropy encoding on the predicted ALF filter parameter. The entropy encoder 606 may perform entropy encoding on the predicted ALF filter parameter before the ALF filtering unit 605 applies the ALF filter to the current block to which the SAO filter has been applied.

Referring to FIG. 6B, the encoding apparatus 600 according to an embodiment of the present disclosure may generate encoded video data by encoding a previously-input video so as to perform in-loop filtering (S611). Next, the encoding apparatus 600 may decode, from the encoded video data, video data to which a filter to compensate for a pixel value is to be applied (S612). Next, the encoding apparatus 600 may generate an ALF filter parameter by using information of the decoded video, the ALF filter parameter being generated for applying an ALF filter to compensate for a value of a current pixel by using a value of an adjacent pixel adjacent to the current pixel and a filter coefficient with respect to the adjacent pixel (S613). Next, the encoding apparatus 600 may apply, to the decoded video data, a SAO filter to compensate for the value of the current pixel by using at least one of an edge offset and a band offset (S614). Next, the encoding apparatus 600 may apply the ALF filter to the video data to which the SAO filter has been applied, by using the generated ALF filter parameter (S615). Next, the encoding apparatus 600 may perform entropy encoding on the ALF filter parameter (S616).

Referring back to FIG. 6A, the encoding apparatus 600 according to an embodiment of the present disclosure may further include a SAO parameter predictor for applying a SAO filter to a current block by using information of the current block to which a deblocking filter is not applied, and a deblocking filter unit for applying the deblocking filter to the current block. The entropy encoder 606 may perform entropy encoding on the predicted SAO filter parameter.

The SAO filtering unit 604 may apply the SAO filter to the current block by using the predicted SAO filter parameter. The SAO filtering unit 604 may apply the SAO filter to the current block to which the deblocking filter has been applied.

The SAO parameter predictor may predict the SAO filter parameter by using the pixel value of the current block to which the deblocking filter is not applied. The SAO parameter predictor may predict a result of applying the deblocking filter to the current block by using the pixel value of the current block to which the deblocking filter is not applied, and may predict the SAO filter parameter by using a value of predicting the result of applying the deblocking filter.

The SAO parameter predictor may predict the SAO filter parameter by using prediction information used in encoding the current block. The SAO parameter predictor may predict the SAO filter parameter of the current block by using a SAO filter parameter of a previous block to which the SAO filter was applied before the SAO filter is applied to the current block.

The SAO parameter predictor may predict the SAO filter parameter of the current block by using information of a spatially-neighboring block located in a same picture as a picture of a reconstructed video in which the current block is located. The information of the spatially-neighboring block may include at least one of a pixel value of the spatially-neighboring block, prediction information, and the SAO filter parameter.

The SAO parameter predictor may predict the SAO filter parameter of the current block by using information of a temporally-neighboring block located in a picture having time information different from time information of the picture of the reconstructed video in which the current block is located. The information of the temporally-neighboring block may include at least one of a pixel value of the temporally-neighboring block, the prediction information, and the SAO filter parameter.

The SAO parameter predictor may predict the SAO filter parameter of the current block by using at least one of the information of the spatially-neighboring block located in the same picture as the picture of the reconstructed video in which the current block is located and the information of the temporally-neighboring block located in the picture having the time information different from the time information of the picture of the reconstructed video in which the current block is located, and the information of the current block to which the deblocking filter is not applied.

Figure 7A:
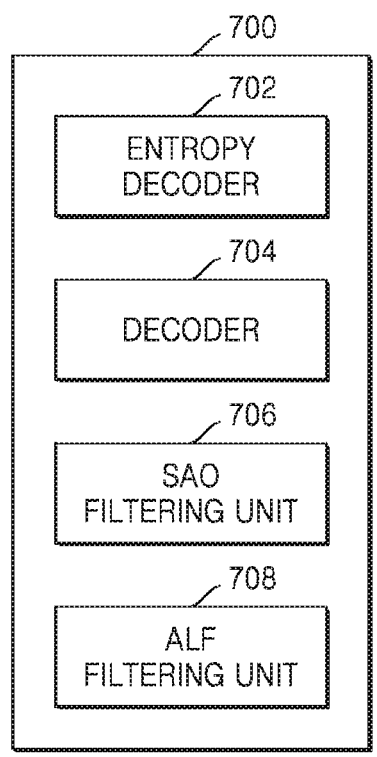
FIGS. 7A and 7B illustrate an encoding apparatus that performs in-loop filtering and an encoding operation, according to an embodiment of the present disclosure.
Figure 7B:
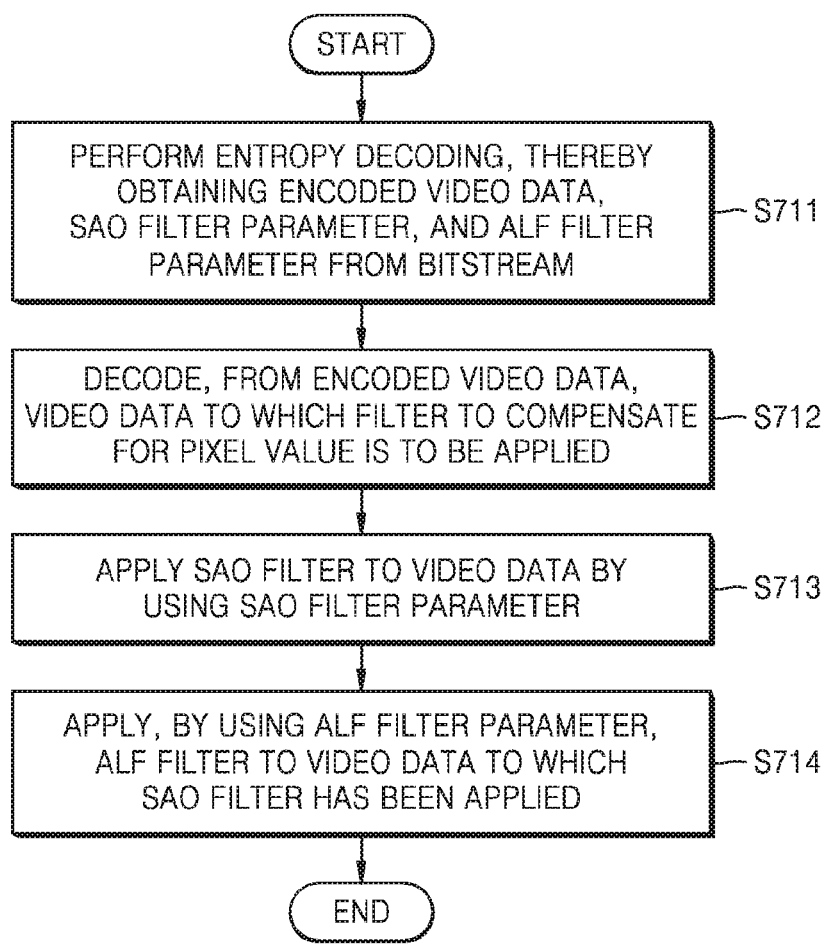

FIGS. 7A and 7B are a block diagram of a video decoding apparatus 700 that performs in-loop filtering and a diagram for describing a decoding method, according to embodiments of the present disclosure.

The video decoding apparatus 700 according to an embodiment of the present disclosure may include an entropy decoder 702, a video decoder 704, a SAO filtering unit 706, and an ALF filtering unit 708.

The video decoding apparatus 700 according to an embodiment of the present disclosure receives a bitstream including encoded data of a video. The video decoding apparatus 700 may parse encoded video samples from the received bitstream, may generate reconstructed pixels by performing entropy decoding, inverse quantization, inverse transformation, prediction, and motion compensation on each of image blocks, and thus may generate a reconstructed image.

Also, the video decoding apparatus 700 according to an embodiment may minimize an error between an original image and the reconstructed image by receiving a filtering parameter indicating a value of a difference between an original pixel and a reconstructed pixel. The video decoding apparatus 700 may receive encoded data of each of largest coding units of a video, and may reconstruct each largest coding unit, based on coding units of a tree structure which are split from each largest coding unit.

According to the decoding method according to an embodiment of the present disclosure with reference to FIG. 7B, the entropy decoder 702 may perform entropy decoding, thereby obtaining, from the bitstream, the encoded video data, a SAO filter parameter, and an ALF filter parameter predicted by the encoding apparatus 600 (S711).

Next, the video decoder 704 decodes, from the encoded video data, video data to which a filter to compensate for a pixel value is to be applied (S712).

Next, the SAO filtering unit 706 applies a SAO filter to the reconstructed video data by using the SAO filter parameter (S713).

The SAO filtering unit 706 may determine whether a classification method with respect to a pixel value of a current largest coding unit is an edge type or a band type, based on a SAO type determined based on the SAO filter parameter.

When the SAO type is an off type, the SAO filtering unit 706 may determine that an offset adjusting technique is not applied to the current largest coding unit. In this case, there is no need to parse residual offset parameters of the current largest coding unit.

The SAO filtering unit 706 may determine an edge direction according to the edge type or a band range according to the band type of the current largest coding unit, based on a SAO class.

The SAO filtering unit 706 may determine a difference value between reconstructed pixels included in the determined SAO class and original pixels, based on an SAO offset value.

The SAO filtering unit 706 may adjust pixel values of samples by the difference value, the samples being reconstructed based on current block units.

For example, the SAO filtering unit 706 may determine offset values corresponding to a predetermined number of categories from an offset parameter. Each of the offset values may be equal to or greater than a preset minimum value and may be less than or equal to a preset maximum value.

For example, when the SAO type information indicates the edge type, the SAO filtering unit 706 may determine a direction of an edge of the reconstructed pixels to be one of 0°, 90°, 45°, and 135°, according to the SAO class, the reconstructed pixels being included in the current largest coding unit.

When the SAO type information indicates the band type, the SAO filtering unit 706 may determine a location of a band to which the pixel values of the reconstructed pixels belong, based on the SAO class.

Next, the ALF filtering unit 708 applies the ALF filter to video data to which the SAO filter has been applied, by using the ALF filter parameter generated by performing, by the encoding apparatus 600, prediction on the current block (S714).

Figures 7C, 7D:
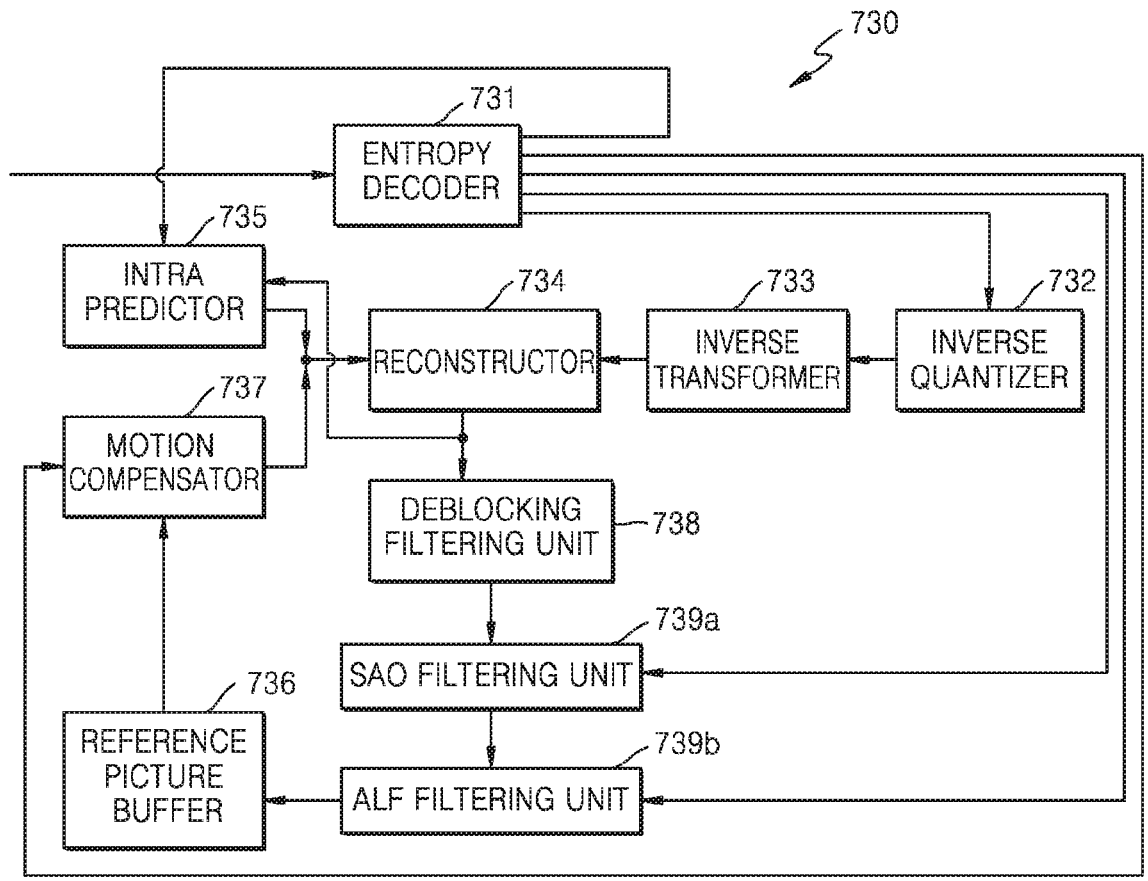
FIG. 7C is a block diagram of a video decoding apparatus, according to an embodiment of the present disclosure.
FIG. 7D illustrates an edge-type edge class, according to an embodiment of the present disclosure.

Hereafter, with reference to FIG. 7C, a video decoding method using an SAO technique will now be described. FIG. 7C is a block diagram of a video decoding apparatus 730, according to an embodiment of the present disclosure.

The video decoding apparatus 730 includes an entropy decoder 731, an inverse quantizer 732, an inverse transformer 733, a reconstructor 734, an intra predictor 735, a reference picture buffer 736, a motion compensator 737, a deblocking filtering unit 738, a SAO filtering unit 739*a*, and an ALF filtering unit 739*b*.

The video decoding apparatus 730 may receive a bitstream including encoded video data. The entropy decoder 731 may parse, from the bitstream, intra mode information, inter mode information, SAO information, and residue data.

The residue data extracted by the entropy decoder 731 may be quantized transform coefficients. Therefore, the inverse quantizer 732 may reconstruct transform coefficients by performing inverse quantization on the residue data, and the inverse transformer 733 may reconstruct residue values of a spatial domain by performing inverse transformation on the reconstructed transform coefficients.

In order to predict and reconstruct the residue values of the spatial domain, intra prediction or motion compensation may be performed.

When prediction mode information extracted by the entropy decoder 731 indicates an intra mode, the intra predictor 735 may determine, by using intra mode information, which samples from among neighboring samples that are spatially adjacent to a current sample are to be used in reconstructing the current sample. The neighboring samples to be referred to may be selected from samples that are previously reconstructed by the reconstructor 734. The reconstructor 734 may reconstruct current samples by using the reference samples determined based on the intra mode information and the residue values reconstructed by the inverse transformer 733.

When the prediction mode information extracted by the entropy decoder 731 indicates an inter mode, the motion compensator 737 may determine, by using inter mode information, which samples from among pictures that are reconstructed before a current picture are to be used in reconstructing a current sample of the current picture. The inter mode information may include a motion vector, a reference index, or the like. A reference picture for motion compensation with respect to the current sample may be determined, by using the reference index, from among the pictures that are reconstructed before the current picture and are stored in the reference picture buffer 736. A reference block for motion compensation with respect to a current block may be determined, by using the motion vector, from among reference pictures. The reconstructor 734 may reconstruct current samples by using the reference block determined based on the inter mode information and the residue values reconstructed by the inverse transformer 733.

Reconstructed pixels reconstructed from samples may be output from the reconstructor 734. The reconstructor 734 may generate the reconstructed pixels, based on coding units of a tree structure of each largest coding unit.

The deblocking filtering unit 738 may perform filtering to decrease a blocking phenomenon with respect to pixels located in a boundary area of coding units of a largest coding unit or coding units of a tree structure.

The SAO filtering unit 739*a* according to an embodiment may adjust an offset of the reconstructed pixels according to each largest coding unit, by using an SAO technique. The SAO filtering unit 739*a* may determine a SAO type, a SAO class, offset values, etc. for a current largest coding unit from the SAO information extracted by the entropy decoder 731.

The SAO filtering unit 739*a* may determine, from a SAO offset value, a sign of an offset value and a difference value for each of the reconstructed pixels of the current largest coding unit. The SAO filtering unit 739a may increase or decrease a pixel value of each of the reconstructed pixels by the difference value determined from the offset value, thereby decreasing an error between the reconstructed pixels and the original pixels.

A picture including the reconstructed pixels from which the offset has been adjusted by the SAO filtering unit 739a according to an embodiment may be stored in the reference picture buffer 736. Therefore, motion compensation with respect to a next picture may be performed by using a reference picture in which the error between the reconstructed pixels and the original pixels is minimized according to the SAO technique.

According to the SAO technique according to an embodiment, an offset of a pixel group including the reconstructed pixels may be determined for each reconstructed pixel, based on difference values between the reconstructed pixels and the original pixels. First, embodiments in which the reconstructed pixels are classified to pixel groups for the SAO technique will now be described.

According to the SAO technique according to an embodiment, i) pixels may be classified according to an edge type of the reconstructed pixels, or ii) pixels may be classified according to a band type of the reconstructed pixels. Whether the pixels are classified according to the edge type or the band type may be defined according to the SAO type.

First, an embodiment in which the pixels are classified according to the edge type, according to the SAO technique according to an embodiment will now be described.

When an edge-type offset is determined with respect to the current largest coding unit, an edge class of each of the reconstructed pixels included in the current largest coding unit may be determined. That is, by comparing pixel values of a current reconstructed pixel and neighboring pixels, edge classes of current reconstructed pixels may be defined. An embodiment in which an edge class is determined will be described below with reference to FIG. 7D.

FIG. 7D illustrates an edge-type edge class, according to an embodiment of the present disclosure.

0, 1, 2, and 3 may be sequentially allocated to indexes of edge classes 741, 742, 743, and 744. When the number of times an edge type occurs is increased, a small number may be allocated to an index of the edge type.

The edge class may indicate a one-dimensional direction of an edge formed by two neighboring pixels adjacent to a current reconstructed pixel X0. An edge class 741 having an index 0 indicates a case in which two neighboring pixels X1 and X2 that are horizontally adjacent to the current reconstructed pixel X0 forms an edge. An edge class 742 having an index 1 indicates a case in which two neighboring pixels X3 and X4 that are vertically adjacent to the current reconstructed pixel X0 forms an edge. An edge class 743 having an index 2 indicates a case in which two neighboring pixels X5 and X8 that are adjacent, in a diagonal direction of 135°, to the current reconstructed pixel X0 forms an edge. An edge class 744 having an index 3 indicates a case in which two neighboring pixels X6 and X7 that are adjacent, in a diagonal direction of 45°, to the current reconstructed pixel X0 forms an edge.

Therefore, a direction of an edge which is strong in the current largest coding unit is determined by analyzing edge directions of the reconstructed pixels included in the current largest coding unit, so that the edge class of the current largest coding unit may be determined.

Categories may be classified in each edge class, according to edge shapes of a current pixel. An example of the categories according to the edge shapes are described below with reference to FIGS. 7E and 7F.

Figure 7F:
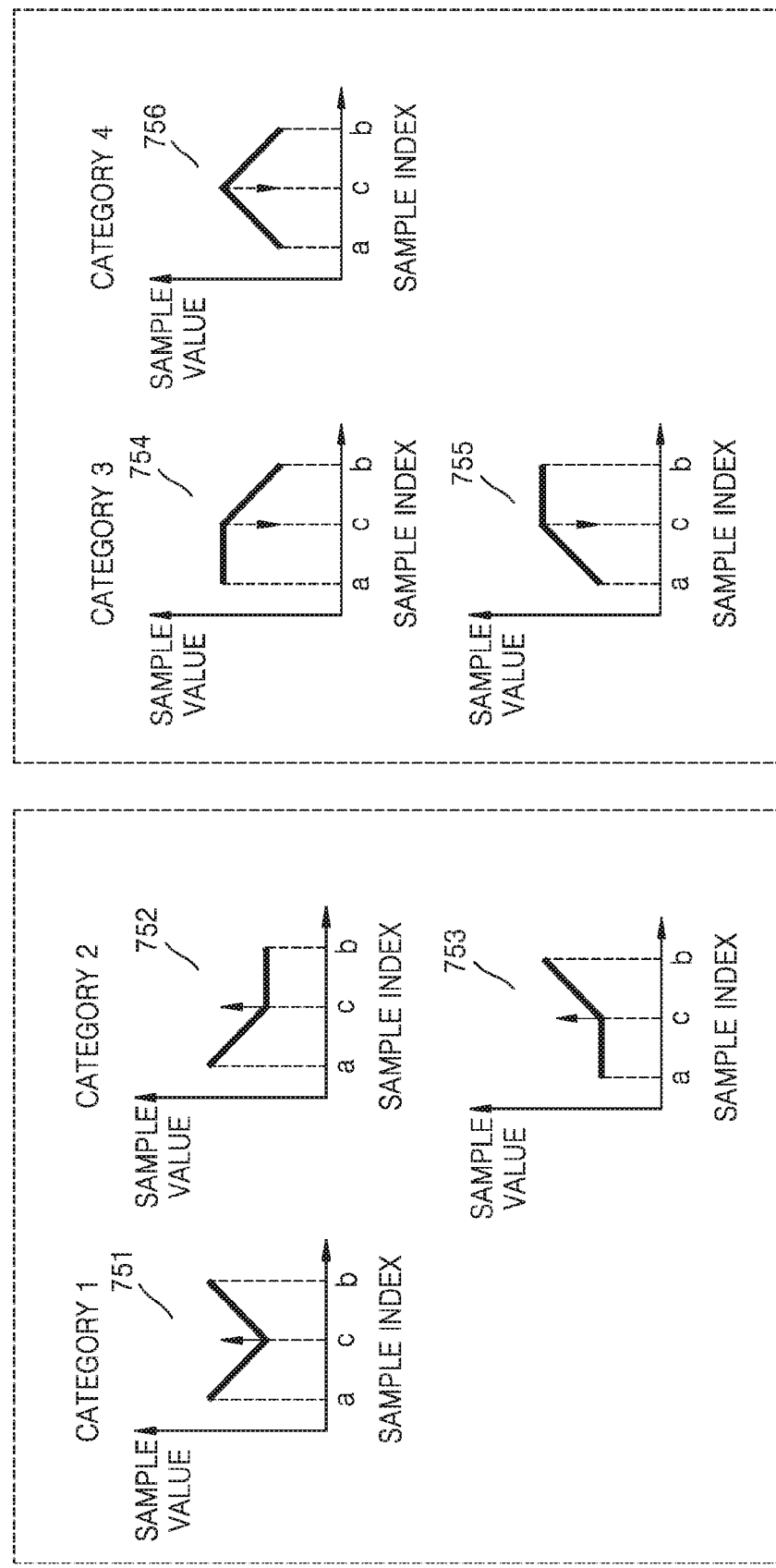

FIGS. 7E and 7F illustrate edge-type categories, according to an embodiment.

An edge category indicates whether a current pixel is a bottom point of a concave edge, a pixel of a concave corner adjacent to the bottom point of the concave edge, a top point of a convex edge, or a pixel of a curved corner adjacent to the top point of the convex edge.

FIG. 7E illustrate conditions for determining a category of an edge. FIG. 7F illustrates edge shapes of reconstructed pixels and neighboring pixels, and graphs of pixel values c, a, and b.

c indicates an index of a reconstructed pixel, and a and b indicate indexes of neighboring pixels in both sides of the current reconstructed pixel according to an edge direction. Xa, Xb, and Xc respectively indicate pixel values of the reconstructed pixel, wherein indexes of the pixel values are a, b, and c. In the graphs of FIG. 7F, an x-axis indicate indexes of the neighboring pixels in both sides of the reconstructed pixel, and a y-axis indicates pixel values of each of samples.

A category 1 indicates a case in which a current sample is a bottom point of a concave edge, i.e., a local valley (Xc<Xa && Xc<Xb). As in a graph 751, when the current reconstructed pixel c is the bottom point of the concave edge, the current reconstructed pixel c being between the neighboring pixels a and b, the current reconstructed pixel may be classified into the category 1.

A category 2 indicates a case in which the current sample is located at concave corners near the bottom point of the concave edge (Xc<Xa && Xc==Xb II Xc==Xa && Xc<Xb). As in a graph 752, when the current reconstructed pixel c is located at a point where a falling curve of the concave edge ends (Xc<Xa && Xc==Xb), the current reconstructed pixel c being between the neighboring pixels a and b, or as in a graph 753, when the current reconstructed pixel c is located at a point where a rising curve of the concave edge starts (Xc==Xa && Xc<Xb), the current reconstructed pixel may be classified into the category 2.

A category 3 indicates a case in which the current sample is located at convex corners near a top point of a convex edge (Xc>Xa && Xc==Xb II Xc==Xa && Xc>Xb). As in a graph 754, when the current reconstructed pixel c is located at a point where a falling curve of the convex edge starts (Xc==Xa && Xc>Xb), the current reconstructed pixel c being between the neighboring pixels a and b, or as in a graph 755, when the current reconstructed pixel c is located at a point where a rising curve of the convex edge ends (Xc>Xa && Xc==Xb), the current reconstructed pixel may be classified into the category 3.

A category 4 indicates a case in which the current sample is a top point of the convex edge, i.e., a local peak (Xc>Xa && Xc>Xb). As in a graph 756, when the current reconstructed pixel c is the top point of the convex edge, the current reconstructed pixel c being between the neighboring pixels a and b, the current reconstructed pixel may be classified into the category 4.

A case in which the conditions of the categories 1, 2, 3, and 4 are all satisfied with respect to the current reconstructed pixel is not an edge, this case is classified into a category 0, and an offset for the category 0 is not required to be separately encoded.

According to an embodiment, for reconstructed pixels corresponding to a same category, an average value of difference values between a reconstructed pixel and an original pixel may be determined to be an offset of a current category. Also, an offset may be determined for each category.

At the concave edges of the categories 1 and 2, a smoothing effect by which an edge becomes flat if a reconstructed pixel value is adjusted according to a positive offset value may occur or a sharpening effect by which sharpness of the edge is increased due to a negative offset value may occur. At the convex edges of the categories 3 and 4, the smoothing effect may occur due to a negative offset value, and the sharpening effect of the edge may occur due to a positive offset value.

The encoding apparatus 600 according to an embodiment may not allow a sharpening effect of an edge. In this case, a positive offset value is required for the concave edges of the categories 1 and 2, and a negative offset value is required for the convex edges of the categories 3 and 4. In this case, a sign of an offset value may be determined by checking a category of the edge. Therefore, the encoding apparatus 600 transmits or receives an absolute value of the offset value, except for the sign of the offset value.

Therefore, the encoding apparatus 600 may encode and transmit offset values corresponding to categories of a current edge class, and the decoding apparatus 700 may adjust each reconstructed pixel by an offset value of a corresponding category by using the received offset value of each of the categories.

For example, when an offset value of an edge type is determined to be 0, the encoding apparatus 600 may transmit only edge class information.

For example, when an offset absolute value of the edge type is not 0, the encoding apparatus 600 may transmit the offset absolute value and edge class information. In a case of the edge type, there is no need to transmit the edge class information.

When the received offset absolute value is not 0, the decoding apparatus 700 may read information regarding the offset absolute value of the edge type. A sign of an offset value may be predicted according to an edge category based on an edge shape of reconstructed pixels and neighboring pixels.

Therefore, the encoding apparatus 600 according to an embodiment may classify pixels, according to an edge direction or an edge shape, may determine an average error value between pixels having the same feature, the average error value being to be an offset value, and may determine offset values for each of categories. The encoding apparatus 600 may encode and transmit SAO type information indicating an edge type, SAO class information indicating an edge direction, and the offset values.

The decoding apparatus 700 according to an embodiment may receive the SAO type information, the SAO class information, and the offset values, thereby determining the edge direction according to the SAO type information and the SAO class information. The decoding apparatus 700 may determine, for each reconstructed pixel, an offset value according to each category which corresponds to an edge shape according to an edge direction, may adjust a pixel value of each reconstructed pixel by the offset value, and thus may minimize an error between an original image and a reconstructed image.

Next, an embodiment in which pixels are classified according to the SAO technique and a band type will now be described.

According to an embodiment, pixel values of reconstructed pixels may respectively belong to bands. For example, a total range of a minimum value Min and a maximum value Max of the pixel values may be 0, . . . , $2^{(p-1)}$ according to p-bit sampling. When a pixel value total range (Min, Max) is divided into K pixel-value periods, each pixel-value period is referred to as a band. When $B_k$ indicates a maximum value of a kth band, bands may be divided to [B0, B1−1], [B1, B2−1], [B2, B3−1], . . . , [BK−1, BK]. When a pixel value of a current reconstructed pixel Rec(x,y) belongs to [Bk−1, Bk], a current band may be determined to be k. The bands may be divided with an equal-type or a different-type.

For example, when a pixel value classification type corresponds to an equal band of an 8-bit pixel, pixel values may be divided into 32 bands. In more detail, the pixel values may be divided into the bands of [0, 7], [8, 15], . . . , [240, 247], [248, 255].

A band to which each pixel value of each reconstructed pixel belongs may be determined from among a plurality of bands classified according to a band type. Also, an offset value denoting an average of errors between an original pixel and a reconstructed pixel may be determined for each band.

Therefore, the encoding apparatus 600 and the decoding apparatus 700 may encode and transmit or receive an offset corresponding to bands classified according to a current band type, and may adjust the reconstructed pixel by the offset.

Therefore, the encoding apparatus 600 and the decoding apparatus 700 according to an embodiment may classify band-type reconstructed pixels according to bands to which pixel values belong, respectively, may determine, as an offset, an average error value between reconstructed pixels belonging to a same band, and may adjust the reconstructed pixels by the offset, thereby minimizing an error between an original image and a reconstructed image.

When the encoding apparatus 600 and the decoding apparatus 700 according to an embodiment determine an offset according to a band type, reconstructed pixels may be classified into categories according to band positions. For example, when a total range of a pixel value is classified into K bands, the categories may be indexed according to a band index k indicating a kth band. The number of categories may be determined to correspond to the number of bands.

However, in order to reduce data, the encoding apparatus 600 and the decoding apparatus 700 may limit the number of categories used in determining an offset according to the SAO technique. For example, only a predetermined number of bands of which band indexes are sequentially increased from a band at a predetermined start point may be allocated to the categories, and an offset may be determined only for the categories.

For example, when a band of which index is 12 is determined to be a start band, four bands from the start band, i.e., bands with indexes of 12, 13, 14, and 15 may be allocated to categories 1, 2, 3, and 4, respectively. Therefore, an average error between an original pixel and reconstructed pixels included in the band with the index 12 may be determined to be an offset of the category 1. Similarly, an average error between the original pixel and reconstructed pixels included in the band with the index 13 may be determined to be an offset of the category 2, an average error between the original pixel and reconstructed pixels included in the band with the index 14 may be determined to be an offset of the category 3, and an average error between the original pixel and reconstructed pixels included in the band with the index 15 may be determined to be an offset of the category 4.

In this case, in order to determine positions of the bands allocated to the categories, a position where a band range starts, i.e., information regarding a position of a left band is required. Therefore, the encoding apparatus 600 according to an embodiment may encode and transmit left start point information indicating the position of the left band as a SAO class. The encoding apparatus 600 may encode and transmit a SAO type indicating a band type, a SAO class, and offset values according to categories.

The decoding apparatus 700 according to an embodiment may receive the SAO type, the SAO class, and the offset values according to categories. When the received SAO type is the band type, the decoding apparatus 700 may read the position of the start band from the SAO class. The decoding apparatus 700 may determine to which band from the start band from among the four bands the reconstructed pixels belong, may determine an offset value allocated to a current band, the offset value being from among the offset values according to categories, and thus may adjust a reconstructed pixel value by the offset value.

Hereinafter, a SAO filter parameter that the encoding apparatus 600 and the decoding apparatus 700 encode and transmit or receive will now be described.

The encoding apparatus 600 and the decoding apparatus 700 according to an embodiment may determine a SAO type according to a pixel classification type of reconstructed pixels in each largest coding unit.

A SAO type may be determined according to an image characteristic of each block. For example, in order to modify an edge value of a largest coding unit including a vertical edge, a horizontal edge, a diagonal edge, or the like, it is better to determine an offset value by classifying pixel values according to an edge type. For a non-edge area, it may be better to determine the offset value according to a band classification. Therefore, the encoding apparatus 600 and the decoding apparatus 700 may signal a SAO type for each largest coding unit.

The encoding apparatus 600 and the decoding apparatus 700 according to an embodiment may determine a SAO filter parameter for each largest coding unit. That is, a SAO type of reconstructed pixels of a largest coding unit may be determined, the reconstructed pixels of the largest coding unit may be classified according to categories, and then offset values may be determined according to the categories.

The encoding apparatus 600 may determine, as an offset value, an average error of reconstructed pixels that are classified into a same category and are from among the reconstructed pixels included in the largest coding unit. An offset value may be determined for each category.

A SAO filter parameter according to an embodiment may include a SAO type, offset values, and a SAO class. The encoding apparatus 600 and the decoding apparatus 700 may transmit and receive the SAO filter parameter determined for each largest coding unit.

The encoding apparatus 600 according to an embodiment may encode and transmit the SAO type and the offset values in the SAO filter parameter of the largest coding unit. When the SAO type is an edge type, the encoding apparatus 600 according to an embodiment may further transmit, in addition to the SAO type and the offset values according to the categories, the SAO class indicating an edge direction. When the SAO type is a band type, the encoding apparatus 600 according to an embodiment may further transmit, in addition to the SAO type and the offset values according to the categories, the SAO class indicating a position of a start band. The SAO class may be classified as edge class information in a case of the edge type, and may be classified as band position information in a case of the band type.

The decoding apparatus 700 according to an embodiment may receive, for each largest coding unit, the SAO filter parameter including the SAO type, the offset values, and the SAO class. Also, the decoding apparatus 700 according to an embodiment may select an offset value of a category to which each reconstructed pixel belongs, the offset value from among the offset values according to the categories, and may adjust each reconstructed pixel by the selected offset value.

The encoding apparatus 600 according to an embodiment may further transmit sign information and a remaining offset absolute value so as to transmit the offset values.

When an offset absolute value is 0, there is no need to encode the sign information or remaining offset values. However, when the offset absolute value is not 0, the sign information and the remaining offset absolute value may be further transmitted.

However, as described above, in a case of the edge type, since it is predictable whether an offset value according to a category is a positive number of a negative number, there is no need to transmit the sign information.

An offset value Off-set according to an embodiment may be previously limited to be within a range of a minimum value MinOffSet and a maximum value MaxOffSet (MinOffSet≤Off-Set≤MaxOffSet) before the offset value is determined.

For example, in a case of the edge type, an offset value with respect to reconstructed pixels of categories 1 and 2 may be determined within a range of a minimum value of 0 and a maximum value of 7. In a case of the edge type, an offset value with respect to reconstructed pixels of categories 3 and 4 may be determined within a range of a minimum value of −7 and a maximum value of 0.

For example, in a case of the band type, an offset value with respect to reconstructed pixels of all categories may be determined within a range of a minimum value of −7 and a maximum value of 7.

According to an embodiment, in order to reduce transmission bits of an offset value, a remaining offset value Remainder may be limited to a p bit value that is not a negative value. In this case, the remaining offset value may be equal to or greater than 0 but may be equal to or less than a difference value between a maximum value and a minimum value (0≤Remainder≤MaxOffSet−MinOffSet+1≤2^p). When the encoding apparatus 600 transmits the remaining offset value and the decoding apparatus 700 is enabled to check at least one of a maximum value and a minimum value of an offset value, an original offset value may be reconstructed with only the received remaining offset value.

Figure 7G:
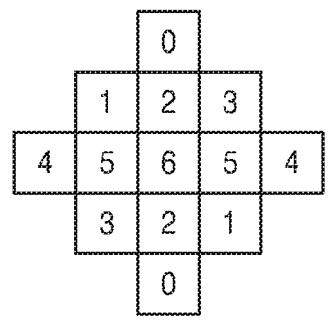
FIG. 7G is a diagram for describing a concept of a method of applying an ALF filter, according to an embodiment of the present disclosure.

FIG. 7G is a diagram for describing a concept of a method of applying an ALF filter, according to an embodiment of the present disclosure. The encoding apparatus 600 according to an embodiment of the present disclosure generates an ALF filter parameter for applying the ALF filter. The ALF filter parameter includes a shape of the ALF filter as shown in FIG. 7G, a size of the ALF filter, and values of coefficients corresponding to pixels corresponding to the ALF filter. In another embodiment, the shape and size of the ALF filter and methods of calculating the coefficients from the ALF filter parameter may be changed.

A method of determining the coefficients of the ALF filter, the method being performed to apply the ALF filter having the shape and size shown in FIG. 7G will now be described.

The encoding apparatus 600 according to an embodiment of the present disclosure compensates for a pixel value of a reconstructed pixel by using the filter shown in FIG. 7G. In the filter shown in FIG. 7G, indexes of 0 to 6 respectively denote the coefficients, each of blocks correspond to each of pixels of a video according to array positions of the blocks. The filter of FIG. 7G indicates that a pixel value of a pixel corresponding to the index of 6 is changed by using neighboring pixels corresponding to the blocks of the filter. For example, a pixel value of the pixel corresponding to the index of 6 may be changed by adding a compensated pixel value to a value of the pixel corresponding to the index of 6, wherein the compensated pixel value is generated by adding all of a calculation value calculated by using a value of a pixel of a block corresponding to the top index of 0 and a coefficient corresponding to the index of 0, a calculation value calculated by using a value of a pixel of a block corresponding to the top index of 1 and a coefficient corresponding to the index of 1, . . . , and a calculation value calculated by using a value of a pixel of a block corresponding to the bottom index of 0 and a coefficient corresponding to the index of 0.

The encoding apparatus 600 may set a same shape and size of an ALF filter for a block unit to which the ALF filter is to be applied, and a coefficient corresponding to each pixel. The encoding apparatus 600 may determine an ALF filter parameter for setting a shape, a size, and a coefficient of an ALF filter to compensate for a pixel value of a particular block of a reconstructed video so as to prevent a difference between the pixel value of the particular block and a pixel value of an original video.

The encoding apparatus 600 may transmit the determined ALF filter parameter to the decoding apparatus 700. The decoding apparatus 700 may perform ALF filtering on a decoded video by using the received ALF filter parameter.

Hereinafter, a video encoding method based on coding units of a tree structure and pixel classification in the video encoding method according to various embodiments are provided.

Figure 8:
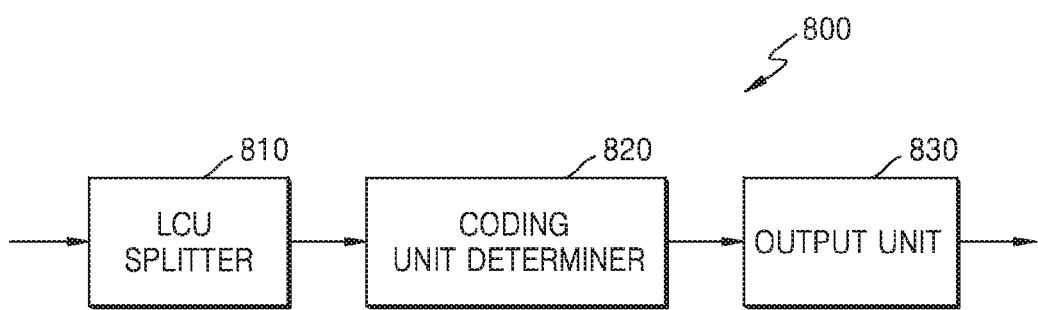
FIG. 8 is a block diagram of a video encoding apparatus based on coding units according to a tree structure, according to an embodiment.

FIG. 8 is a block diagram of the video encoding apparatus based on coding units according to a tree structure 800, according to an embodiment of the present disclosure.

The video encoding apparatus involving video prediction based on coding units according to a tree structure 800 according to an embodiment includes a coding unit determiner 820 and an output unit 830. Hereinafter, for convenience of description, the video encoding apparatus involving video prediction based on coding units according to a tree structure 800 will be abbreviated to the 'video encoding apparatus 800'.

The coding unit determiner 820 may split a current picture based on a largest coding unit that is a coding unit having a maximum size for the current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to the maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. That is, the coding unit determiner 820 determines a final depth by encoding the image data in the deeper coding units according to depths, according to the largest coding unit of the current picture, and selecting a depth having the minimum encoding error. The determined final depth and the encoded image data according to the determined coded depth are output to the output unit 830.

The image data in the largest coding unit is encoded based on the deeper coding units corresponding to at least one depth equal to or below the maximum depth, and results of encoding the image data are compared based on each of the deeper coding units. A depth having the minimum encoding error may be selected after comparing encoding errors of the deeper coding units. At least one final depth may be selected for each largest coding unit.

The size of the largest coding unit is split as a coding unit is hierarchically split according to depths, and the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this case, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, has to be performed on all of the deeper coding units generated as the depth deepens. For convenience of description, the prediction encoding and the transformation will now be described based on a coding unit of a current depth, in a largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition mode according to an embodiment may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a minimum encoding error.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a transform unit having a size less than or equal to the coding unit. For example, the transform unit may include a data unit for an intra mode and a transform unit for an inter mode.

The transform unit in the coding unit may be recursively split into smaller sized regions in a manner similar to that in which the coding unit is split according to the tree structure, according to an embodiment. Thus, residual data in the coding unit may be split according to the transform unit having the tree structure according to transformation depths.

A transformation depth indicating the number of splitting times to reach the transform unit by splitting the height and width of the coding unit may also be set in the transform unit according to an embodiment. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, the transform unit having the tree structure may be set according to the transformation depths.

Split information according to depths requires not only information about a depth, but also about information related to prediction encoding and transformation. Accordingly, the coding unit determiner 820 not only determines a depth having a minimum encoding error, but also determines a partition mode of splitting a prediction unit into a partition, a prediction mode according to prediction units, and a size of a transform unit for transformation.

Coding units according to a tree structure in a largest coding unit and methods of determining a prediction unit/ partition, and a transform unit, according to an embodiment, will be described in detail below with reference to FIGS. 9 through 19.

The coding unit determiner 820 may measure an encoding error of deeper coding units according to depths by using Rate-Distortion Optimization based on Lagrangian multipliers.

The output unit 830 outputs the image data of the largest coding unit, which is encoded based on the at least one depth determined by the coding unit determiner 820, and split information according to the depth, in bitstreams.

The encoded image data may be obtained by encoding residual data of an image.

The split information according to depth may include information about the depth, information about the partition mode in the prediction unit, information about the prediction mode, and information about split of the transform unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. On the other hand, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and split information is determined for a coding unit of a depth, at least one piece of split information may be determined for one largest coding unit. Also, a depth of the image data of the largest coding unit may be different according to locations since the image data is hierarchically split according to depths, and thus a depth and split information may be set for the image data.

Accordingly, the output unit 830 according to an embodiment may assign a corresponding depth and encoding information about an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transform units included in the largest coding unit.

For example, the encoding information that is output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, information about a reference image index of the inter mode, information about a motion vector, information about a chroma component of an intra mode, and information about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transform unit allowed with respect to a current video, and information about a minimum size of the transform unit may also be output through a header of a bitstream, a sequence parameter set, or a picture parameter set. The output unit 830 may encode and output reference information related to prediction, prediction information, and slice type information.

In the video encoding apparatus 800 according to the simplest embodiment, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units each having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 800 according to an embodiment, image compression efficiency may be increased since a coding unit is adjusted while considering characteristics of an image while increasing a maximum size of a coding unit while considering a size of the image.

The inter-layer video encoding apparatus including configuration described above with reference to FIG. 1 may include as many video encoding apparatuses 800 as the number of layers, in order to encode single-layer images according to layers of a multilayer video. For example, a first layer encoder may include one video encoding apparatus 800 and a second layer encoder may include as many video encoding apparatuses 800 as the number of second layers.

When the video encoding apparatus 800 encodes first layer images, the coding unit determiner 820 may determine, for each largest coding unit, a prediction unit for inter-prediction according to coding units having a tree structure, and perform inter-prediction according to prediction units.

Even when the video encoding apparatus 800 encodes second layer images, the coding unit determiner 820 may determine, for each largest coding unit, coding units and prediction units having a tree structure, and perform inter-prediction according to prediction units.

The video encoding apparatus 800 may encode a luminance difference so as to compensate for a luminance difference between a first layer image and a second layer image. However, whether to perform luminance may be determined according to an encoding mode of a coding unit. For example, luminance compensation may be performed only on a prediction unit having a size of 2N×2N.

Figure 9:
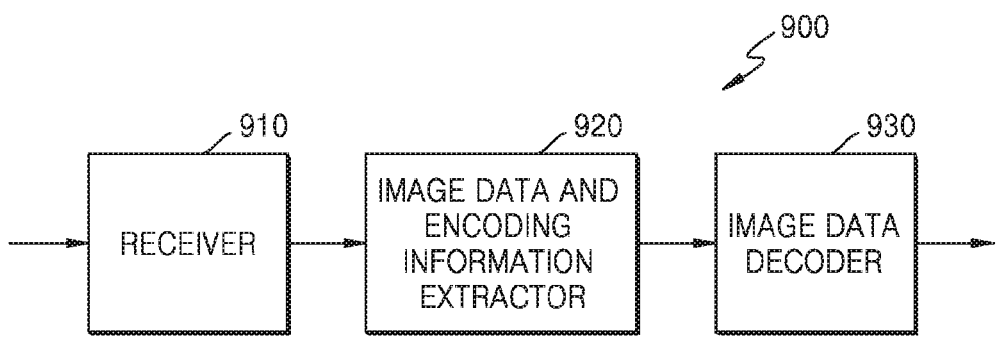
FIG. 9 is a block diagram of a video decoding apparatus based on coding units according to a tree structure, according to an embodiment.

FIG. 9 is a block diagram of the video decoding apparatus based on coding units according to a tree structure 900, according to various embodiments.

The video decoding apparatus that involves video prediction based on coding units having a tree structure 900 according to an embodiment includes a receiver 910, an image data and encoding information extractor 920, and an image data decoder 930. Hereinafter, for convenience of description, the video decoding apparatus that involves video prediction based on coding units having a tree structure 900 according to an embodiment will be abbreviated to the 'video decoding apparatus 900'.

Definitions of various terms, such as a coding unit, a depth, a prediction unit, a transform unit, and various split information, for decoding operations of the video decoding apparatus 900 according to an embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information for the coding units having a tree structure according to each largest coding unit, from the parsed bitstream. The extracted final depth and split information are output to the image data decoder 930. That is, the image data in a bit stream is split into the largest coding unit so that the image data decoder 930 decodes the image data for each largest coding unit.

A depth and split information according to the largest coding unit may be set for at least one piece of depth information, and split information may include information about a partition mode of a corresponding coding unit, about a prediction mode, and about split of a transform unit. Also, split information according to depths may be extracted as the information about a depth.

The depth and the split information according to each largest coding unit extracted by the image data and encoding information extractor 920 is a depth and split information determined to generate a minimum encoding error when an encoder, such as the video encoding apparatus 800 according to an embodiment, repeatedly performs encoding for each deeper coding unit according to depths according to each largest coding unit. Accordingly, the video decoding apparatus 900 may reconstruct an image by decoding the image data according to a coded depth and an encoding mode that generates the minimum encoding error.

Since encoding information about a depth and an encoding mode according to an embodiment may be assigned to a predetermined data unit from among a corresponding coding unit, a prediction unit, and a minimum unit, the image data and encoding information extractor 920 may extract the depth and the split information according to the predetermined data units. If the depth and the split information of a corresponding largest coding unit are recorded according to predetermined data units, the predetermined data units to which the same depth and the same split information is assigned may be inferred to be the data units included in the same largest coding unit.

The image data decoder 930 may reconstruct the current picture by decoding the image data in each largest coding unit based on the depth and the split information according to the largest coding units. That is, the image data decoder 930 may decode the encoded image data based on the extracted information about the partition mode, the prediction mode, and the transform unit for each coding unit from among the coding units having the tree structure included in each largest coding unit. A decoding process may include a prediction including intra prediction and motion compensation, and an inverse transformation.

The image data decoder 930 may perform intra prediction or motion compensation according to a partition and a prediction mode of each coding unit, based on the information about the partition mode and the prediction mode of the prediction unit of the coding unit according to depths.

In addition, the image data decoder 930 may read information about a transform unit according to a tree structure for each coding unit so as to perform inverse transformation based on transform units for each coding unit, for inverse transformation for each largest coding unit. Via the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode encoded data in the current largest coding unit by using the information about the partition mode of the prediction unit, the prediction mode, and the size of the transform unit.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus including configuration described above with reference to FIG. 2A may include the number of video decoding apparatuses 900 as much as the number of viewpoints, so as to reconstruct first layer images and second layer images by decoding a received first layer image stream and a received second layer image stream.

When the first layer image stream is received, the image data decoder 930 of the video decoding apparatus 900 may split samples of first layer images extracted from the first layer image stream by the image data and encoding information extractor 920 into coding units having a tree structure. The image data decoder 930 may reconstruct the first layer images by performing motion compensation according to prediction units for inter prediction, on the coding units having the tree structure obtained by splitting the samples of the first layer images.

When the second layer image stream is received, the image data decoder 930 of the video decoding apparatus 900 may split samples of second layer images extracted from the second layer image stream by the image data and encoding information extractor 920 into coding units having a tree structure. The image data decoder 930 may reconstruct the second layer images by performing motion compensation according to prediction units for inter prediction, on the coding units obtained by splitting the samples of the second layer images.

The extractor 920 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
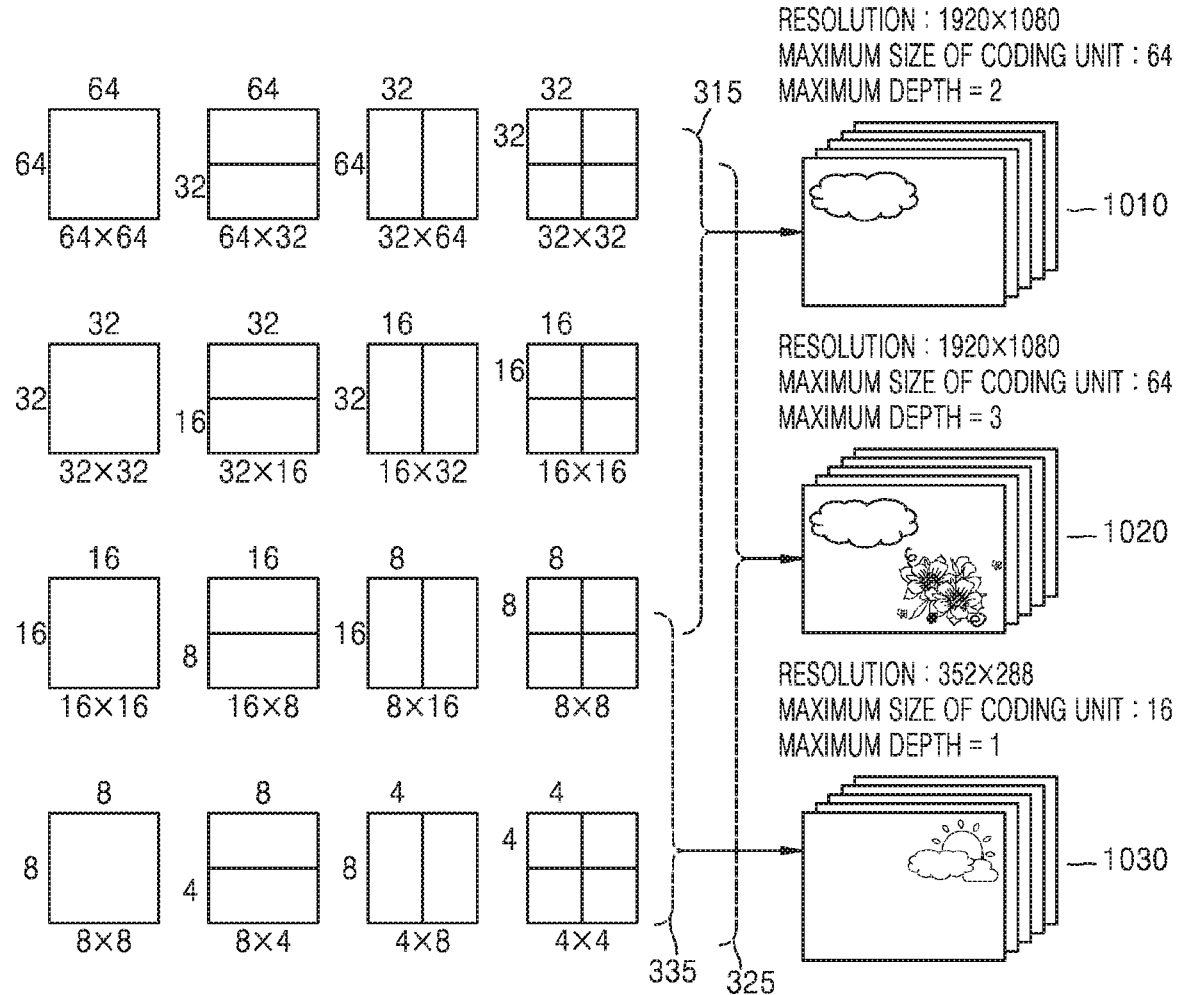
FIG. 10 is a diagram for describing a concept of coding units, according to an embodiment of the present disclosure.

FIG. 10 is a diagram for describing a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. Since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
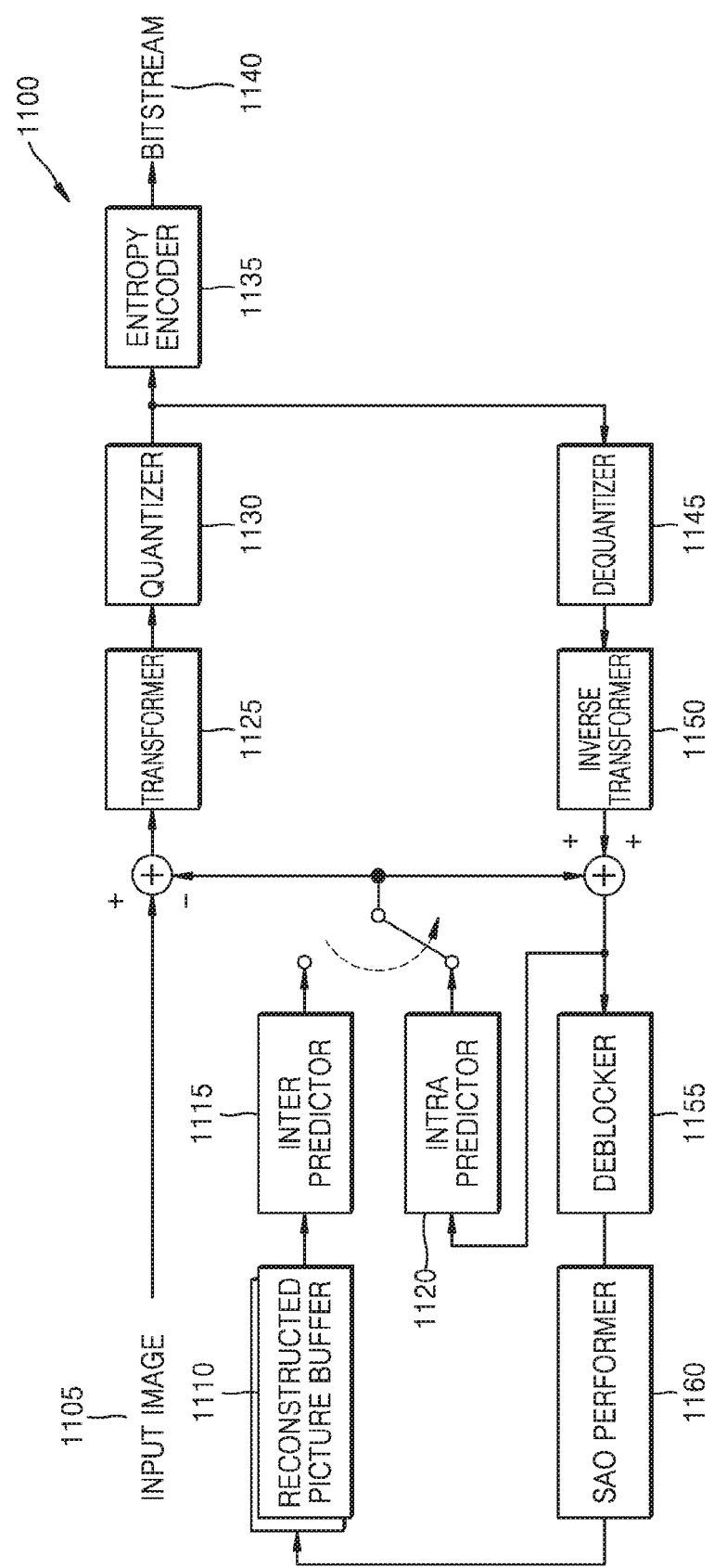
FIG. 11 is a block diagram of a video encoder based on coding units, according to an embodiment of the present disclosure.

FIG. 11 is a block diagram of a video encoder 1100 based on coding units, according to various embodiments.

The video encoder 1100 according to an embodiment performs operations of the coding unit determiner 820 of the video encoding apparatus 800 to encode image data. That is, an intra predictor 1120 performs intra prediction on coding units in an intra mode, from among a current frame 1105, per prediction unit, and an inter predictor 1115 performs inter prediction on coding units in an inter mode by using the current image 1105 and a reference image obtained by a reconstructed picture buffer 1110, per prediction unit. The current picture 1105 may be split into largest coding units, and then the largest coding units may be sequentially encoded. Here, the encoding may be performed on coding units split in a tree structure from the largest coding unit.

Residue data is generated by subtracting prediction data of a coding unit of each mode output from the intra predictor 1120 or the inter predictor 1115 from data of the current image 1105 to be encoded, and the residue data is output as a quantized transformation coefficient through a transformer 1125 and a quantizer 1130 per transform unit. The quantized transformation coefficient is reconstructed to residual data in a spatial domain through a dequantizer 1145 and an inverse transformer 1150. The residue data in the spatial domain is added to the prediction data of the coding unit of each mode output from the intra predictor 1120 or the inter predictor 1115 to be reconstructed as data in a spatial domain of the coding unit of the current image 1105. The reconstructed data in the spatial domain passes through a deblocker 1155, a sample adaptive offset (SAO) performer 1160, and an ALF performer 1170 and thus a reconstructed image is generated. The reconstructed image is stored in the reconstructed picture buffer 1110. Reconstructed images stored in the reconstructed picture buffer 1110 may be used as a reference image for inter prediction of another image. The quantized transformation coefficient obtained through the transformer 1125 and the quantizer 1130 may be output as a bitstream 1140 through an entropy encoder 1135.

In order for the video encoder 1100 according to an embodiment to be applied in the video encoding apparatus 800, components of the video encoder 1100, i.e., the inter predictor 1115, the intra predictor 1120, the transformer 1125, the quantizer 1130, the entropy encoder 1135, the dequantizer 1145, the inverse transformer 1150, the deblocker 1155, the SAO performer 1160, and the ALF performer 1170 perform operations based on each coding unit among coding units having a tree structure per largest coding unit.

In particular, the intra predictor 1120 and the inter predictor 1115 determine partitions and a prediction mode of each coding unit from among the coding units having a tree structure while considering the maximum size and the maximum depth of a current largest coding unit, and the transformer 1125 may determine whether to split a transform unit according to a quad-tree in each coding unit from among the coding units having the tree structure.

Figure 12:
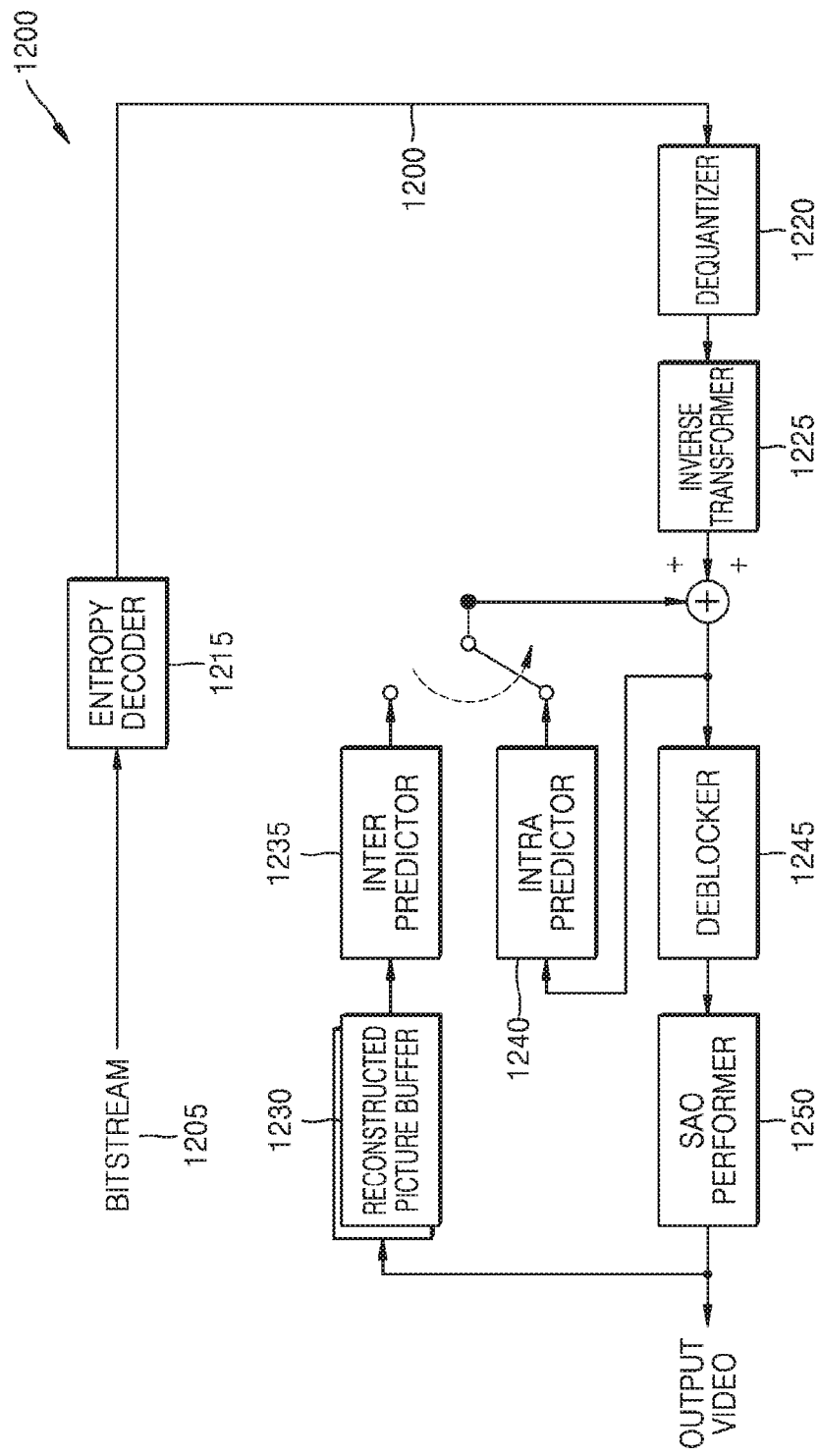
FIG. 12 is a block diagram of a video decoder based on coding units, according to an embodiment of the present disclosure.

FIG. 12 is a block diagram of a video decoder 1200 based on coding units, according to various embodiments.

An entropy decoder 1215 parses encoded image data that is to be decoded and encoding information required for decoding from a bitstream 1205. The encoded image data is a quantized transformation coefficient, and a dequantizer 1220 and an inverse transformer 1225 reconstruct residue data from the quantized transformation coefficient.

An intra predictor 1240 performs intra prediction on a coding unit in an intra mode according to prediction units. An inter predictor performs inter prediction on a coding unit in an inter mode from a current image according to prediction units, by using a reference image obtained by a reconstructed picture buffer 1230.

Data in a spatial domain of coding units of the current image is reconstructed by adding the residue data and the prediction data of a coding unit of each mode through the intra predictor and the inter predictor 1235, and the data in the spatial domain may be output as a reconstructed image through a deblocker 1245, an SAO performer 1250, and an ALF performer 1260. Also, reconstructed images stored in the reconstructed picture buffer 1230 may be output as reference images.

In order to decode the image data, the image data decoder 930 of the video decoding apparatus 900 may perform operations after the entropy decoder 1215 of the video decoder 1200 according to an embodiment.

In order for the video decoder 1200 to be applied in the video decoding apparatus 900 according to an embodiment, components of the video decoder 1200, i.e., the entropy decoder 1215, the dequantizer 1220, the inverse transformer 1225, the intra predictor 1240, the inter predictor 1235, the deblocker 1245, the SAO performer 1250, and the ALF performer 1260 may perform operations based on coding units having a tree structure for each largest coding unit.

In particular, the intra predictor 1240 and the inter predictor 1235 determine a partition mode and a prediction mode according to each of coding units having a tree structure, and the inverse transformer 1225 may determine whether to split a transform unit according to a quad-tree structure per coding unit.

An encoding operation of FIG. 10 and a decoding operation of FIG. 11 are respectively a video stream encoding operation and a video stream decoding operation in a single layer. Accordingly, when the encoder 12 of FIG. 1 encodes a video stream of at least two layers, the video encoding apparatus 10 of FIG. 1 may include as many video encoder 1100 as the number of layers. Similarly, when the decoder 24 of FIG. 2A decodes a video stream of at least two layers, the video decoding apparatus 20 of FIG. 2A may include as many image decoders 1200 as the number of layers.

Figure 13:
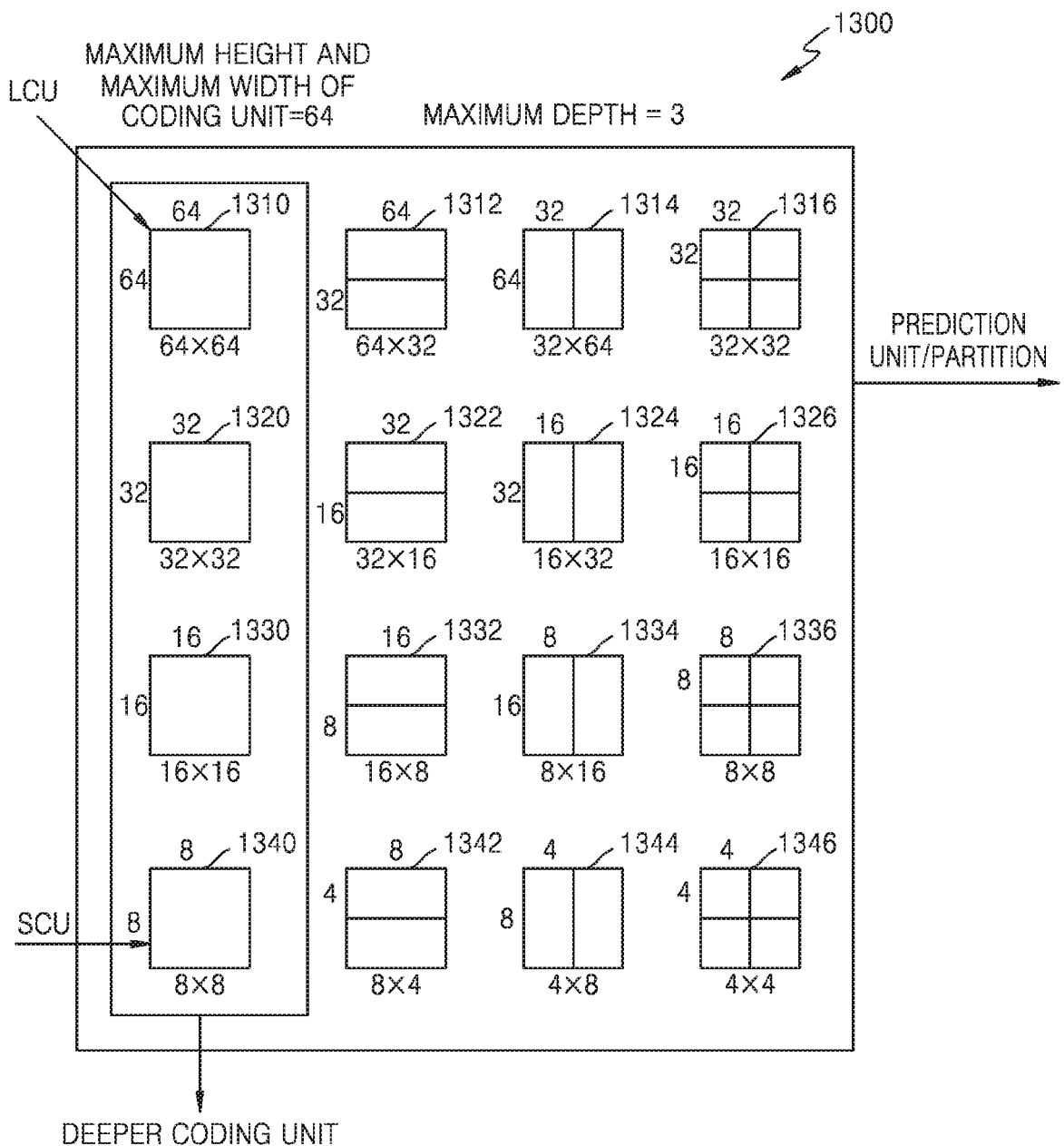
FIG. 13 is a diagram illustrating coding units and partitions, according to an embodiment of the present disclosure.

FIG. 13 is a diagram illustrating coding units and partitions, according to various embodiments.

The video encoding apparatus 800 according to an embodiment and the video decoding apparatus 900 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 1300 of coding units according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure 1300 of coding units according to an embodiment, a height and a width of the deeper coding unit are each split. Also, a prediction unit and partitions, which are bases for prediction encoding of each deeper coding unit, are shown along a horizontal axis of the hierarchical structure 1300.

That is, a coding unit 1310 is a largest coding unit in the hierarchical structure 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having a size of 8×8 and a depth of 3 is a smallest coding unit.

The prediction unit and the partitions of a coding unit are arranged along the horizontal axis according to each depth. That is, if the coding unit 1310 having a size of 64×64 and a depth of 0 is a prediction unit, the prediction unit may be split into partitions included in the encoding unit 1310 having a size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition having a size of 8×8 included in the coding unit 1340, partitions 1342 having a size of 8×4, partitions 1344 having a size of 4×8, and partitions 1346 having a size of 4×4.

In order to determine the depth of the largest coding unit 1310, the coding unit determiner 820 of the video encoding apparatus 800 according to an embodiment performs encoding for coding units corresponding to each depth included in the maximum coding unit 1310.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 1300. Alternatively, the minimum encoding error may be searched for by comparing the minimum encoding errors according to depths, by performing encoding for each depth as the depth deepens along the vertical axis of the hierarchical structure 1300. A depth and a partition having the minimum encoding error in the largest coding unit 1310 may be selected as the depth and a partition mode of the largest coding unit 1310.

Figure 14:
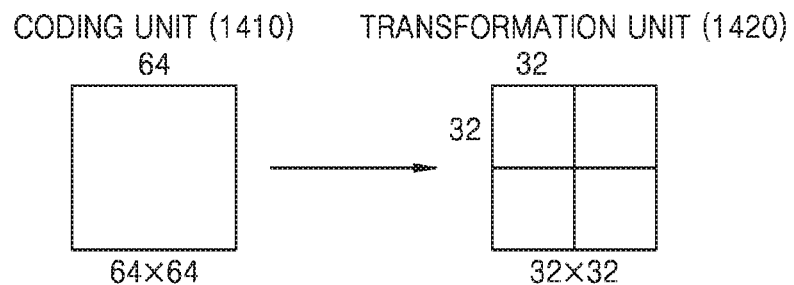
FIG. 14 is a diagram for describing a relationship between a coding unit and transform units, according to an embodiment of the present disclosure.

FIG. 14 is a diagram for describing a relationship between a coding unit and transform units, according to various embodiments.

The video encoding apparatus 800 according to an embodiment or the video decoding apparatus 900 according to an embodiment encodes or decodes an image according to coding units having sizes less than or equal to a largest coding unit for each largest coding unit. Sizes of transform units for transformation during encoding may be selected based on data units that are not larger than a corresponding coding unit.

For example, in the video encoding apparatus 800 according to an embodiment or the video decoding apparatus 900 according to an embodiment, if a size of a coding unit 1410 is 64×64, transformation may be performed by using a transform unit 1420 having a size of 32×32.

Also, data of the coding unit 1410 having the size of 64×64 may be encoded by performing the transformation on each of the transform units having the size of 32×32, 16×16, 8×8, and 4×4, which are smaller than 64×64, and then a transform unit having the minimum coding error may be selected.

Figure 15:
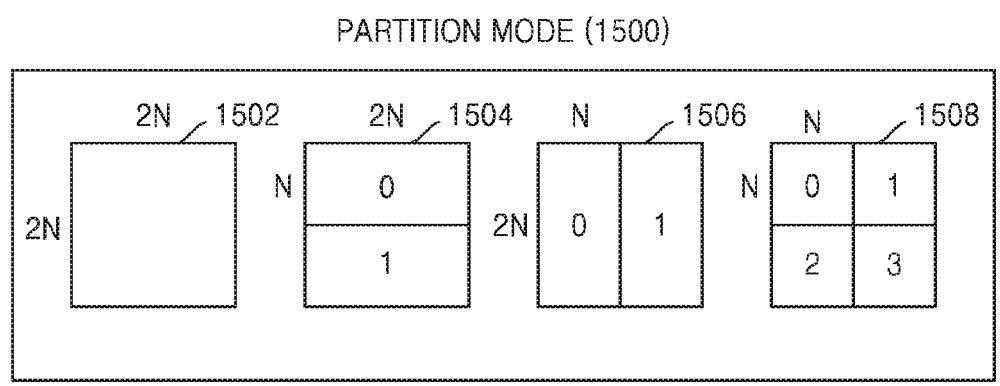
FIG. 15 illustrates a plurality of pieces of encoding information, according to an embodiment of the present disclosure.
Figure 15:
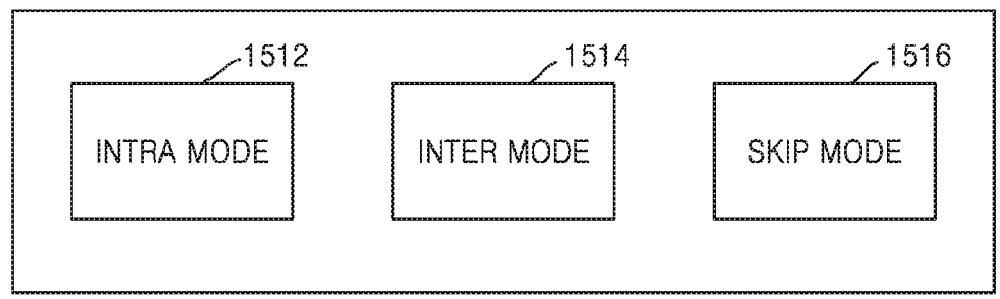
Figure 15:
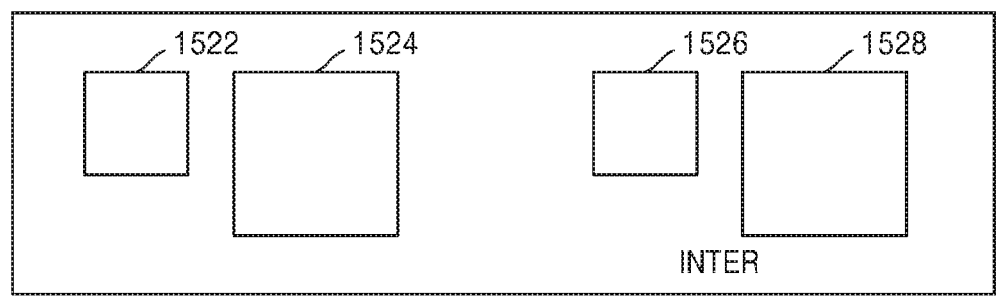

FIG. 15 illustrates a plurality of pieces of encoding information, according to various embodiments.

The output unit 830 of the video encoding apparatus 800 according to an embodiment may encode and transmit partition mode information 1500, prediction mode information 1510, and transform unit size information 1520 for each coding unit corresponding to a depth, as split information.

The partition mode information 1500 indicates information about a shape of a partition obtained by splitting a prediction unit of a current coding unit, wherein the partition is a data unit for prediction encoding the current coding unit.

For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. In this case, the partition mode information 1500 about a partition type of a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transform unit size information 1520 indicates a transform unit to be based on when transformation is performed on a current coding unit. For example, the transform unit may be a first intra transform unit 1522, a second intra transform unit 1524, a first inter transform unit 1526, or a second inter transform unit 1528.

The image data and encoding information extractor 920 of the video decoding apparatus 900 according to an embodiment may extract and use the partition mode information 1500, the prediction mode information 1510, and the transform unit size information 1520 for decoding, according to each deeper coding unit.

Figure 16:
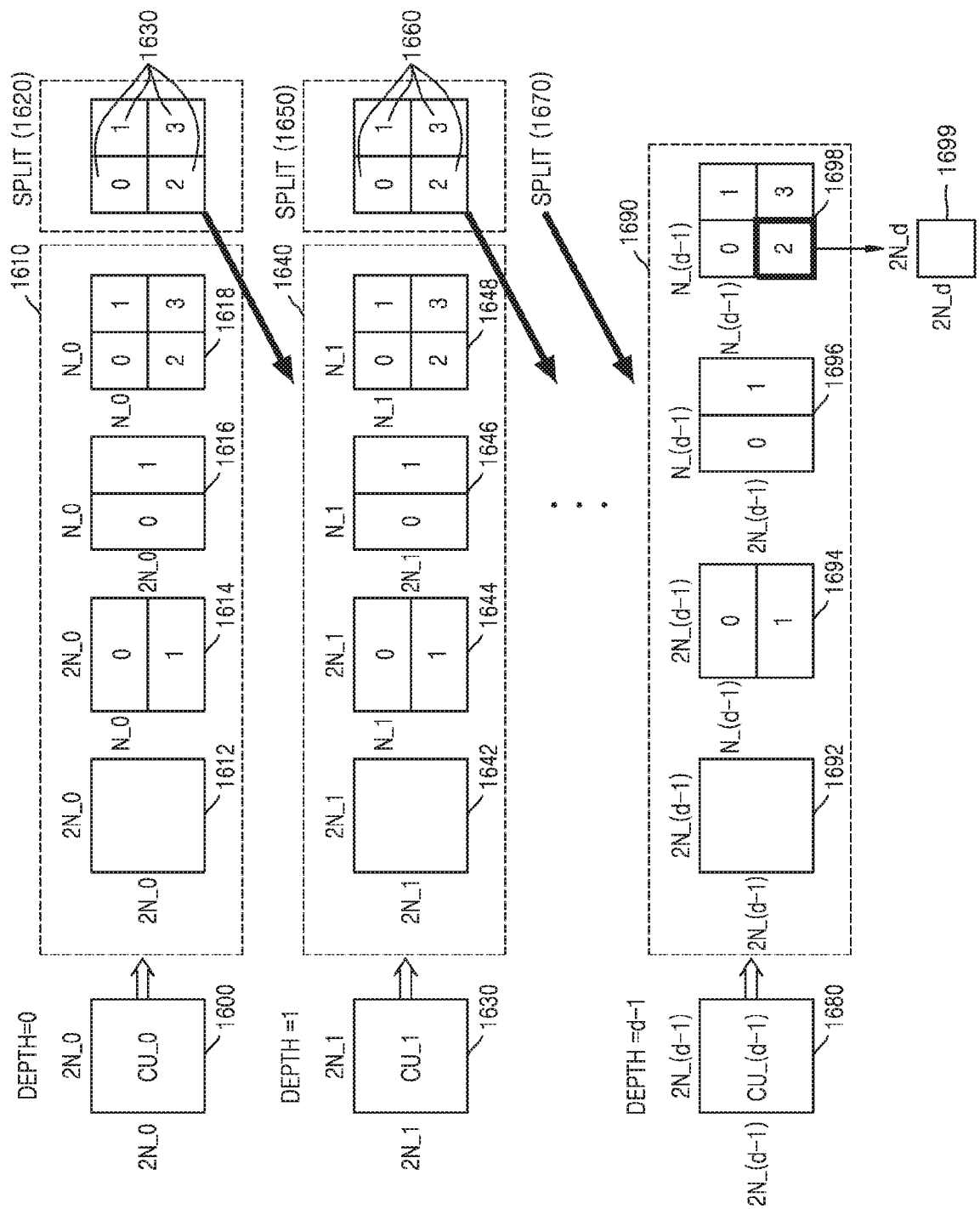
FIG. 16 is a diagram of coding units, according to an embodiment of the present disclosure.

FIG. 16 is a diagram of deeper coding units according to depths, according to various embodiments.

Split information may be used to indicate a change of a depth. The spilt information indicates whether a coding unit of a current depth is to be split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. FIG. 16 only illustrates the partitions 1612, 1614, 1616, and 1618 that are obtained by symmetrically splitting the prediction unit, but a partition mode is not limited thereto, and the partitions of the prediction unit may include asymmetrical partitions, partitions having an arbitrary shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error in one of the partition mode 1612 having the size of 2N_0×2N_0, the partition mode 1614 having the size of 2N_0×N_0, and the partition mode 1616 having the size of N_0×2N_0 is a minimum error, the prediction unit 1610 may not be split into a lower depth.

If the encoding error in the partition mode 1618 having the size of N_0×N_0 is a minimum error, a depth is changed from 0 to 1 to split the partition mode 1618 in operation 1620, and encoding is repeatedly performed on coding units 1630 in a partition mode having a depth of 2 and a size of N_0×N_0 to search for a minimum encoding error.

A prediction unit 1640 for prediction encoding the coding unit 1630 having a depth of 1 and a size of 2N_1×2N_1 (=N_0×N_0) may include partitions of a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If the encoding error in the partition mode 1648 having the size of N_1×N_1 is a minimum error, a depth is changed from 1 to 2 to split the partition mode 1648 in operation 1650, and encoding is repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split in operation 1670, a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes to search for a partition mode having a minimum encoding error.

Even when the partition mode 1698 has the minimum encoding error, since a maximum depth is d, a coding unit CU_(d−1) having a depth of d−1 is no longer split to a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for a coding unit 1652 having a depth of d−1 is not set.

A data unit 1699 may be a 'minimum unit' for the current largest coding unit. A minimum unit according to an embodiment may be a square data unit obtained by splitting a smallest coding unit having a lowermost depth by 4. By performing the encoding repeatedly, the video encoding apparatus 800 according to an embodiment may select a depth having the minimum encoding error by comparing encoding errors according to depths of the coding unit 1600 to determine a depth, and set a corresponding partition mode and a prediction mode as an encoding mode of the depth.

As such, the minimum encoding errors according to depths are compared in all of the depths of 0, 1, . . . , d−1, d, and a depth having the minimum encoding error may be determined as a depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 920 of the video decoding apparatus 900 according to an embodiment may extract and use the information about the depth and the prediction unit of the coding unit 1600 so as to decode the partition 1612. The video decoding apparatus 900 according to various embodiments may determine a depth, in which split information is 0, as a depth by using split information according to depths, and may use split information of the corresponding depth for decoding.

encoding information that may be set by the video encoding and decoding apparatuses 800 and 900 according to embodiments.

TABLE 1

Split Information 0
(Encoding on Coding Unit having Size of 2N × 2N and Current Depth of d)

| | Partition Mode | | Size of Transform unit | | |
|---|---|---|---|---|---|
| Prediction Mode | Symmetrical Partition Mode | Asymmetrical Partition Mode | Split Information 0 of Transform unit | Split Information 1 of Transform unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | Repeatedly Encode Coding Units having Lower Depth of d + 1 |

Figure 17:
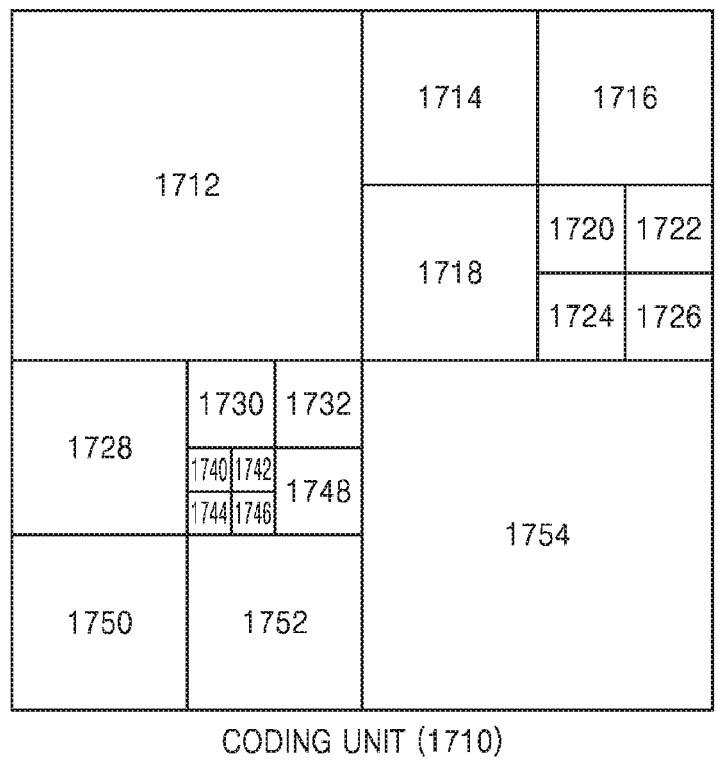
FIGS. 17, 18, and 19 are diagrams for describing a relationship between coding units, prediction units, and transform units, according to an embodiment of the present disclosure.
Figure 18:
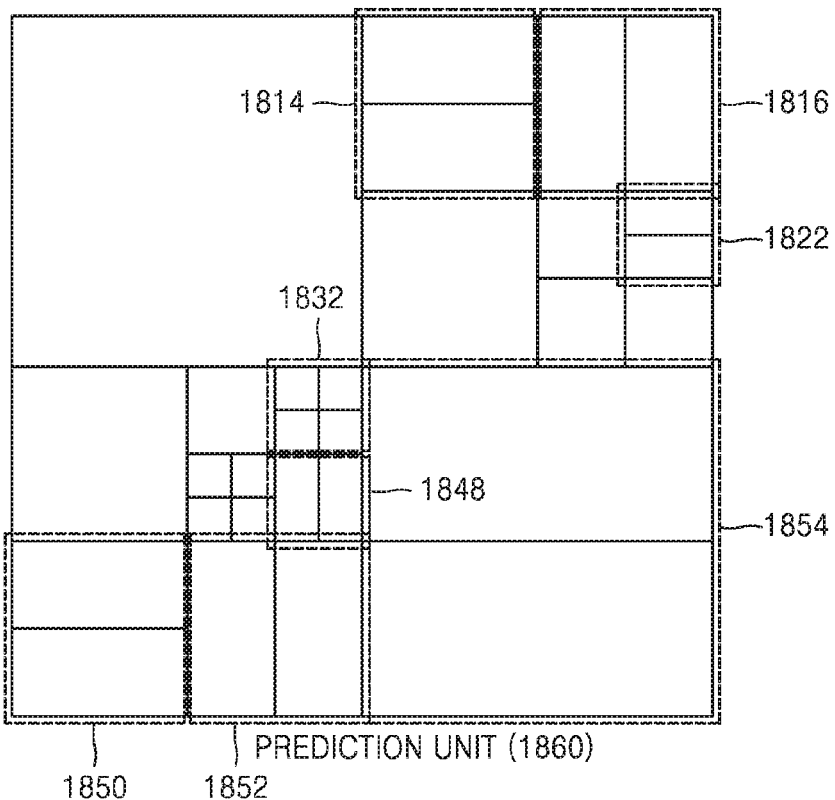
Figure 19:
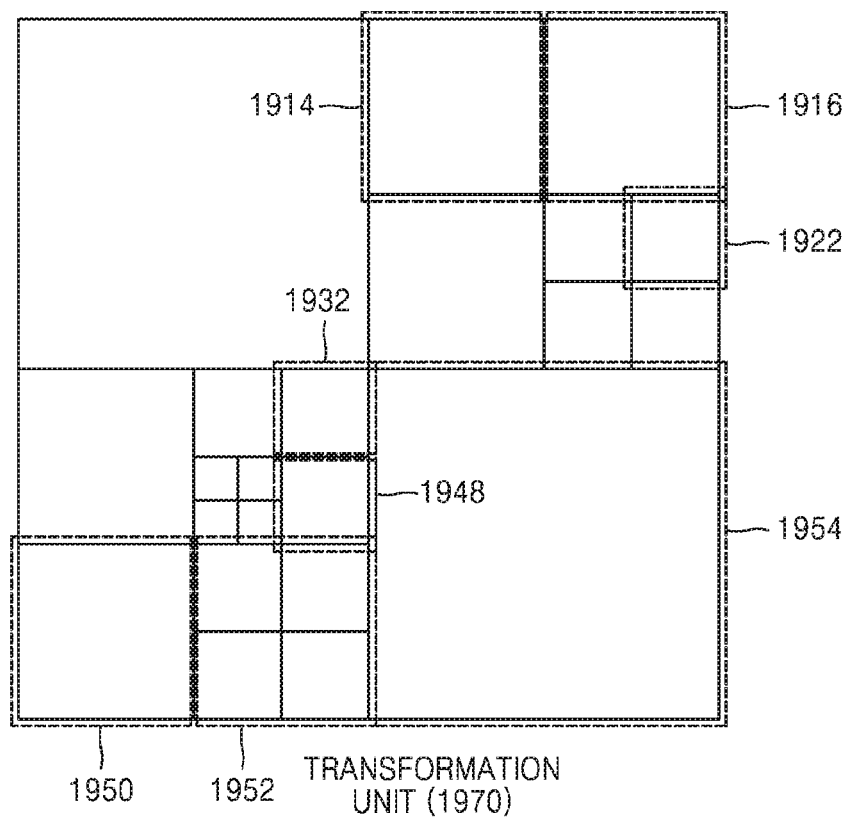

FIGS. 17, 18, and 19 are diagrams for describing a relationship between coding units, prediction units, and transform units, according to various embodiments.

Coding units 1710 are coding units having a tree structure, according to depths determined by the video encoding apparatus 800 according to an embodiment, in a largest coding unit. Prediction units 1760 are partitions of prediction units of each of coding units according to depths, and transform units 1770 are transform units of each of coding units according to depths.

When a depth of a largest coding unit is 0 in the coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

In the prediction units 1760, some encoding units 1714, 1716, 1722, 1732, 1748, 1750, 1752, and 1754 are obtained by splitting the coding units in the encoding units 1710. That is, partition modes in the coding units 1714, 1722, 1750, and 1754 have a size of 2N×N, partition modes in the coding units 1716, 1748, and 1752 have a size of N×2N, and a partition modes of the coding unit 1732 has a size of N×N. Prediction units and partitions of the coding units 1710 are smaller than or equal to each coding unit.

Transformation or inverse transformation is performed on image data of the coding unit 1752 in the transform units 1770 in a data unit that is smaller than the coding unit 1752. Also, the coding units 1714, 1716, 1722, 1732, 1748, 1750, 1752, and 1754 in the transform units 1770 are data units different from those in the prediction units 1760 in terms of sizes and shapes. That is, the video encoding and decoding apparatuses 800 and 900 according to embodiments may perform intra prediction, motion estimation and motion compensation, and transformation and inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transform unit. Table 1 shows the The output unit 830 of the video encoding apparatus 800 according to an embodiment may output the encoding information about the coding units having a tree structure, and the image data and encoding information extractor 920 of the video decoding apparatus 900 according to an embodiment may extract the encoding information about the coding units having a tree structure from a received bitstream.

Split information indicates whether a current coding unit is to be split into coding units of a lower depth. If split information of a current depth d is 0, a depth, in which a current coding unit is no longer split into a lower depth, is a depth, and thus information about a partition mode, prediction mode, and a size of a transform unit may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transform unit may be set to be two types in the intra mode and two types in the inter mode. That is, if split information of the transform unit is 0, the size of the transform unit may be 2N×2N, which is the size of the current coding unit. If the split information of the transform unit is 1, the transform units may be obtained by splitting the current coding unit. Also, if a partition mode of the current coding unit having the size of 2N×2N is a symmetrical partition mode, a size of a transform unit may be N×N, and if the partition type of the current coding unit is an asymmetrical partition mode, the size of the transform unit may be N/2×N/2.

The encoding information about coding units having a tree structure according to an embodiment may be assigned to at least one of a coding unit corresponding to a depth, a prediction unit, and a minimum unit. The coding unit corresponding to the depth may include at least one of a prediction unit and a minimum unit that have the same encoding information.

Accordingly, it is determined whether adjacent data units are included in the same coding unit corresponding to the depth by comparing a plurality of pieces of encoding information of the adjacent data units. Also, since a coding unit corresponding to a depth is determined by using encoding information of a data unit, a distribution of depths in a largest coding unit may be inferred therefrom.

Accordingly, if a current coding unit is predicted based on encoding information of adjacent data units, encoding information of data units in deeper coding units adjacent to the current coding unit may be directly referred to and used.

As another example, if a current coding unit is prediction-encoded by referring to adjacent coding units, a data unit that is adjacent to the current coding unit and is in adjacent deeper coding units is searched by using a plurality of pieces of encoding information of the adjacent coding units, in such a manner that the adjacent coding units may be referred to.

Figure 20:
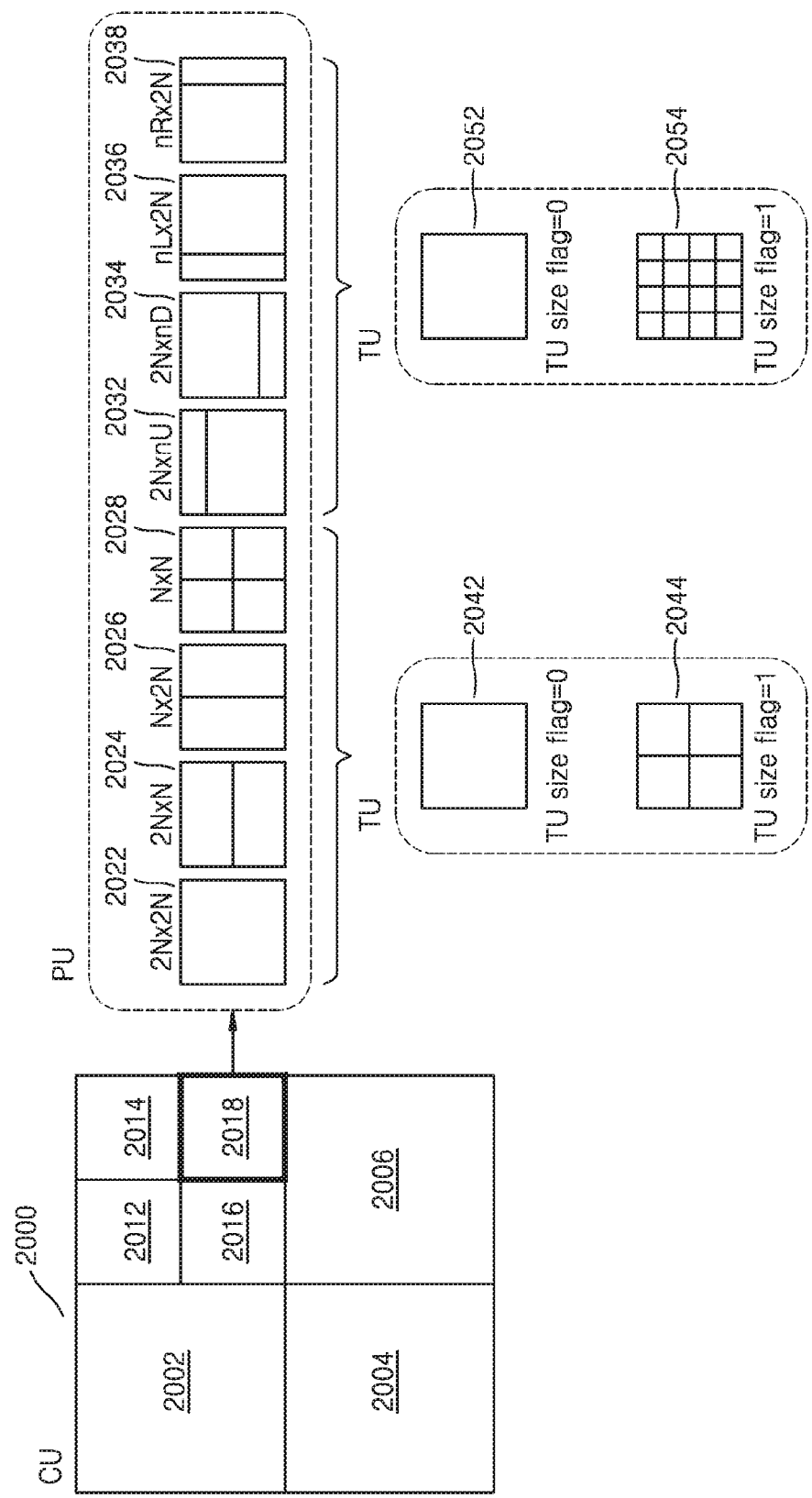
FIG. 20 is a diagram for describing a relationship between a coding unit, a prediction unit, and a transform unit, according to encoding mode information of Table 1.

FIG. 20 is a diagram for describing a relationship between a coding unit, a prediction unit, and a transform unit, according to encoding mode information of Table 1.

A largest coding unit 2000 includes coding units 2002, 2004, 2006, 2012, 2014, 2016, and 2018 of depths. Here, since the coding unit 2018 is a coding unit of a depth, split information may be set to 0. Information about a partition mode of the coding unit 2018 having a size of 2N×2N may be set to be one of a partition mode 2022 having a size of 2N×2N, a partition mode 2024 having a size of 2N×N, a partition mode 2026 having a size of N×2N, a partition mode 2028 having a size of N×N, a partition mode 2032 having a size of 2N×nU, a partition mode 2034 having a size of 2N×nD, a partition mode 2036 having a size of nL×2N, and a partition mode 2038 having a size of nR×2N.

Transform unit split information (TU size flag) is a type of a transformation index. A size of a transform unit corresponding to the transformation index may be changed according to a prediction unit type or a partition mode of the coding unit.

For example, when information about the partition mode is set to be symmetrical, i.e. the partition mode 2022 having a size of 2N×2N, the partition mode 2024 having a size of 2N×N, the partition mode 2026 having a size of N×2N, or the partition mode 2028 having a size of N×N, a transform unit 2042 having a size of 2N×2N may be set if the TU size flag of the transform unit is 0, and a transform unit 2044 having a size of N×N may be set if the TU size flag is 1.

When the information about the partition mode is set to be asymmetrical, i.e., the partition mode 2032 having a size of 2N×nU, the partition mode 2034 having a size of 2N×nD, the partition mode 2036 having a size of nL×2N, or the partition mode 2038 having a size of nR×2N, a transform unit 2052 having a size of 2N×2N may be set if the TU size flag is 0, and a transform unit 2054 having a size of N/2×N/2 may be set if the TU size flag is 1.

Referring to FIG. 20, the TU size flag is a flag having a value or 0 or 1, but the TU size flag according to an embodiment is not limited to a flag of 1 bit, and the transform unit may be hierarchically split while the TU size flag increases from 0. The TU size flag may be an example of the transformation index.

In this case, the size of the transform unit that has been actually used may be expressed by using the TU size flag according to an embodiment together with a maximum size of the transform unit and a minimum size of the transform unit. The video encoding apparatus 800 according to an embodiment may encode maximum-transform unit size information, minimum-transform unit size information, and maximum-TU size flag information. The result of encoding the maximum-transform unit size information, the minimum-transform unit size information, and the maximum-TU size flag information may be inserted into an SPS. The video decoding apparatus 900 according to an embodiment may decode video by using the maximum-transform unit size information, the minimum-transform unit size information, and the maximum-TU size flag information.

For example, (a) if a size of a current coding unit is 64×64 and a maximum transform unit size is 32×32, (a–1) then a size of a transform unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transform unit size is 32×32, (b–1) then the size of the transform unit may be 32×32 when the TU size flag is 0. Here, the TU size flag cannot be set to a value other than 0, since the size of the transform unit cannot be less than 32×32.

As another example, (c) if the size of the current coding unit is 64×64 and the maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transform unit size is 'MinTransformSize', and a transform unit size is 'RootTuSize' when the TU size flag is 0, then a current minimum transform unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \qquad (1)$$

Compared to the current minimum transform unit size 'CurrMinTuSize' that can be determined in the current coding unit, a transform unit size 'RootTuSize' when the TU size flag is 0 may denote a maximum transform unit size that can be selected in the system. In Equation (1), 'RootTuSize/(2^MaxTransformSizeIndex)' denotes a transform unit size when the transform unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transform unit size 'CurrMinTuSize' that can be determined in the current coding unit.

The maximum transform unit size RootTuSize according to an embodiment may vary according to a prediction mode.

For example, if a current prediction mode is an inter mode, then 'RootTuSize' may be determined by using Equation (2) below. In Equation (2), 'MaxTransformSize' denotes a maximum transform unit size, and 'PUSize' denotes a current prediction unit size.

$$\text{RootTuSize} = \min(\text{MaxTransformSize}, \text{PUSize}) \qquad (2)$$

That is, if the current prediction mode is the inter mode, the transform unit size 'RootTuSize', when the TU size flag is 0, may be a smaller value from among the maximum transform unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transform unit size 'RootTuSize' when the TU size flag is 0 may be a smaller value from among the maximum transform unit size and the size of the current partition unit.

However, the current maximum transform unit size 'RootTuSize' that varies according to the type of a prediction mode in a partition unit is just an example, and a factor capable of determining the current maximum transform unit size is not limited thereto.

According to the video encoding method based on coding units having a tree structure as described with reference to FIGS. 8 through 20, image data of a spatial domain is encoded for each coding unit of a tree structure. According to the video decoding method based on coding units having a tree structure, decoding is performed for each largest coding unit so as to reconstruct the image data of the spatial domain. By doing so, a picture and a video that is a picture sequence may be reconstructed. The reconstructed video may be reproduced by a reproducing apparatus, may be stored in a storage medium, or may be transmitted through a network.

The embodiments according to the present disclosure may be written as computer programs and may be implemented in general-use digital computers that execute the programs using a non-transitory computer-readable recording medium. Examples of the non-transitory computer-readable recording medium include magnetic storage media (e.g., ROM, floppy discs, hard disks, etc.) and optical recording media (e.g., CD-ROMs, or DVDs).

For convenience of description, the video encoding method and/or the video encoding method described above with reference to FIGS. 1 through 20 will be collectively referred to as a 'video encoding method of the present disclosure'. In addition, the video decoding method and/or the video decoding method described above with reference to FIGS. 1 through 20 will be referred to as a 'video decoding method of the present disclosure'.

Also, a video encoding apparatus including the video encoding apparatus 10, the video encoding apparatus 800, or the video encoder 1100, which has been described with reference to FIGS. 1 through 20, will be referred to as a 'video encoding apparatus of the present disclosure'. In addition, a video decoding apparatus including the video decoding apparatus 20, the video decoding apparatus 900, or the video decoder 1200, which has been descried with reference to FIGS. 1 through 20, will be referred to as a 'video decoding apparatus of the present disclosure'.

The non-transitory computer-readable recording medium such as a disc 26000 that stores the programs according to an embodiment will now be described in detail.

Figure 21:
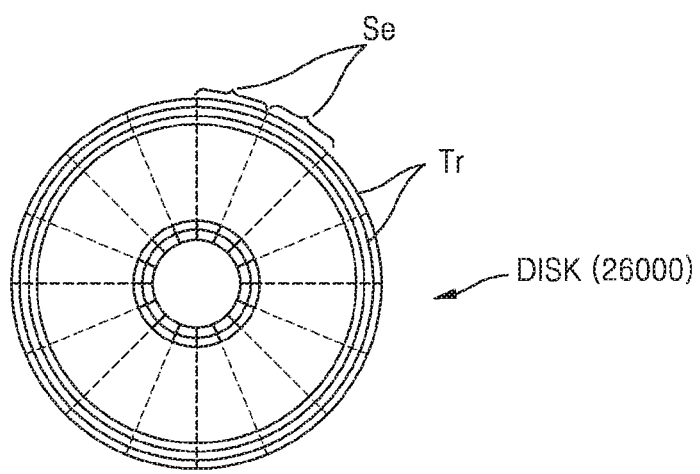
FIG. 21 is a diagram of a physical structure of a disc in which a program is stored, according to an embodiment.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to an embodiment, a program that executes the quantization parameter determining method, the video encoding method, and the video decoding method described above may be assigned and stored.

A computer system embodied using the storage medium that stores the program for executing the video encoding method and the video decoding method as described above will now be described with reference to FIG. 22.

Figure 22:
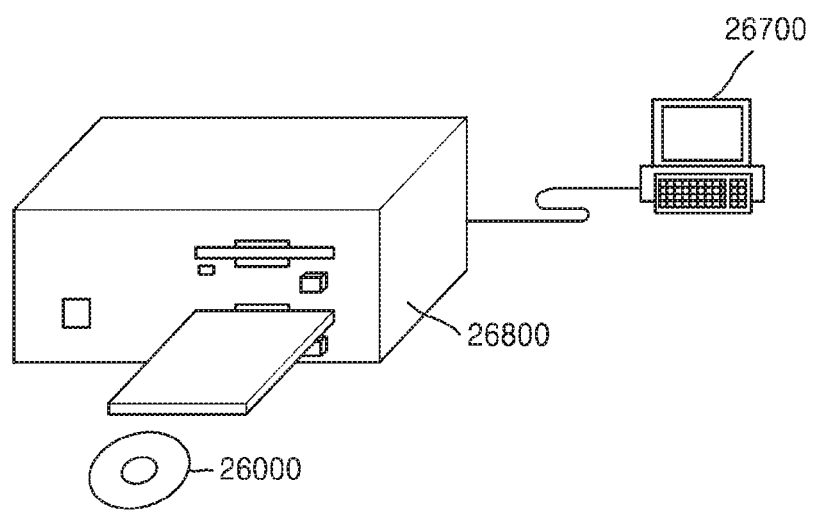
FIG. 22 is a diagram of a disc drive for recording and reading a program by using the disc.

FIG. 22 is a diagram of a disc drive 26800 for recording and reading a program by using the disc 26000. A computer system 26700 may store a program that executes at least one of the video encoding method and the video decoding method of the present disclosure, in the disc 26000 via the disc drive 26800. In order to execute the program stored in the disc 26000 in the computer system 26700, the program may be read from the disc 26000 and be transmitted to the computer system 26700 by using the disc drive 26800.

The program that executes at least one of the video encoding method and the video decoding method of the present disclosure may be stored not only in the disc 26000 illustrated in FIGS. 21 and 22 but may also be stored in a memory card, a ROM cassette, or a solid state drive (SSD).

A system to which the video encoding method and the video decoding method according to the embodiments described above are applied will be described below.

Figure 23:
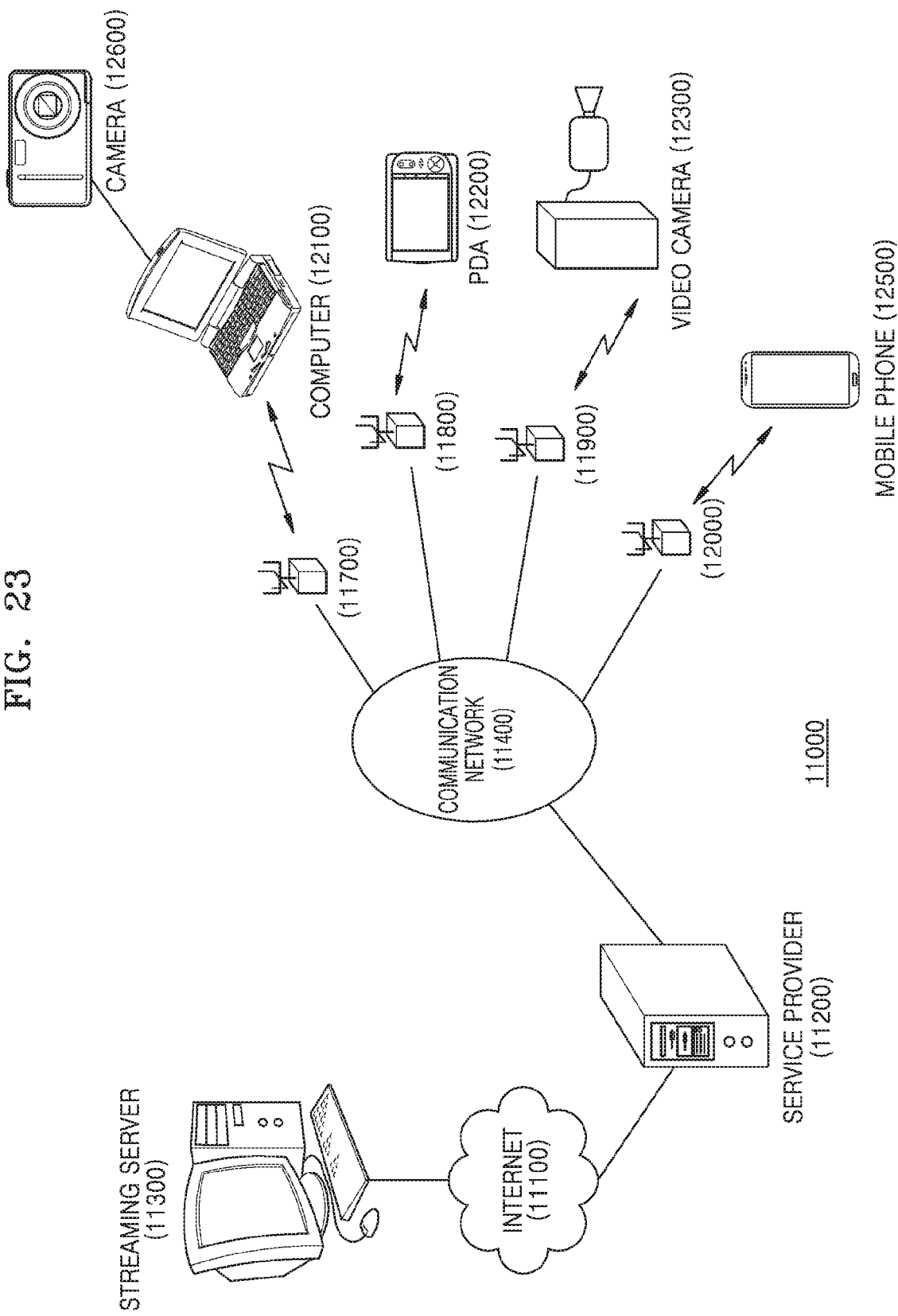
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as that illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by using the video camera 12300 may be transmitted to the streaming server 11300 via the computer 12100.

Video data captured by using a camera 12600 may also be transmitted to the streaming server 11300 via the computer 12100. The camera 12600 that is similar to a digital camera is an imaging device capable of capturing both still images and video images. The video data captured by using the camera 12600 may be encoded by the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by using a camera mounted in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients, for example, the computer 12100, the PDA 12200, the video camera 12300, or the mobile phone 12500, are devices capable of decoding the encoded content data. Thus, the content supply system 11000 allows the clients to receive and reproduce the encoded content data. Also, the content supply system 11000 allows the clients to receive the encoded content data and decode and reproduce the encoded content data in real-time, thereby enabling personal broadcasting.

The video encoding apparatus and the video decoding apparatus of the present disclosure may be applied to encoding and decoding operations of the plurality of independent devices included in the content supply system 11000.

Figure 24:
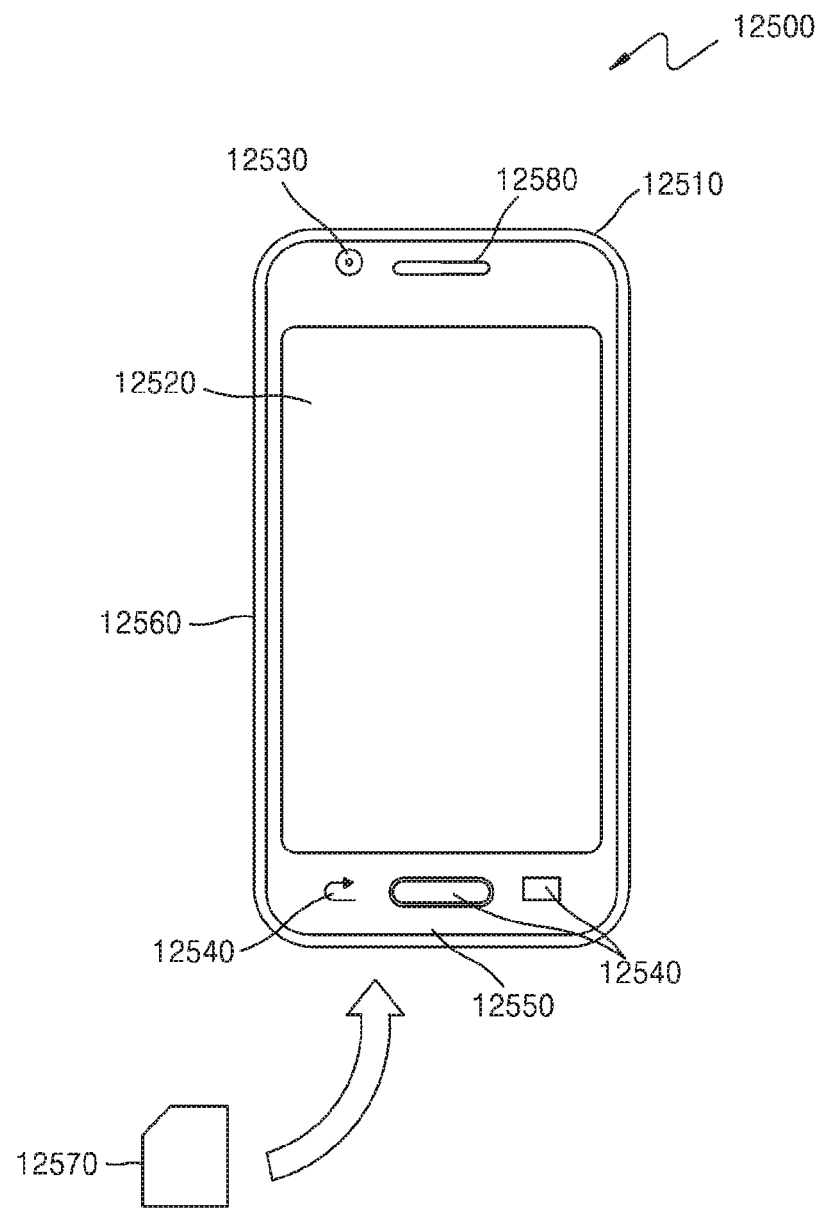
FIGS. 24 and 25 illustrate external and internal structures of a mobile phone to which the video encoding method and the video decoding method of the present disclosure are applied, according to embodiments.
Figure 25:
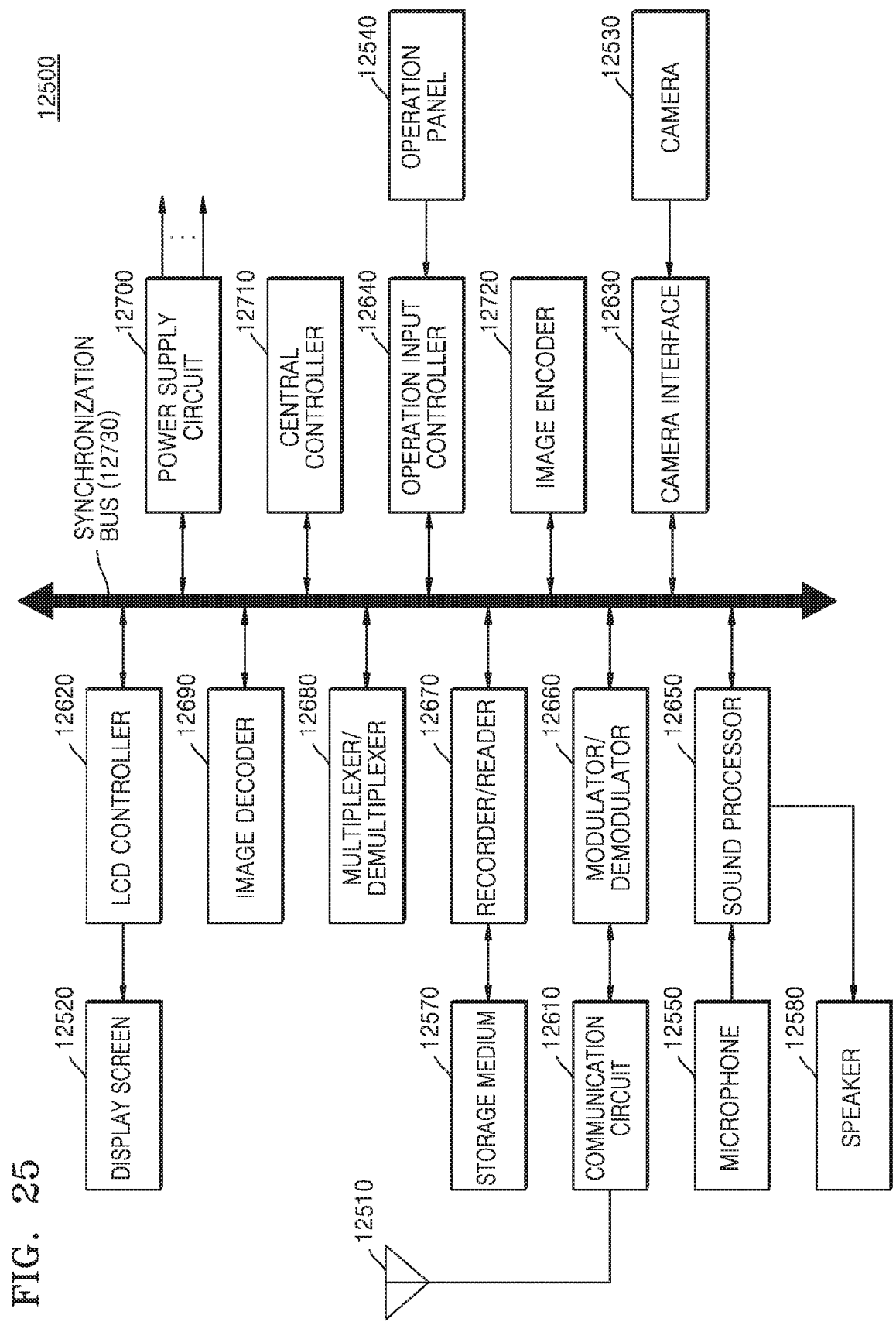

With reference to FIGS. 24 and 25, an embodiment of the mobile phone 12500 included in the content supply system 11000 will now be described in detail below.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a read-only memory (ROM), and a random-access memory (RAM)

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650, under control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by using the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the aforementioned video encoding apparatus of the present disclosure. The image encoding unit 12720 may transform the image data received from the camera 12530 into compressed and encoded image data according to the aforementioned video encoding method of the present disclosure, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from an outer source, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

In the data communication mode, when data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the aforementioned video decoding apparatus of the present disclosure. The image decoding unit 12690 may decode the encoded video data to generate reconstructed video data and may provide the reconstructed video data to the display screen 12520 via the LCD controller 12620, according to the aforementioned video decoding method of the present disclosure.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transceiving terminal including only the video encoding apparatus of the present disclosure, or may be a transceiving terminal including only the video decoding apparatus of the present disclosure.

Figure 26:
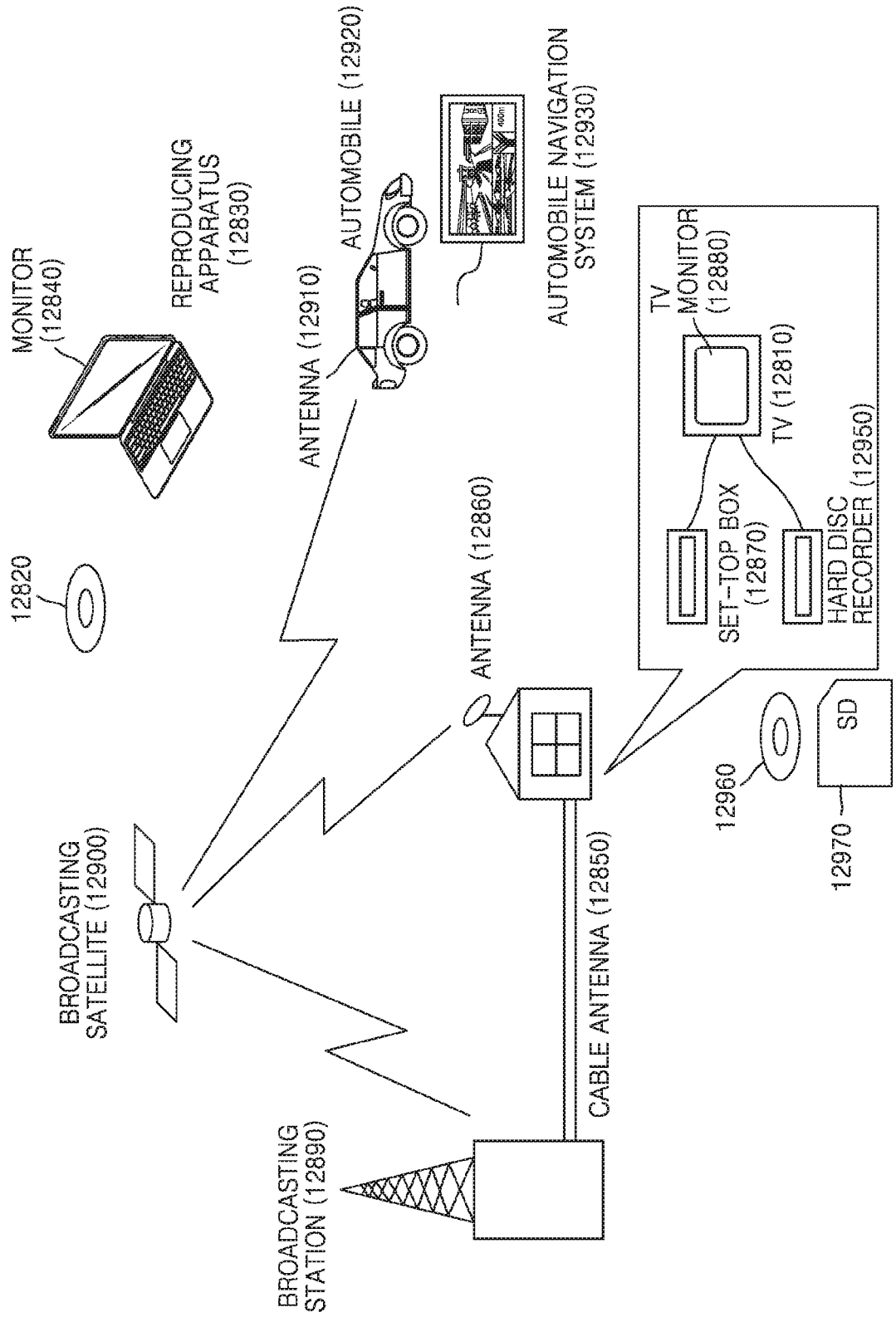
FIG. 26 illustrates a digital broadcasting system employing a communication system, according to an embodiment.

A communication system according to the present disclosure is not limited to the communication system described above with reference to FIG. 24. For example, FIG. 26 illustrates a digital broadcasting system employing a communication system, according to an embodiment. The digital broadcasting system of FIG. 26 according to an embodiment may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus of the present disclosure according to an embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not include the camera 12530, the camera interface 12630, and the image encoding unit 12720 of FIG. 26.

Figure 27:
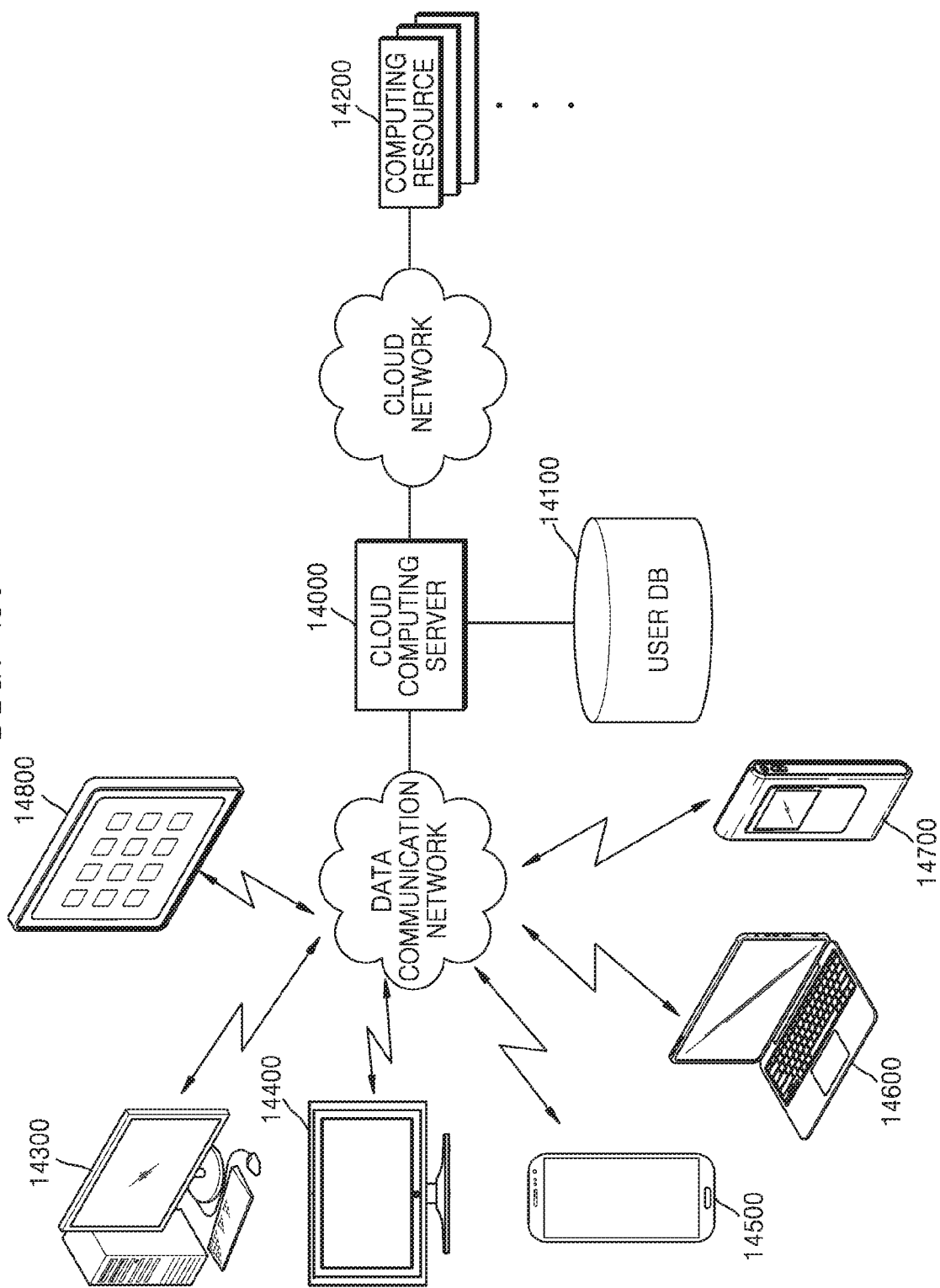
FIG. 27 is a diagram illustrating a network structure of a cloud computing system using the video encoding apparatus and the video decoding apparatus, according to an embodiment.

FIG. 27 is a diagram illustrating a network structure of a cloud computing system using a video encoding apparatus and a video decoding apparatus, according to various embodiments.

The cloud computing system of the present disclosure may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a user who uses a specified service is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1 through 20. As another example, the user terminal may include the video encoding apparatus of the present disclosure as described above with reference to FIGS. 1 through 20. Alternatively, the user terminal may include both the video decoding apparatus and the video encoding apparatus of the present disclosure as described above with reference to FIGS. 1 through 20.

Various applications of the video encoding method, the video decoding method, the video encoding apparatus, and the video decoding apparatus according to various embodiments described above with reference to FIGS. 1 through 20 are described above with reference to FIGS. 21 through 27. However, embodiments with respect to methods of storing the video encoding method and the video decoding method in a storage medium or methods of implementing the video encoding apparatus and the video decoding apparatus in a device according to various embodiments described above with reference to FIGS. 1 through 20 are not limited to the embodiments described above with reference to FIGS. 21 through 27.

It should be understood that the various embodiments described therein should be considered in a descriptive sense only and not for purposes of limitation. Descriptions of features or aspects within each embodiment should typically be considered as available for other similar features or aspects in other embodiments. Therefore, the scope of the disclosure is defined not by the detailed description of the disclosure but by the appended claims, and all differences within the scope will be construed as being included in the present disclosure.

The invention claimed is:
1. A video encoding apparatus comprising:
an encoder configured to generate encoded video data by encoding an input video;
a decoder configured to decode video data to which a filter to compensate for a pixel value is to be applied, wherein the video data is from the encoded video data;
a deblocking filter unit configured to apply, to the decoded video data, a deblocking filter to remove a block effect;
a first filter parameter predictor configured to generate first filter parameter by using information of the decoded video data, wherein the first filter parameter is configured to be applied to a first filter to compensate for a value of a current pixel by using a value of a neighboring pixel adjacent to the current pixel and a filter coefficient with respect to the neighboring pixel;
a second filter unit configured to apply a second filter to the decoded video data, wherein the second filter compensates for a value of a current pixel by using directionality information used in encoding the decoded video data;

a first filter unit configured to apply, by using the first filter parameter, the first filter to video data to which the second filter has been applied; and an entropy encoder configured to perform entropy encoding on the first filter parameter, wherein the first filter parameter predictor comprises a third filter parameter predictor and a fourth filter parameter predictor, wherein the third filter parameter predictor is configured to generate the first filter parameter by using the information of the decoded video data to which the deblocking filter has not been applied, wherein the fourth filter parameter predictor is configured to generate the first filter parameter by using the information of the decoded video data to which the deblocking filter has been applied and the second filter has not been applied, and wherein the video encoding apparatus selects one of the third filter parameter predictor and the fourth filter parameter predictor to generate the first filter parameter according to a preset method.

2. The video encoding apparatus of claim 1, wherein the second filter unit is further configured to apply the second filter to decoded video data to which the deblocking filter has been applied.

3. The video encoding apparatus of claim 1, wherein the fourth filter parameter predictor is further configured to predict a first filter parameter of video data to which the second filter has been applied, by using information of the decoded video data to which the deblocking filter has been applied.

4. The video encoding apparatus of claim 1, a second filter parameter predictor configured to generate a second filter parameter to be applied to a second filter to the decoded video data, by using the information of the decoded video data to which the deblocking filter has not been applied, and wherein the second filter unit is further configured to apply the second filter to the decoded video data by using the second filter parameter.

5. The video encoding apparatus of claim 4, wherein the fourth filter parameter predictor is further configured to predict a first filter parameter of video data to which the second filter has been applied, by using information of the decoded video data to which the deblocking filter has been applied, and the entropy encoder is further configured to perform entropy encoding on the second filter parameter.

6. The video encoding apparatus of claim 4, wherein the second filter parameter predictor is further configured to predict the second filter parameter by using intra mode information used in encoding the decoded video data.

7. The video encoding apparatus of claim 4, wherein the second filter parameter predictor is further configured to predict a second filter parameter of a current block by using a second filter parameter of a previous block to which a second filter has been applied before a second filter is applied to the current block in the decoded video data.

8. The video encoding apparatus of claim 4, wherein the second filter parameter predictor is further configured to predict a second filter parameter of a current block by using information of a spatially-neighboring block located in a same picture as a picture of a reconstructed video in which the current block is located, and the information of the spatially-neighboring block comprises at least one of a pixel value, intra mode information, and a second filter parameter of the spatially-neighboring block.

9. The video encoding apparatus of claim 4, wherein the second filter parameter predictor is further configured to predict a second filter parameter of a current block by using information of a temporally-neighboring block located in a picture having different image sequence information from image sequence information of a picture of a reconstructed video in which the current block is located, and the information of the temporally-neighboring block comprises at least one of a pixel value, intra mode information, and a second filter parameter of the temporally-neighboring block.

10. The video encoding apparatus of claim 4, wherein the second filter parameter predictor is further configured to predict a second filter parameter of a current block by using at least one of information of a spatially-neighboring block located in a same picture as a picture of a reconstructed video in which the current block is located and information of a temporally-neighboring block located in a picture having different time information from time information of a picture of the reconstructed video in which the current block is located, and information of the current block to which a deblocking filter has not been applied.

11. The video encoding apparatus of claim 1, wherein the entropy encoder is further configured to perform entropy encoding on the generated first filter parameter before the first filter unit applies, by using the generated first filter parameter, a first filter to a current block to which the second filter has been applied.

12. A video encoding method performed by a video encoding apparatus, the video encoding method comprising:

generating encoded video data by encoding an input video;

decoding video data to which a filter to compensate for a pixel value is to be applied, wherein the video data is from the encoded video data;

applying a deblocking filter to the decoded video data to remove a block effect;

generating a first filter parameter by using information of the decoded video data, wherein the first filter parameter is configured to be applied to a first filter to compensate for a value of a current pixel by using a value of a neighboring pixel adjacent to the current pixel and a filter coefficient with respect to the neighboring pixel;

applying a second filter to the decoded video data, wherein the second filter compensates for a value of a current pixel by using directionality information used in encoding the decoded video data;

applying, by using the first filter parameter, the first filter to video data to which the second filter has been applied; and performing entropy encoding on the first filter parameter, wherein the generating of the first filter parameter comprises generating the first filter parameter by using one of the information of the decoded video data to which the deblocking filter has been applied and the second filter has not been applied, and the information of the decoded video data to which the deblocking filter has not applied, being selected by the video encoding apparatus according a preset method.

13. A non-transitory computer-readable recording medium having recorded thereon a computer program for executing the video encoding method of claim 12.

14. A computer program stored in a non-transitory computer-readable recording medium, the computer program being combined with hardware and thus executing a video encoding method comprising:
  generating encoded video data by encoding an input video;
  decoding video data to which a filter to compensate for a pixel value is to be applied, wherein the video data is from the encoded video data;
  applying a deblocking filter to the decoded video data to remove a block effect;
  generating a first filter parameter by using information of the decoded video data, wherein the first filter parameter is configured to be applied to a first filter to compensate for a value of a current pixel by using a value of a neighboring pixel adjacent to the current pixel and a filter coefficient with respect to the neighboring pixel;
  applying second filter to the decoded video data, wherein the second filter compensates for a value of a current pixel by using directionality information used in encoding the decoded video data;
  applying, by using the first filter parameter, the first filter to video data to which the second filter has been applied; and
  performing entropy encoding on the first filter parameter,
  wherein the generating of the first filter parameter comprises generating the first filter parameter by using one of the information of the decoded video data to which the deblocking filter has been applied and the second filter has not been applied, or the information of the decoded video data to which the deblocking filter has not applied, being selected according a preset method.

* * * * *